United States Patent [19]
England

[11] Patent Number: 6,144,991
[45] Date of Patent: Nov. 7, 2000

[54] SYSTEM AND METHOD FOR MANAGING INTERACTIONS BETWEEN USERS IN A BROWSER-BASED TELECOMMUNICATIONS NETWORK

[75] Inventor: Paul England, Morristown, N.J.

[73] Assignee: Telcordia Technologies, Inc., Morristown, N.J.

[21] Appl. No.: 09/026,476

[22] Filed: Feb. 19, 1998

[51] Int. Cl.[7] .................................................. G06F 13/00
[52] U.S. Cl. .......................... 709/205; 709/219; 709/300; 345/329
[58] Field of Search .................................... 709/203, 204, 709/205, 217, 219, 300, 302; 345/329, 330, 331, 332

[56] References Cited

U.S. PATENT DOCUMENTS

| | | | |
|---|---|---|---|
| 5,553,281 | 9/1996 | Brown et al. | 707/104 |
| 5,796,393 | 8/1998 | MacNaughton et al. | 345/329 |
| 5,809,250 | 9/1998 | Kisor | 709/227 |
| 5,838,906 | 11/1998 | Doyle et al. | 709/202 |
| 5,862,330 | 1/1999 | Anupam et al. | 709/204 |
| 5,877,759 | 3/1999 | Bauer | 345/339 |
| 5,931,906 | 8/1999 | Fidelibus, Jr. et al. | 709/217 |

Primary Examiner—Viet D. Vu
Attorney, Agent, or Firm—Joseph Giordano

[57] ABSTRACT

A software system which allows a guide/specialist to interact with a client on a real-time, interactive basis over the World Wide Web. The methodology includes configuring a guide system with a special-purpose browser displaying both locally displayable frames and remotely displayable frames; the client system utilizes a conventional browser. The remotely displayable frames are transmitted to the client so that both the guide and the client have identical views of the remotely displayable frames. The guide uses the locally displayable frames to call upon available Web resources, typically in response to a client request also transmitted over the Web via, for example, a chat program, and then the guide can load the remotely displayable frames into the remotely displayable frames for rendering by the conventional browser. In addition, the guide and client can interact with a shared pointer and a shared whiteboard. Moreover, the guide can record the live session for later playback by other clients. Also, a plurality of clients may be simultaneously interacting with the guide and each other.

20 Claims, 38 Drawing Sheets

FIG. 33

```
                          Session(1).htm
        <HTML><HEAD><title> Active Piper Sessions</title></HEAD>
        <BODY>
        <h2>Active Piper Sessions</h2><p>
        Session:DEFAULT_vpc24_21570<a
        HREF="http://vpc24.bellcore.com/Hamelin/cgi-bin/session.exe?JOINS+DEFA
        ULT_vpc24_21570">--<<Join>>---</a><a
        HREF="http://vpc24.bellcore.com/Hamelin/cgi-bin/session.exe?A-JOINS+DE
        FAULT_vpc_21570">--<<ACTIVE-RAT-JOIN>>---</a>
3302 {   <a HREF="http://vpc24.bellcore.com/Hamelin/cgi-bin/session.exe?LISTCLI
        ENTS+localhost+DEFAULT_vpc24_21570"><<LIST
        CLIENTS>></a><a
        HREF="http://vpc24.bellcore.com/Hamelin/cgi-bin/session.exe?KILLSESSIO
        N+localhost+DEFAULT_vpc24_21570"><<REMOVE
        SESSIONS>></a><a>
        Session:PCHELP_vpc24_21655<a
        HREF="http://vpc24.bellcore.com/Hamelin/cgi-bin/session.exe?JOINS+PCHE
        LP_vpc24_21655">--<<JOIN>>---</a><a
        HREF="http://vpc24.bellcore.com/Hamelin/cgi-bin/session.exe?A-JOINS+PC
        HELP_vpc24_21655">--<<ACTIVE-RAT-JOIN>>---</a><
3304 {   a HREF="http://vpc24.bellcore.com/Hamelin/cgi-bin/session.exe?LISTCLIE
        NTS+localhost+PCHELP_vpc24_21655"><<LIST
        CLIENTS>></a><a
        HREF="http://vpc24.bellcore.com/Hamelin/cgi-bin/session.exe?KILLSESSIO
        N+localhost+PCHELP_vpc24_21655"><<REMOVE
        Session>></a><p>
        </BODY></HTML>
```

SYSTEM AND METHOD FOR MANAGING INTERACTIONS BETWEEN USERS IN A BROWSER-BASED TELECOMMUNICATIONS NETWORK

FIELD OF THE INVENTION

This invention relates to a browser-based telecommunications network such as the Internet and, more particularly, to a system and method for managing interactions between users in the browser-based telecommunications network.

BACKGROUND OF THE INVENTION

With the advent of the Internet, the communication of knowledge and information has altered dramatically. The coalescing of telecommunications with computers, especially personal computers (PCs), has allowed for the essentially instantaneous propagation of and/or exchanging of data and resources among users/collaborators on a worldwide basis.

The Internet, probably the most widely recognized interconnection network deployed today, is a loosely-coupled arrangement of networks that interconnects hundreds of thousands of PC systems, supercomputers, mainframes, workstations, laptops, and even pocket radios throughout the world. A pictorial representation of the Internet is shown in FIG. 1; this representation is one which is particularly instructive in the context of the present invention. As represented in FIG. 1, Internet 101 is a packet-oriented, connectionless (as distinct from circuit-switched) network of computers and telecommunication links. Exposed for view are certain components comprising Internet 101 at any instant, namely, PCs 102 and 103 as well as computers 104 and 105. Communication paths 111–114 to Internet 101, which couple PCs 102–103 and computers 104–105, respectively, to Internet 101, propagate packets using the standard TCP/IP protocol. Also shown are ports 121 and 122 which serve as the "entry points" into Internet 101 from PCs 101 and 102, respectively. A port allows for on-demand, non-permanent connection into Internet 101. On the other hand, computers 103 and 104 are shown as being permanently connected to (that is, part of) Internet 101.

Information available on the Internet is termed Internet Resources, and this term will be used to encompass text, video (such as movie clips, cartoons, interviews with people), images (such as famous paintings and pictures), sound (such as excerpts from speeches, music and promotional materials from corporations), databases (large collections of information such as electronic texts, encyclopedias, and dictionaries), documents (business and financial information, government documents such as Internal Revenue Service (IRS) forms), applications programs and interactive games. The integration of text, graphics, sound and/or video is known as multimedia.

About 1992, the World Wide Web (WWW, W3, or Web) was developed as a tool for locating and accessing the Internet Resources. The WWW is "hypertext" based. Hypertext is a database format that is a way of managing information that allows items of information to be connected using associative links. A hypertext database is composed of a number of Internet Resources that can be represented on a user's display screen (say a screen associated with PC 102). The Internet Resources are connected by links (also known as hyperlinks) which are also represented on the display screen. Links can be text based (words) or icons (pictures or symbols). For a PC system user to access the Internet Resources, the user follows links on the display screen by, for example, pointing and clicking a pointing device (such as a "mouse") or alternatively by hitting a key on the keyboard.

The basic building block of the WWW is a Web page which contains the Internet Resources and links. Web pages are written in HyperText Markup Language (HTML) which is a methodology for marking up documents with informational tags that indicate how the Internet Resources should be presented and how the Internet Resources are linked together. Each Web page has a unique address known as a Uniform Resource Locator (URL). By analogy, just as person can be located by street address, Internet Resources and Web pages can be located by their unique URLs.

A Web site is a collection of Web pages maintained by an entity such as a college, university, government agency, company or individual. Web pages and web sites are linked together via telecommunications networks and communication paths using various physical transmission media to form the WWW. It is often helpful to visualize the Internet as a multimedia hyperlinked database that spans the world.

The computers on the Internet communicate using the Transmission Control Protocol/Internet Protocol (TCP/IP), as alluded to with reference to FIG. 1. The TCP/IP protocol describes how information is propagated throughout the Internet. TCP/IP breaks the information into packets, routes those packets from the sending computer to the receiving computer and finally reassembles the packets once the packets reach the receiving computer. Oftentimes the TCP/IP protocol forms the basis for a higher-level protocol, which may be user-defined, as required.

Moreover, the reliability offered by TCP/IP is very useful and many other programs and/or open protocols are built on top of it. One such protocol is the HyperText Transfer Protocol (HTTP), a protocol designed for the rapid and efficient delivery of hypertext. Web pages and web sites are stored on computers known as Web servers or HTTP servers which are computers connected to the Internet that make Web pages and Web sites available to the world.

The HTTP servers or Web servers communicate using the HTTP protocol. The user's PC system establishes communication with the HTTP server, requests to view Web pages, and the HTTP server responds to these requests by sending information such as Web pages and/or Internet Resources to the user's PC system. The user's PC system continuously displays the information received from the HTTP server while it responds to user's key strokes or mouse input. Once the HTTP server has delivered the requested information to the user, the HTTP server retains no memory of the event that just took place.

The most widely used method for a home-based Internet user to access the Internet from his/her home is to connect to an Internet Service Provider (ISP), that is, an on-line service provider, using a PC system (e.g., PC 102) that includes a high-speed modem and communications software to dial-in to the ISP. The ISP provides the access port (e.g., port 121) for the dial-up user. In contrast, users in a commercial environment are typically part of the company's LAN and have a direct connection to the Internet. The pictorial representation of FIG. 2 summarizes the dial-in mode of interconnection; this mode is addressed by the present invention. ISP 201 typically deploys server-based computer 202 forming part of Internet 101; computer 202 may serve as the HTTP server for PC 102.

Typically, after the user completes a logon procedure, the user is then able to invoke a so-called Web-based browser and a default home page (initial Web page) accessed by the browser appears on the display screen. The WWW is accessible through the browser which is a program designed specifically for reading HTML of Web pages. When requested by the user's PC system, the HTTP server transmits the HTML directly to the browser. The browser usually has a graphical user interface (GUI) that displays the information in a graphical form or text only on the user's PC system.

The browser enables the user to not only access Web pages, but also to follow links, create bookmarks (saved URL addresses used to mark Web pages or Web sites that the user wants to revisit), and maintains a history list (allows the user to return to any Web page or Web site recently visited). Two conventional browsers are Netscape Navigator and Microsoft Internet Explorer.

The GUI of the browser allows the user to pick commands, start programs, and view documents or other options by selecting from windows, icons, links, and menus on the display screen. For example, a user can type queries (i.e. words or phrases) into search engines, follow ideas from one document to another using links, type a URL in the location bar and hit the enter key, select an item from one of a series of menus located on the browser (such as select a bookmark or select a Web site or Web page from the history list).

FIG. 3 depicts a conventional browser, namely, the Netscape Navigator, showing the Web page for Yahoo, Inc. Several menus for the Netscape Navigator are shown in FIG. 3. A menu is a on-screen list of available options and commands. Menu row 301 shows, for example, File menu 302, Edit menu 304, and so forth. These menus allow the user to open a new browser, open a file, and access a bookmark among other things. The menus also provide access to electronic mail (e-mail) which is a feature that allows the user to send messages and/or documents to a user of another computer as well as receive messages and/or documents.

As an alternative to menus, buttons can be selected for added functionality. Button rows 311 include, for example, the Back button 312 (to go back to the previous Web page or another Web page in the history list), Forward button 314 (to go forward in the history list), and so forth. Selecting these buttons can show Internet Resources, provide additional Web sites, or access a search engine to search the Web for phrases or a person's telephone number and/or address.

There is one window 350 (a rectangular area on the display screen used to hold information relating to a particular aspect of the browser currently in operation) which holds the Web page. Links on the Web page that are words include, for example, Arts & Humanities 322 through to Society and Culture 324. When these links are selected, Internet Resources are displayed or alternatively another Web page with more links is shown.

Location bar 332 of the browser contains the URL of the current Web page displayed. In this instance, the URL is "http://www.yahoo.com". Title bar 342 contains the name of the Web page currently being accessed; the page in FIG. 3 is entitled "Yahoo". This Web page also contains search engine 352. Yahoo is one of the available search engines which allows the user to type in a few words or phrases to be located. The search engine attempts to locate other Web pages related to the chosen words or phrases. The search engine will list the other related Web pages and the user can view these Web pages if interested.

Several features are available for added sophistication using the Web. For example, "frames" are a convenient mechanism for displaying more than one Web page in a browser. The browser can be split into parts which can be scrolled (move from the top of the page to the bottom of the page) individually. Each part of the display is called a frame. Different Web pages can be displayed in each frame. Alternatively, a list of categories (i.e. a tree of resources or table of contents) can be shown in one frame and the contents (set of links) in the other frame. Conventionally, the arrangement of the frames is static or fixed and set forth by the HTML of the Web pages. In FIG. 3, there is one frame in the browser and this frame contains the Web page for Yahoo as fixed by the designer of the Yahoo page.

A Web page can also contain other Internet Resources such as "applets", "plugins", and scripting language. All of these technologies add intelligence and interactivity to Web pages and support a greater range of functionality. An applet is a (small) application program that typically is stored on the Web server. The applet is downloaded (i.e. transfers from the Web server to the user's PC system) with the HTML of the Web page when a Web page is requested by the user. Once the applet is downloaded, it is activated and runs on the user's PC system. A common language for writing applets is the Java programming language, a language that allows Web masters (i.e. people who design Web pages) to create animated and interactive Web pages.

A plugin is a software program that performs a task that a Web browser cannot perform on its own. A plugin exploits the fully programmable power of the browser and extends the capabilities of the browser in a specific way such as providing the ability to play audio samples or view video movies on the browser display. Plugins work in connection with the browsers and allow users to see video and animation, hear sound, and run programs in their previously graphics- and text-bound Web pages. If the browser called Microsoft Internet Explorer is being used then the ActiveX technology is used to create ActiveX controls, which offer similar functionality to plugins.

As an alternative or supplement to an applet, plugin, and ActiveX control, scripting language can be utilized. Scripting commands are embedded in the HTML which forms the Web page. When a browser requests such a Web page, the Web server sends the full content of the document including HTML and scripting commands over the network to the user's PC system. When the HTML is transferred from the Web server to the user's PC system, the browser on the user's PC system then converts the HTML into a Web page, and executes the scripting commands producing the results the user sees. Scripting commands embedded in a document containing HTML can respond to user events such as mouse-clicks, form input, and commands to load and unload Web pages. When used in conjunction with a plugin or applet, the scripting language can be used to make the plugin or applet run a feature or program when the user selects a button on the display screen. A common scripting languages is JavaScript.

Another powerful facility for extending the functionality of the WWW is the ability to execute arbitrary programs on the HTTP server in response to user requests. The Common Gateway Interface (CGI) is the specified standard for interfacing these external applications with HTTP servers. "Cgi-bin" programs are executed in real-time so that dynamic information can be generated and displayed. A cgi-bin program can be written in any programming language. Cgi-bin programs are often used to process user input. A common example of a cgi-bin program is a search engine which processes a user request to search the Web for certain words or phrases.

One traditional use of the Internet has been to support real-time interpersonal communications. This class of applications includes Internet telephony (allows people to communicate using voice over the Internet), and Internet video packages (Internet telephony with video), and collaborative tools (allows people to work together even though they are located physically apart). These tools were primarily developed for the Internet before the advent of the WWW and are currently being adapted for use on the WWW.

Collaborative tools have been developed to increase the level of interaction between users in a telecommunications network. One such tool is a "chat program" which includes talk chat, voice chat, and video chat. Talk chat is a program that allows two or more users of computers to communicate by typing their remarks back and forth without exiting their display screen. Voice chat allows users to hear the voice of family, friends, colleagues, and any other people they wish to hear. Video chat enables the user to see another user while communicating.

Videoconferencing is another collaborative tool which comprises holding a conference among users at remote locations by means of transmitted video and audio signals via video and audio links respectively. The computers used for videoconferencing must have at least a camera, microphone and earphones or speakers and videoconferencing software.

Shared pointer and distributed pasteboard are collaborative tools that will be seen simultaneously by a group of users in a telecommunications network. With respect to the shared pointer, any user can move this pointer. Features of a shared pointer such as color, size, shape, and visibility can be altered by any user, and all other users see the changes to their pointer. The distributed pasteboard allows two or more users to edit a document containing text and/or graphics simultaneously using a collaborative document editor or other editing facilities.

Another collaborative tool is a whiteboard. A whiteboard is a shared workspace that two or more users can use to exchange notes and diagrams. A digital whiteboard is the direct electronic equivalent of a chalkboard or whiteboard, except that generally the people (i.e. users) who are using the whiteboard are physically in different parts of a building or world. A whiteboard permits a group of users to establish communication that allows all of the users to see or modify the whiteboard on their display screen. Whiteboards typically provide users with simple drawing tools like pens, geometric shapes (i.e. circles, squares, etc.), and allows users to import pictures. The color and width of the pen can be adjusted and freehand drawing is supported. Whenever the user modifies the display screen by adding text or graphics, all other users see the changes immediately on their respective whiteboard. Users can use the whiteboard to make presentations or work collaboratively on a picture or document.

To date, the attempts to integrate collaborative tools into the Web have produced mixed results. Collaborative tools such as shared whiteboards, shared pointers, and distributed pasteboards have not effectively been incorporated into the Web. Although chat programs and videoconferencing have been applied to the Web (i.e. by embedding them in the HTML of a Web page), they cannot be used flexibly. For instance, a chat program can be invoked and placed in a frame of a Web page when a Web page is visited, but cannot be started when needed under the control of one or more users without leaving the page.

Regarding videoconferencing, a user typically is required to download additional application programs to run the software. This can be a complex task for an infrequent or new user of the Web. All of these collaborative tools are not very extensible (i.e. plugins, ActiveX controls, and scripting language cannot be utilized to extend their functionality).

Unfortunately, since collaborative tools are not generally well integrated with the WWW, users are either navigating the Web or engaging in a collaborative conference (two or more users using collaborative tools) outside the Web. For a collaborative conference, a shared resource (i.e. shared whiteboard, shared pointer, distributed pasteboard, etc.) which is not on the Web is used as an information exchange medium. One drawback to using collaborative tools outside of the Web is that typically a user is required to pre-install them which is often difficult for the casual user of a PC system. Another drawback is that the collaborative tools mostly operate outside the Web as a separate application which is a disincentive to use.

There are also drawbacks to navigation of the WWW today since navigation is predominately self-guided. As previously mentioned, several methods of navigation on the WWW are currently available. A user can type queries (i.e. words or phrases) into search engines, follow ideas from one document to another using links, type in a URL in the location bar and hit the enter key, select an item from one of a series of menus located on the browser (such as select a bookmark or select a Web site or Web page from the history list).

These methods of navigation are flexible and easy to use, but do not reflect all the ways that people have traditionally communicated and acquired information. People normally communicate by talking to each other, engaging in a two-way conversation often with one person asking questions of the other if the person requires further information to make a decision. In particular, for the interactions between a expert and a novice or a teacher and a class of students, the expert and teacher typically provide information and/or answer questions posed to them.

Close examination of the expert/novice and teacher/class relationship on the Web exposes deficiencies since these relationships are poorly represented on the Web. As an example of a novice asking questions of an expert, consider a business advertising on the WWW. Users can search information provided by the business and place orders from their PC systems. However, sometimes users require personal assistance. Some users are unable to find the desired product on the Web site or alternatively have questions regarding a product that they need to ask a knowledgeable customer representative to solve their problems and address their needs.

The WWW does not satisfactorily support the two-way interaction between people critical for these cases. As a result, fallback solutions normally adopted are (a) a telephone number to call for personal assistance; (b) an electronic form that must be filled in that is sent to the business setting forth details and then responded to by the customer representative; or (c) an e-mail address is given to send questions to the business.

There are problems associated with these fallback solutions. In the first case the user must go off-line (i.e. leave the PC system). It is often time consuming to telephone for personal assistance because this often requires selecting from numerous options from a voice menu using the user's telephone or voice. Often, several minutes transpire before the user is in contact with a human customer service representative. In the second two cases, the interaction is no longer real-time. It can take hours, even days, for a user to receive a response from the business. As a result of the above-mentioned drawbacks, users often attempt to find a competitor's Web site to search for a suitable product to meet their needs. The results are a loss of revenue to the business owning the Web page initially visited by the user. Thus, a need exists to provide the user with a real-time on-line interaction with a person (such as a customer representative).

As a second example consider educational training in a classroom setting. Traditional classroom learning is effective due to the teacher having access to a wide variety of resources. Viewgraphs, pictures, video and audio recordings, and a whiteboard/chalkboard is utilized. These resources can be easily accessed and used flexibly during the teacher's lesson. Students can ask questions during or after the presentation. The WWW does not currently support the functions required to promote effective learning in a traditional classroom setting. In particular, the ability to teach lessons interactively is not available on the WWW today. Thus, a need exists for a system and method to provide real-time interactive learning on the WWW.

Another drawback when perusing the Web is that many Web sites are complicated to navigate. Thus, there exists a need for a practical technique for providing a user with an overview of the key features of a Web site while minimizing frustration to the user due to the learning curve.

Very recently, research efforts have been devoted to alleviating the foregoing shortcomings and limitations. Representative of these efforts is the system developed by eFusion, Inc. of Beaverton, Oreg. The eBridge™ Interactive Web Response system delivers Internet-enabled consumers directly to call center agents—without the need for a callback—where they can talk and browse over a single phone line. However, while an agent and consumer are directly connected, the agent lacks the real utility to answer frequently asked questions fast and effectively. The agent and consumer view the same Web information on their individual displays, so that whatever the agent displays, the consumer also views, and vice versa. Thus, the displays of the agent and consumer are synchronized and the displays are essentially identical. This mode of operation precludes the agent from accessing and viewing resources privately/locally, on an interim basis, during the process of choosing the best information to display to the consumer. Thus, while it may take the agent tens of seconds or more to access and download a series of Web pages to provide an answer to a consumer question, the consumer is viewing the answer-seeking process without any real knowledge of what the agent is attempting to accomplish.

The art is generally devoid of teachings or suggestions for displaying information common to both the agent and the consumer while also providing a local display area for the agent to locally select/display information, with the facility for the agent to then propagate locally displayed information to the consumer under control of the agent for display by the consumer.

SUMMARY OF THE INVENTION

The shortcomings of the prior art are obviated by a method of managing interactions between users in a browser-based telecommunications network so that, while synchronized, a guide and client (e.g., an agent and consumer) each may view separately displayed information.

In accordance with the broad aspect of the present invention, a method for communicating between a guide system and a client system interconnected via a browser-based telecommunications network, with the client system deploying a conventional browser, includes: (a) configuring the guide system with a special-purpose browser for displaying both locally displayable frames and remotely displayable frames on the guide system; and (b) under control of the guide, propagating the remotely displayable frames over the network to the client system for display by the conventional browser of the client system.

Other aspects of the present invention which utilize the basic methodology set forth in steps (a) and (b) above as the underlying methodology include:

(i) configuring both the guide system and the client system with jointly operational shared pointer software, and executing the shared pointer software to control a shared pointer displayable concurrently on the conventional browser and on one of the remotely displayable frames of the special purpose browser;

(ii) configuring both the guide system and the client system with jointly operational whiteboard software, and executing the whiteboard software to control whiteboard markings displayable concurrently on the conventional browser and on one of the remotely displayable frames of the special purpose browser;

(iii) configuring both the guide system and the client system with jointly operational free-hand drawing software, and executing the drawing software to control free-hand drawing markings displayable concurrently on the conventional browser and on one of the remotely displayable frames of the special purpose browser;

(iv) configuring both the guide system and the client system administration software for identifying the client system, and executing the administration software to provide the identity of the client system to the guide system as rendered on its special purpose browser;

(v) configuring both the guide system and the client system with administration software for disconnecting the client system from the guide system, and executing the administration software to disconnect the client system under control of the guide system;

(vi) configuring the guide system with recording software for recording actions by the guide while using the guide system, and executing the recording software to record the actions;

(vii) configuring the guide system with playback software for playing back the recorded actions of the guide, and executing the playback software, under control of either the guide or client, for display by the remotely displayable frames on the conventional browser; and (viii) configuring the guide system with editing software for editing the recorded actions of the guide, and executing the editing software, under control of either the guide, to edit the recorded actions of the guide.

In addition, in accordance with another aspect of the present invention, a method for communicating between a guide system and a client system interconnected via a browser-based telecommunications network, with the client system deploying a conventional browser, includes: (a) configuring the guide system with a special-purpose browser for displaying both locally displayable frames and remotely displayable frames on the guide system; (b) configuring the guide system with a set of frame layouts; and (c) under control of the guide, propagating a selected frame layout along with the remotely displayable frames displayable using the frame layout over the network to the client system for display by the conventional browser of the client system.

Moreover, the methodology is easily scaleable so that a plurality of client systems may interact with the guide system, and each client system displays identical remotely displayable frames.

BRIEF DESCRIPTION OF THE DRAWINGS

The invention will be more readily understood by reference to the following detailed description taken in conjunction with the accompanying drawings wherein:

FIG. 33 is sample HTML produced by process block 3308 of FIG. 32;

FIGS. 38 and 39 show the actions taken by the components of the Hamelin system when constructing/hiding and moving the whiteboard, respectively.

Whenever possible, the same reference numerals are used to reference the same elements in different FIGS.

DETAILED DESCRIPTION

A. Terminology

1. Clients and guides

To place in perspective the detailed description of the present invention, it is instructive to provide some basic terminology. Users of the system in accordance with the present invention (also referred to as the Hamelin system hereinafter) include "clients" and "guides". A client is a user of a computer in a browser-based telecommunications network who, e.g., sends messages to the guide, receives messages from the guide, receives Web pages and/or Internet Resources under control of the guide, and/or engages in a collaborative conference. The guide is a user of a computer in the telecommunications network who leads one or more clients by sending messages to client(s) and/or propagating Web pages and/or Internet Resources to the client(s) for display. A guide can coordinate collaborative tools such as a chat program, shared whiteboard, shared pointer, distributed pasteboard, and videoconferencing.

2. Frame layouts and framesets

The guide can load framesets or alternatively, load frame layouts and then load Internet Resources, Web pages, or collaborative tools into individual frames. A frame layout is an arrangement of one or more frames without contents. Commonly used frame layouts can be predefined. FIGS. 4A–4M shows several embodiments of frame layouts that are predefined in the Hamelin system. Frame layout 4A contains one frame. Frame layouts 4B, 4C, 4H, and 4I contain two frames. Frame layouts 4D–4G, 4J, 4K, and 4M contain three frames. Frame layout 4L contain four frames. Additional frame layouts can be defined by the guide.

A frameset is an arrangement of frames (i.e. frame layout) and the frame contents for each frame. The frame contents can be anything available on the Web, such as Web pages and/or Internet Resources, or alternatively a collaborative tool such as a chat program. A frameset can be loaded in one operation and unlike traditional frames, the frames in a frame layout can be dynamically and individually changed by the guide. Using framesets, sophisticated screen layouts can be accomplished.

A frame can itself contain one or more frames (called child frames) arranged in rows or columns. Each one of these child frames can itself contain one or more frames arranged in rows or columns, and so on. This recursive feature of the frames allows layouts of arbitrary complexity to be defined. Furthermore, the frames themselves can be addressed individually so that any Internet Resource, Web page, or collaborative tool can be loaded into any frame, independent of the other frames. This contrasts with the normal use of frames, where a page is authored to use a fixed frame layout and a limited set of Web pages as the content of the frames (i.e. for example, a frame containing a table of contents and another frame containing one of a selected number of content pages).

3. Sessions

Figure 5:
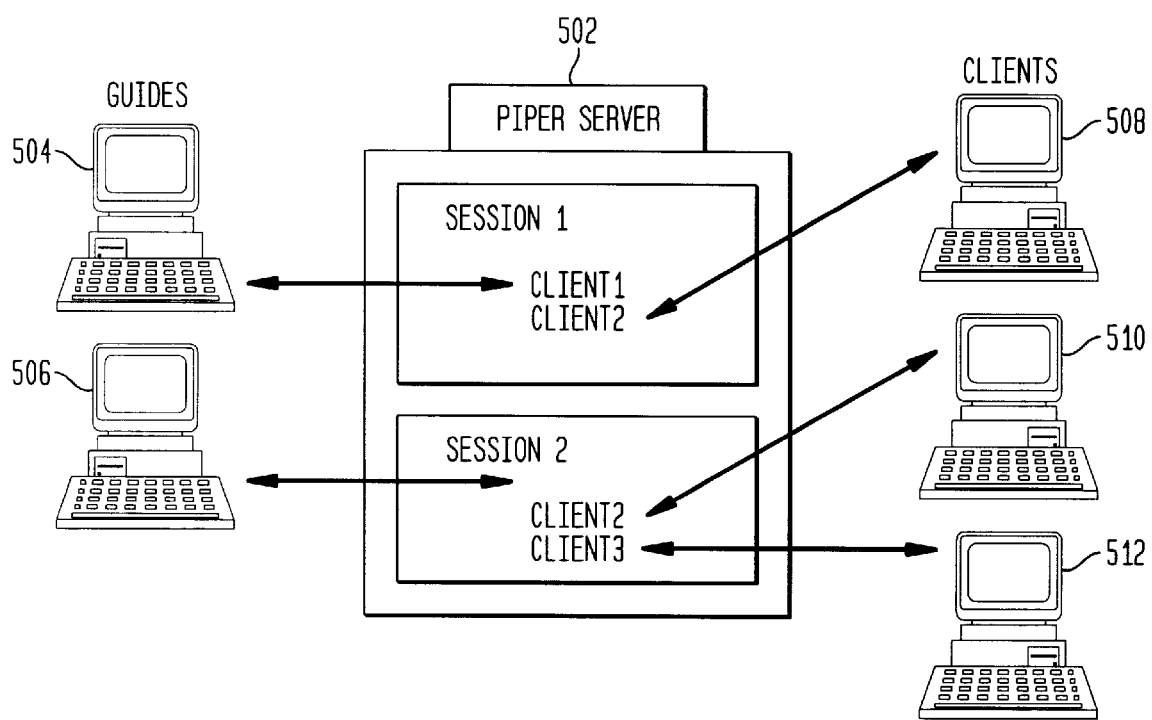
FIG. 5 is a high-level block diagram depicting the interrelationship between the piper server, sessions, guides, and clients.

Each guide hosts one or more sessions. A session is an exchange of communications between two computers of the telecommunications network. An element called the system server or piper server (discussed below) acts an intermediary between the guide and clients. FIG. 5 shows the interrelationship between piper server 502; sessions, namely Session 1 and Session 2; guides 504 and 506; and clients 508, 510, and 512. Piper server 502 manages sessions and clients attached to sessions. Each client is a member of exactly one session and each session is essentially independent of other sessions. The maximum number of clients and sessions is dependent only on the technical capabilities of piper server 502.

Sessions can be started in two ways: the guide can initiate a new session, or a client can request a new session. For a guide initiated session, the session type must be selected by the guide. The session type specifies a starting Web page and an initial set of Internet Resources. For a client initiated session, the client selects a link called a "Hamelin link" located in a Web page received by the client and the session type is specified in the Web page that requests the session.

In FIG. 5, there are two sessions, Session 1 and Session 2 on piper server 502. Each guide can manage one or more sessions. In FIG. 5, guide 504 manages Session 1 and guide 506 manages Session 2. There is typically one guide for each session. Each session can have one or more attached clients. Here, Session 1 is an exchange of communications between the guide 504 and client 508. Session 2 has guide 506, client 510 and client 512 attached to it. Additional sessions can be added to piper server 502.

There are various types of sessions available including a live, interactive session in which the client asks questions of the guide, and the guide uses the Web pages, Internet Resources, and collaborative tools to reply. Other sessions include: (1) recorded sessions (capable of later playback and editing); and (2) non-interactive live, broadcast sessions. Examples of live, broadcast sessions include teaching lessons (with no student feedback), intercasting (i.e. support for Web-based enhancements of live television and radio events), and guided tours of the Web.

B. Applications of the Hamelin System

The following are illustrative applications of the types of sessions available and are meant by way of example and not to limit the application of the invention.

1. Help desk

Figure 6:
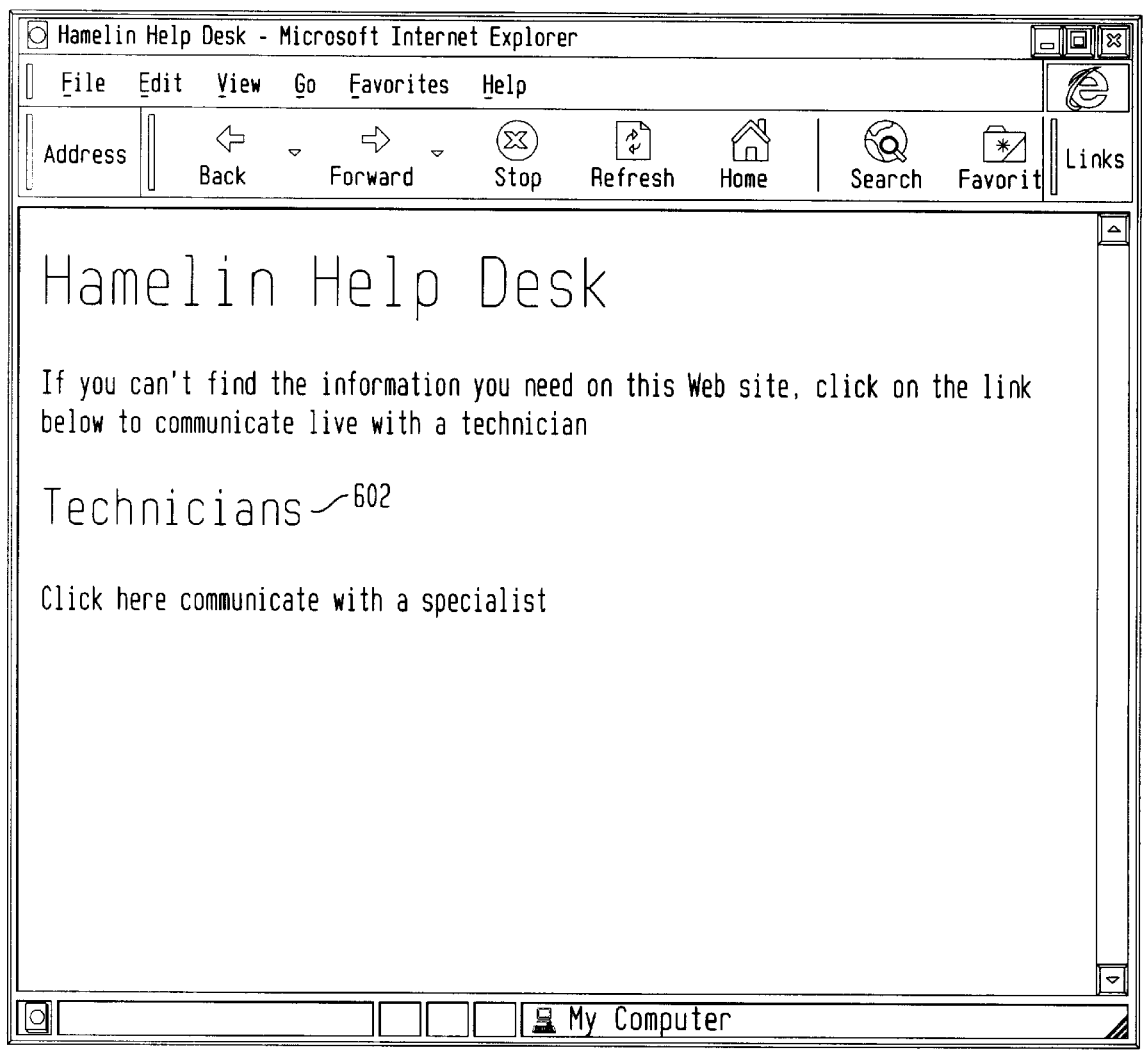
FIG. 6 is one illustrative embodiment of a Hamelin link which the client selects to initiate a session with a guide.
Figure 7:
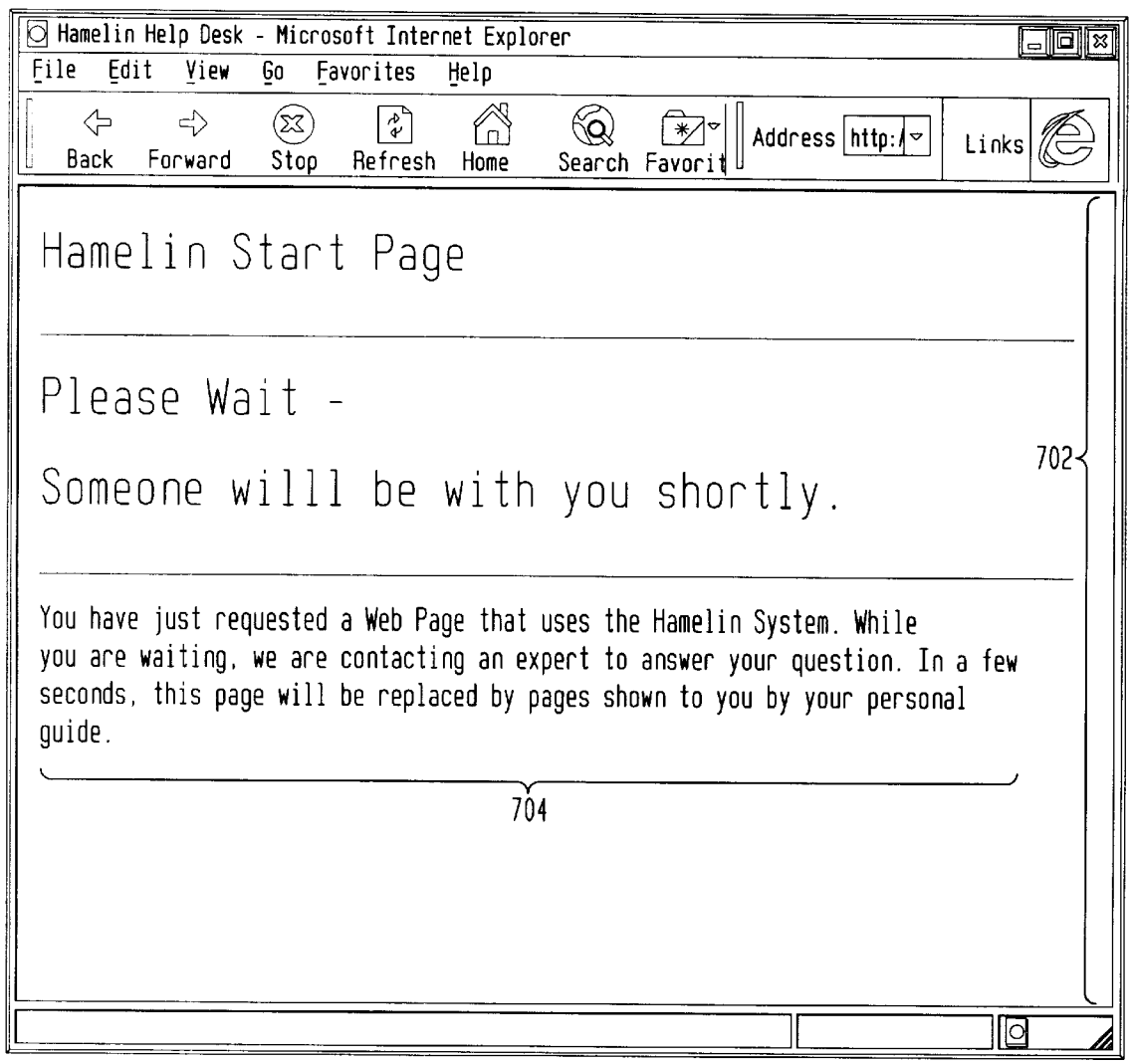
FIG. 7 shows one illustrative embodiment of the Hamelin Start Page the client views when selecting the Hamelin link.

A live, interactive session has utility in a help desk environment. The guide can be a technician or help special-ist and the client is a user requesting help. Assume that the client initiates a request from a Web page for Bellcore AdaptX® system products. With reference to FIG. 6, the client has already loaded the Web page for AdaptX products containing the Hamelin Help Desk into her PC system. The client then selects a Hamelin link in order to initiate a live, interactive session with the guide. In FIG. 6, the Web page contains the Hamelin link entitled "Technicians" 602. Once this link is selected by the client, with reference to FIG. 7, a Hamelin Start Page 702 is presented to the display screen on her PC system. Hamelin Start Page 702 is a Web page containing Internet Resources such as text 704 which typically requests the user to wait for a guide or provides other pertinent information.

Figure 8:
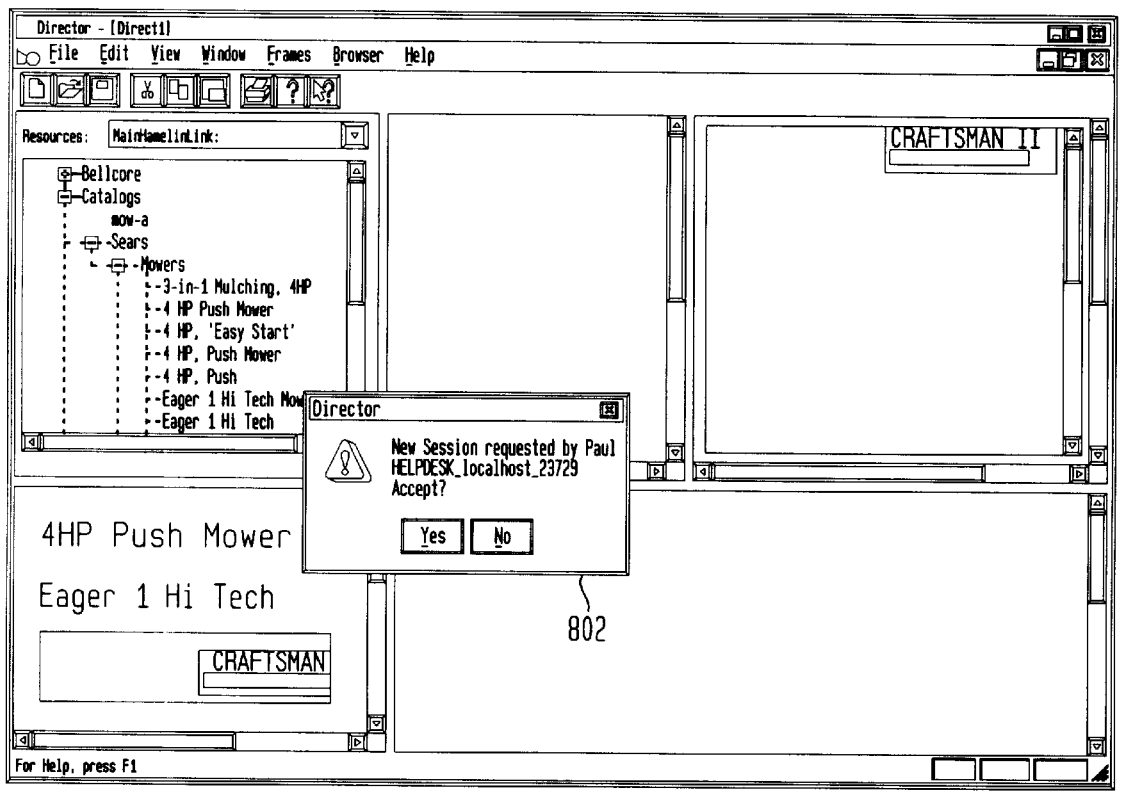
FIG. 8 is one illustrative embodiment of an introductory viewed by the client.

The diagram of FIG. 8 shows what the guide views on his display screen. Here, the guide is working on a session unrelated to Bellcore AdaptX systems which involves providing information to another client regarding lawnmowers. Once the client selects Hamelin link 602 as previously discussed with FIG. 6, the guide receives a pop-up box 802 on his display screen. The pop-up box 802 informs the guide that a client is requiring assistance, and thus, requesting a new session. When the pop-up box 802 appears requesting a session concerning Bellcore AdaptX products, the guide can accept or refuse. If the guide/specialist chooses to accept, then a new session is initiated by the Hamelin system.

Figure 9:
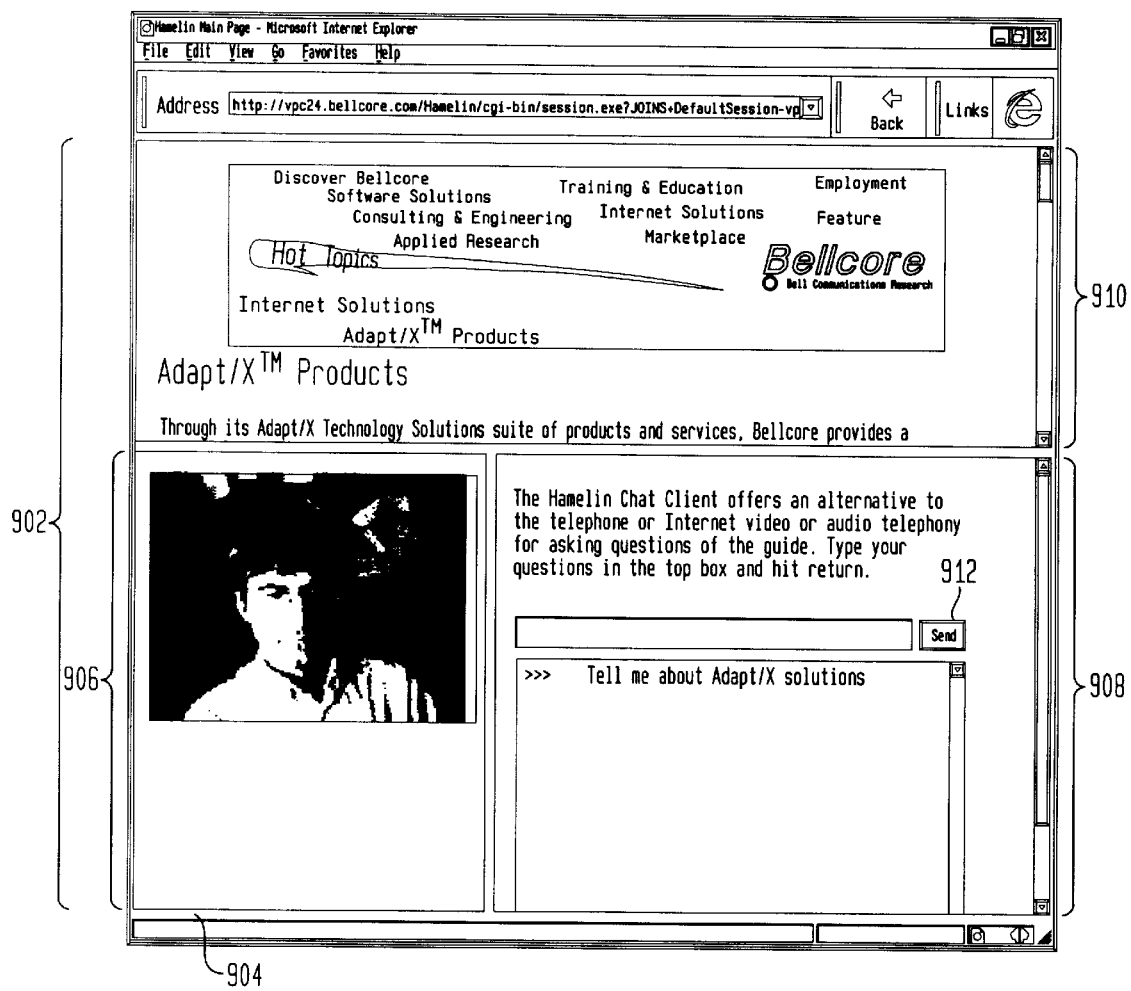
FIG. 9 is one illustrative embodiment of the client's display screen when an initial frameset is loaded.

Typically, at the start of the session, the client will be presented with an introductory page in the client Web browser such as shown in FIG. 9. The client Web browser exemplified is the Microsoft Internet Explorer in FIG. 9. The conventional browser renders two main components: presentation frameset 902 and frame 904 which contains a client-side component (which is basically hidden under control of the client—the client side component of frame 904 will be discussed in more detail shortly).

Presentation frameset 902 contains a frame layout and frame contents. In this illustration, the guide has selected frame layout 4K (from among the frame layouts set forth in FIG. 4). Then the guide has loaded the contents into the frame layout. Alternatively, the guide can select a frame layout and fill the contents of its frames in one action, by loading a frameset for display by the client. In this embodiment of the invention (i.e. FIG. 9), presentation frameset 902 has a frame layout that comprises three frames: frame 906, frame 908, and frame 910.

Frame 906 contains a still picture of the guide/specialist. The picture is, for example, implemented using the Joint Photographic Expert Group (JPEG) format which is a standardized image compression mechanism designed for compressing either full-color or gray-scale images of natural, real-world scenes.

Frame 908 contains a chat program (i.e. talk chat) for communicating questions to the guide. In this instance, the client has typed "Tell me about Adapt/X solutions" which will be sent to the guide by pressing the Send icon 912.

Frame 910 contains a Web page that the guide has chosen to show the client in response to the client's request for help. The Web page contains information about Adapt/X products/solutions. The client can scroll the information or follow links on this Web page. Anything that the client does to the Web page will be viewed by the guide on his guide PC system in a synchronized manner. Likewise, the guide can scroll the information or follow links on the Web page and this will be seen by the client.

Frame 904 contains the client-side component which is the mechanism that enables the client to view the information provided by the guide (and vice versa if technology such as ActiveX controls are used to create the client-side component). Frame 904 is typically a small, almost hidden bottom frame that can be expanded by the client. For example, frame 904 can be expanded to expose a downloaded applet program.

Figure 10:
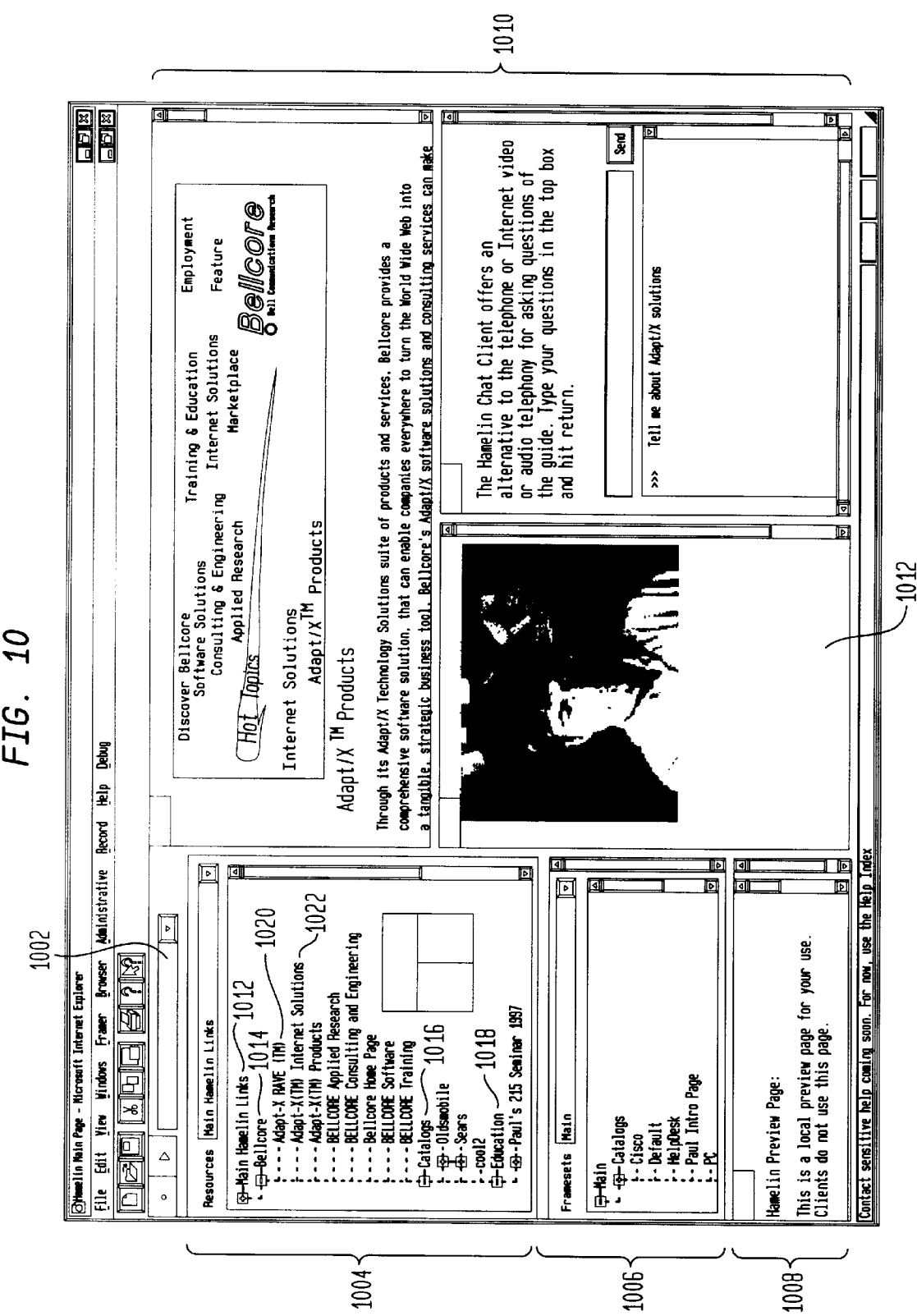
FIG. 10 is one illustrative embodiment of the guide's display screen when the initial frameset of FIG. 9 is loaded.

FIG. 10 is an illustration of the guide's display screen simultaneously viewed when the client sees the contents on her display screen upon typing a question. The guide accesses a "special purpose browser" which may be implemented using the exposed, building block components of a conventional browser, such as Microsoft Internet Explorer or Netscape Navigator. It is required that the guide and client(s) use the same underlying conventional browser for the Hamelin system to function properly. The display screen of the guide PC system contains five resizable frames: recording control frame 1002, main resource frame 1004, frameset frame 1006, preview frame 1008, and remotely viewable frame 1010. Remotely displayable frame 1010 is composed of three frames viewed by all attached clients. The other frames 1002, 1004, 1006, and 1008 are referred to as locally displayable frames.

Preview frame 1008 contains a personal Web browser that the guide can use to find a particular Web page. If the guide finds a Web page he wants to show to the client, the found Web page can be copied to one of the frames in the current frame layout located in remotely displayable frames 1010. For instance, the found Web page could be copied into, for example, frame 1012 of frames 1110. The other frames in FIG. 10 will be described further when the details of the system architecture are set forth below.

FIGS. 9 and 10 are shown for illustrative purposes only. For example, frame 906 in FIG. 9 can contain a live video feed of the guide/specialist rather than a still picture.

Figure 11:
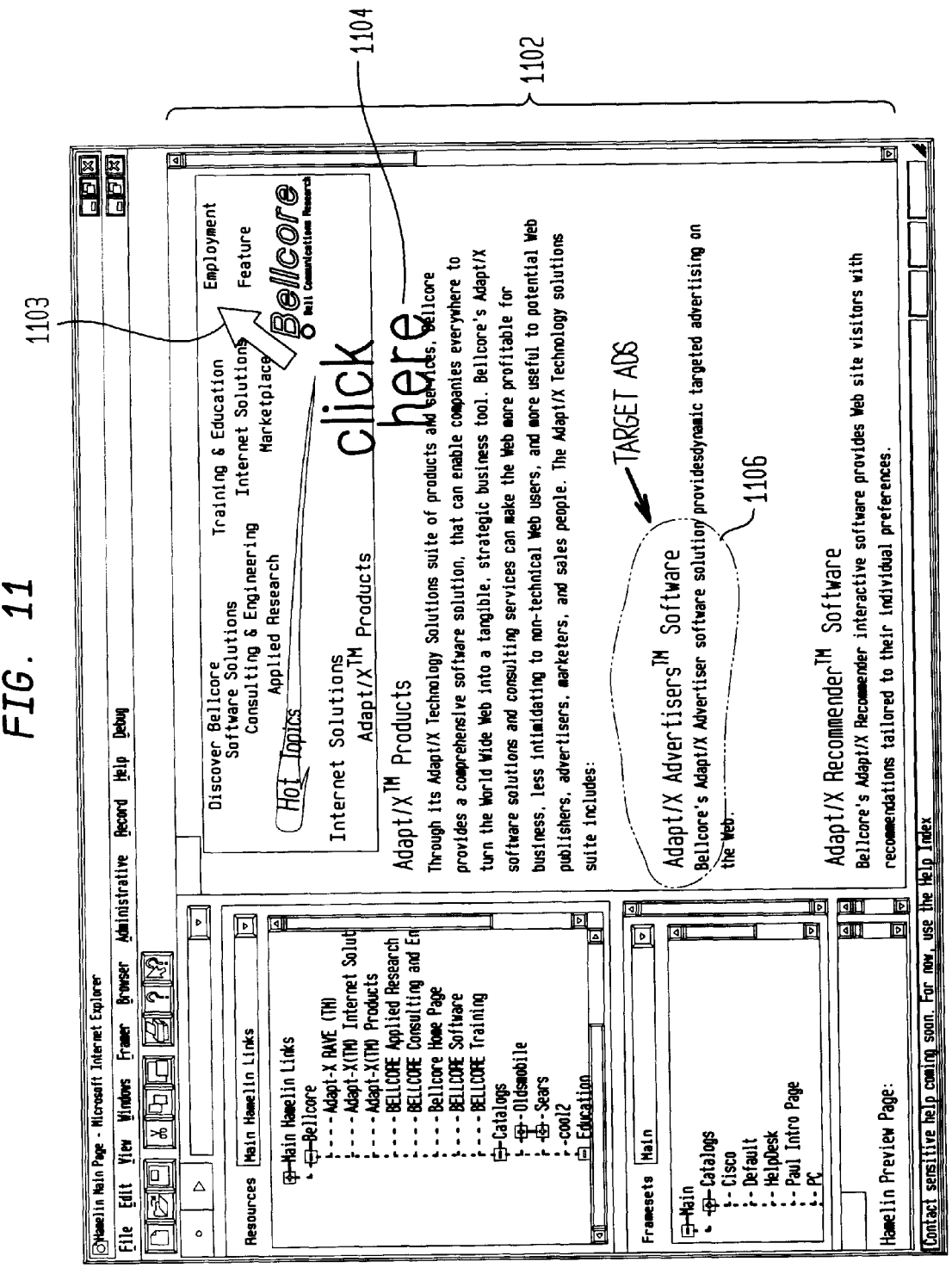
FIG. 11 is one illustrative embodiment of the guide's display screen when implementing a shared whiteboard.

As another example, consider FIG. 11 which shows another illustrative embodiment of the guide's display screen when a collaborative tool such as a shared whiteboard is implemented and the frame layout in the remotely displayable frames 1010 is but a single frame (i.e. the frame layout of FIG. 4A). Using the shared whiteboard, the client and specialist can exchange notes and diagrams. This frame 1102 contain a Web page having information on Adapt/X products.

Shared pointer 1103 can also be implemented so that the guide can elaborate on a question from the client. The guide can tell the client to "click here" via the whiteboard method for further information as depicted at 1104 and can circle a feature of the Web page, as shown at 1106, and write that these are "target Ads" in response to a question posed by a client using the whiteboard method.

Alternatively, the client can show items to the guide/specialist. For example, suppose a client is having problems running an application program. The guide can load a Web page containing a chat applet. The client can paste a suspect configuration file into the chat applet. The specialist can edit the file and the client can paste the file back into her application so that the application runs properly.

The help desk could optionally be a video help desk. Users of a video help desk would need a soundcard and microphone hooked up, a video camera, and videoconferencing software. If the guide/specialist has a video detailing a solution to the problem, it is a simple matter to start the video playing in one of the remotely displayable frames 1010 and then the specialist can aid the next user with a problem. The videoconference can be started merely by the specialist loading the appropriate Web page into the desired frame of remotely displayable frames 1010.

2. Sales and marketing environment

In a sales and marketing environment, if a user (i.e. client) requires personal assistance in finding information on a Web site, a real-time, interactive session can be constructed for the client to ask questions of the sales person when a Hamelin link is followed. The salesperson (i.e. guide) can show the client Web pages and/or Internet Resources such as a product in an electronic catalog. The salesperson can then immediately take the client to a Web page to purchase the item. The salesperson and client can engage in a collaborative conference to further facilitate the exchange of information. The operational environment of the Sales application is commensurate with the operational environment of the Help desk.

3. Educational environment

In an educational environment, learning and education can occur using a live, interactive session between a teacher (i.e. guide) and a plurality of students (i.e. one or more clients). The teacher has fast random access to a host of Internet Resources which include text, images, video and audio clips; Web pages; and collaborative tools such as chat programs and whiteboards. By way of example, a remotely displayable frame can contain a JPEG image of a viewgraph; a live audio/video feed; a distributed pasteboard for exchanging and editing text files; and a distributed whiteboard for joint editing of pictures. A chat program such as a chat applet can be implemented to enable students to ask the teacher questions.

Alternatively, in lieu of the live, interactive session, the session can be a recorded session which presents lessons, guest speakers, and how-to courses. Any of the live, interactive sessions can be recorded for later playback and/or editing. The session can be saved in a file and later played back on demand or at scheduled times for large numbers of students to watch.

4. Intercasting environment

Intercasting is the simultaneous delivery of synchronized Web pages along with other broadcast medium such as television and radio. For example, Internet Resources can be transmitted as data into a television broadcast. For recorded events, the Hamelin system is arranged with an editor and playback tool to associate Web pages with times and events in the broadcast for recorded events. For Web guided tours, the Hamelin system provides clients with an overview of the highlights of a Web site by providing an audio and video tour supplemented with Web pages from the site.

5. Guided tours of the WWW

A guided tour of the WWW is another application. A guide can record a set of tours and any number of users (i.e. clients and guides) can later follow the tour. Typically, the tour will be accompanied by an audio and/or video track describing the places that the guide is taking the client. The tours can be organized so that a client can join the tour in progress or can start a recorded tour on demand. Clients can drop out of a tour to explore on their own at any point.

The Hamelin system (particularly the editor) can be used to construct tours of points of interest in the whole WWW or a tour of a company's individual Web site. For example, a tour of legal resources available on the Web such as the Federal Register, state and Supreme Court case law, Federal Rules of Civil Procedure and statutes available can be recorded. A legal practitioner can use this tour to learn about legal research resources available on the Web.

C. The architecture of the Hamelin System

Figure 1:
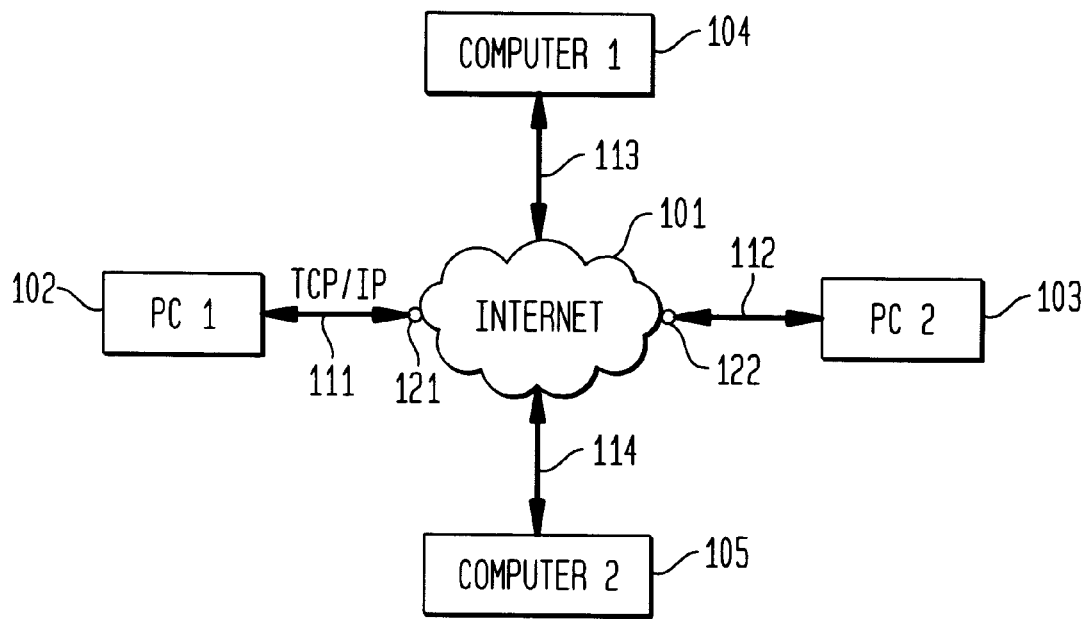
FIG. 1 is a pictorial representation of the Internet with certain users and computers pertinent to the present invention explicitly shown.
Figure 2:
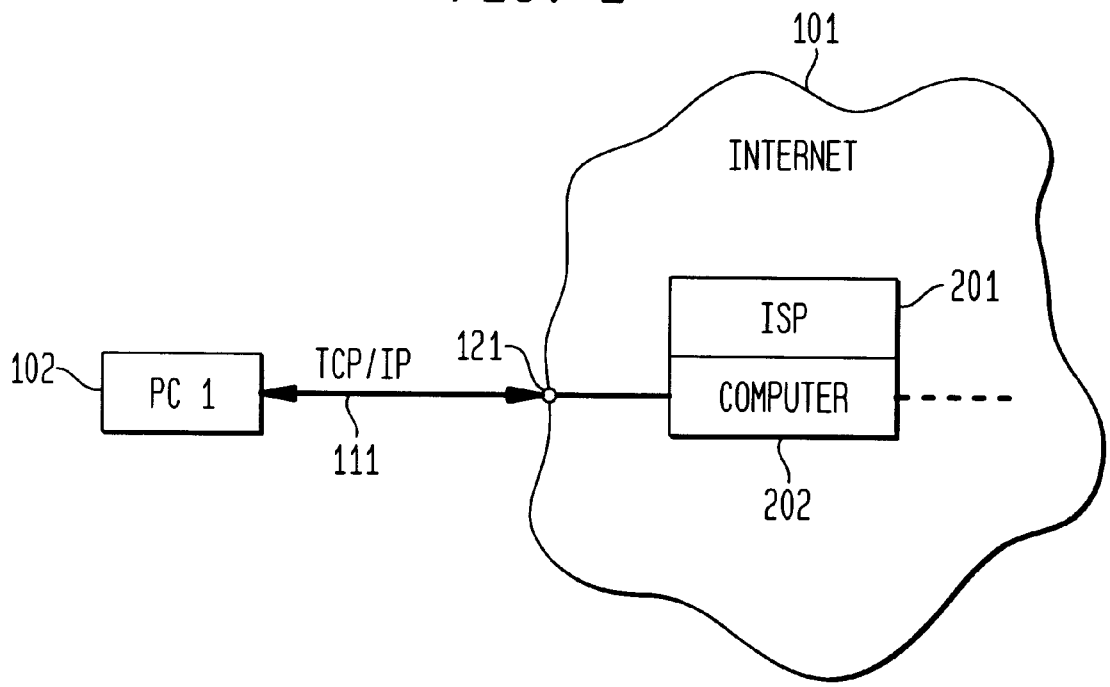
FIG. 2 depicts one illustrative method for accessing the Internet using an Internet Service Provider (ISP)
Figure 3:
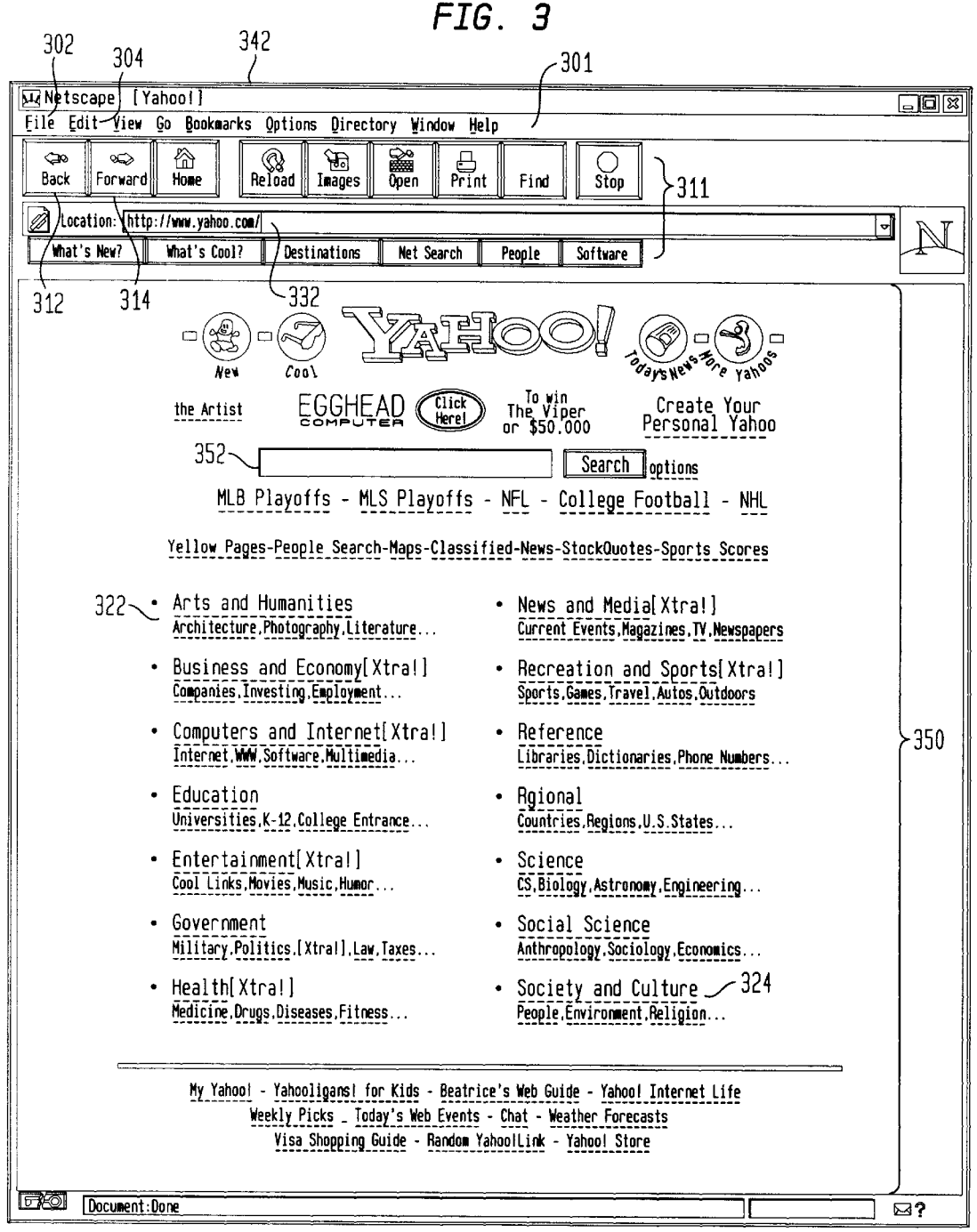
FIG. 3 depicts one illustrative embodiment of a browser which renders a Web page.
Figure 4:
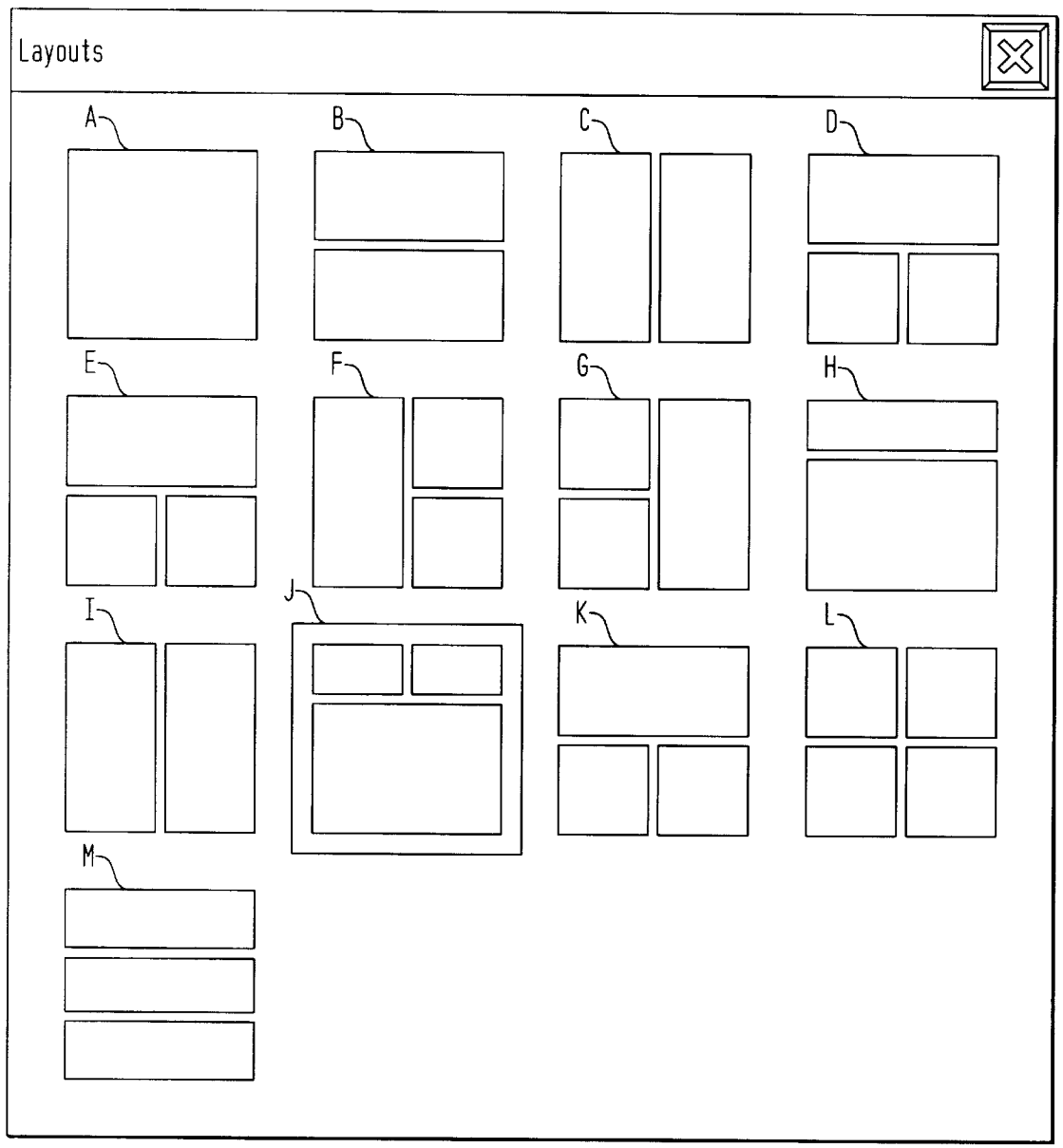
FIGS. 4A–4M shows several embodiments of predefined frame layouts.
Figure 12:
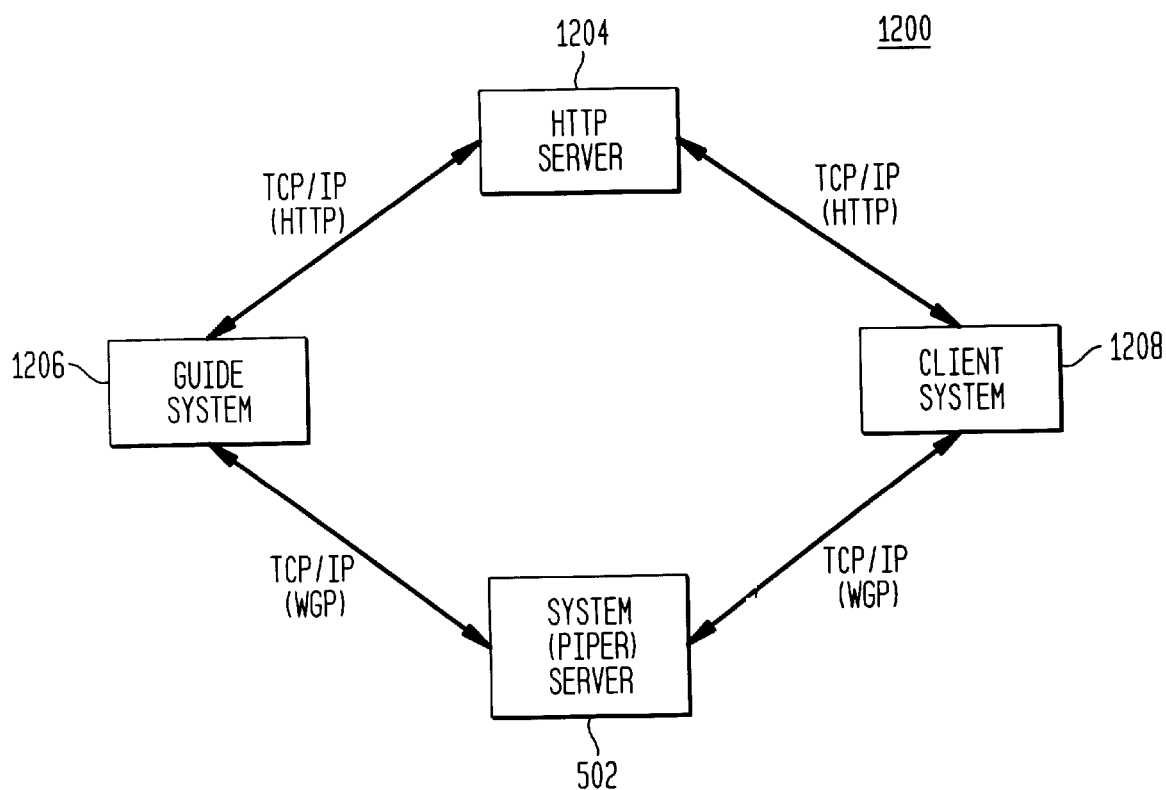
FIG. 12 is a high-level block architectural diagram of an illustrative of a logical view of the Hamelin system.

FIG. 12 shows a high-level block diagram of one illustrative embodiment of the Hamelin system 1200, a system for managing interactions between users (i.e. guides and clients) in a browser-based telecommunications network. System 1200 includes the following elements: system (piper) server 502; HTTP server 1204; at least one guide system 1206; and at least one client system 1208. With reference to FIG. 1 for comparison and contrast, the arrangement of system 1200 provides a logical view of the system in accordance with the present invention, as distinct from a physical implementation. In terms of actual physical implementation, communication via the browser-based network among servers 502 and 1204 and guide system 1206 and client system 1208 uses packets propagating serially based upon the TCP/IP protocol. But, note that guide system 1206 only communicates directly with HTTP server 1204 and system server 502; server 502 only communicates directly with guide system 1206 and client system 1208; client system 1208 only directly communicates with servers 1204 and 502; and, finally, server 1204 only communicates directly with systems 1206 and 1208. Accordingly, system 1200 represents a logical model for the inter-element communications, with the direct communication paths shown as separate logical paths. This model is used for elucidation purposes so as facilitate the detailed description; however, the physical implementation depicted by FIG. 1 is actually utilized in practice.

Piper server 502 communicates using a Web Guide Protocol (WGP) which is written on top of TCP/IP. HTTP server 1204 communicates using the HTTP protocol. Guide system 1206 and client system 1208 both communicate using TCP/IP.

Figure 13:
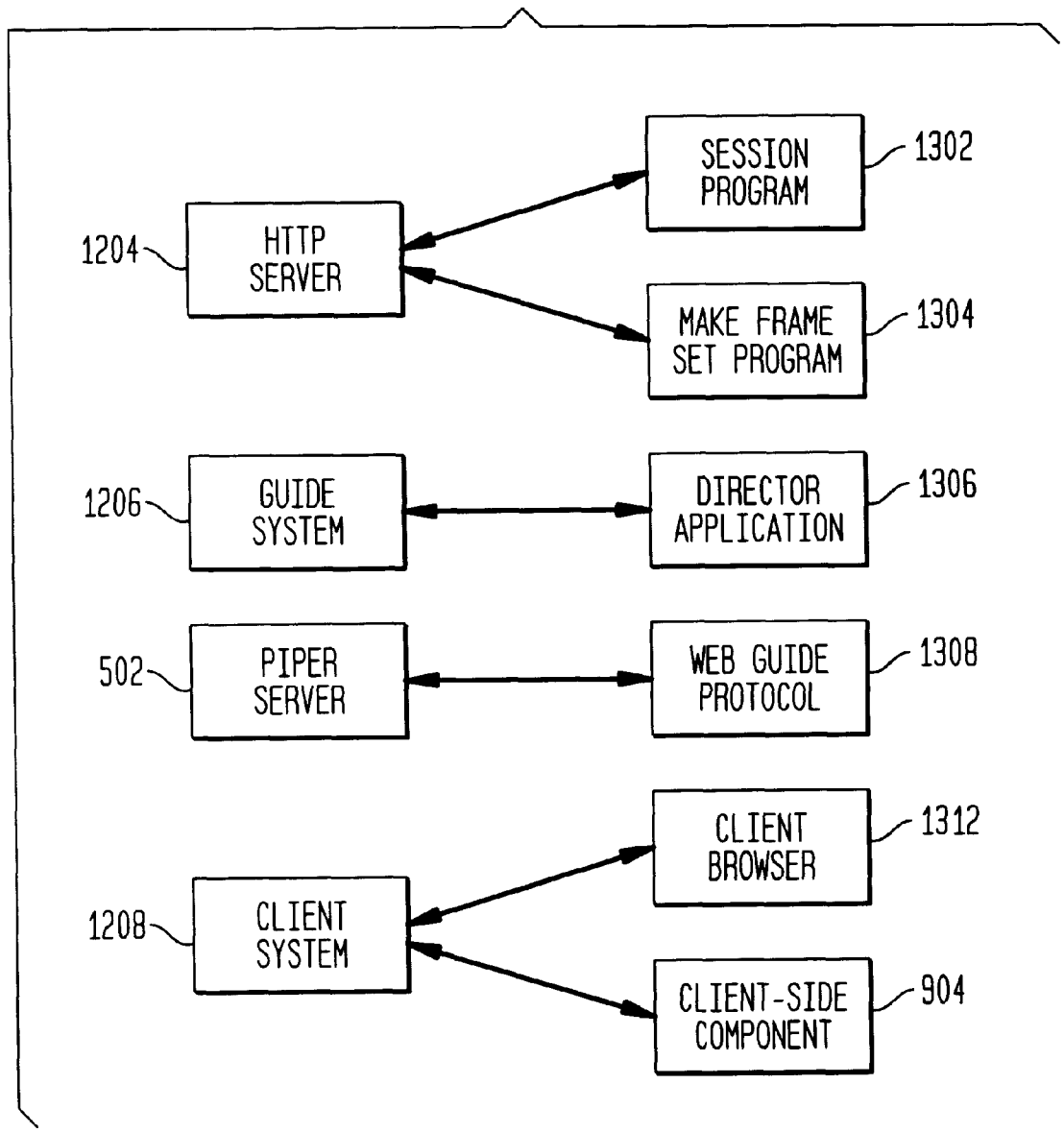
FIG. 13 is diagram of software components associated with elements of the architecture depicted in FIG. 12.

Each of the elements in FIG. 12 has one or more associated software components as depicted in FIG. 13. HTTP server 1204 has two Common Gateway Interface-Binary programs (cgi-bin programs) that include Session program 1302 used for session construction and management and MakeFrameSet program 1304 used to create frame layouts. Guide system 1206 has a software component called director application 1306, which includes the realization of the "special-purpose" browser. Piper server 502 has WGP 1308 for communicating with guide system 1206 and client system 1208. Client system 1208 has software components that include client Web browser 1312 and client-side component 904.

1. HTTP Server 1204

The HTTP Server 1204 is conventional and typically works as described in the Background of the Invention Section. It contains additional programs in its cgi-bin directory, namely Session program 1302 and the MakeFrameSet program 1304, discussed below. HTTP Server 1204 in the Hamelin System particularly executes as follows.

In order to start a session between the guide and a client, the client typically selects a Hamelin link on a Web page displayed in the client Web browser 1312. The Hamelin link issues a so-called GET QUERY command to HTTP server 1204. This command causes HTTP server 1204 to invoke Session program 1302 (session.exe) in the cgi-bin file directory to initiate a session between the guide and client.

Session program 1302 is used for session construction and administration. Session program 1302 is multifunctional, depending on client's/clients' request(s), and includes these options to: create a live session; start a stored session; list active sessions, allow clients to join already running sessions; list the guide and/or clients participating in a session; remove a session and all connected users; and/or remove a client from a session.

Figure 14:
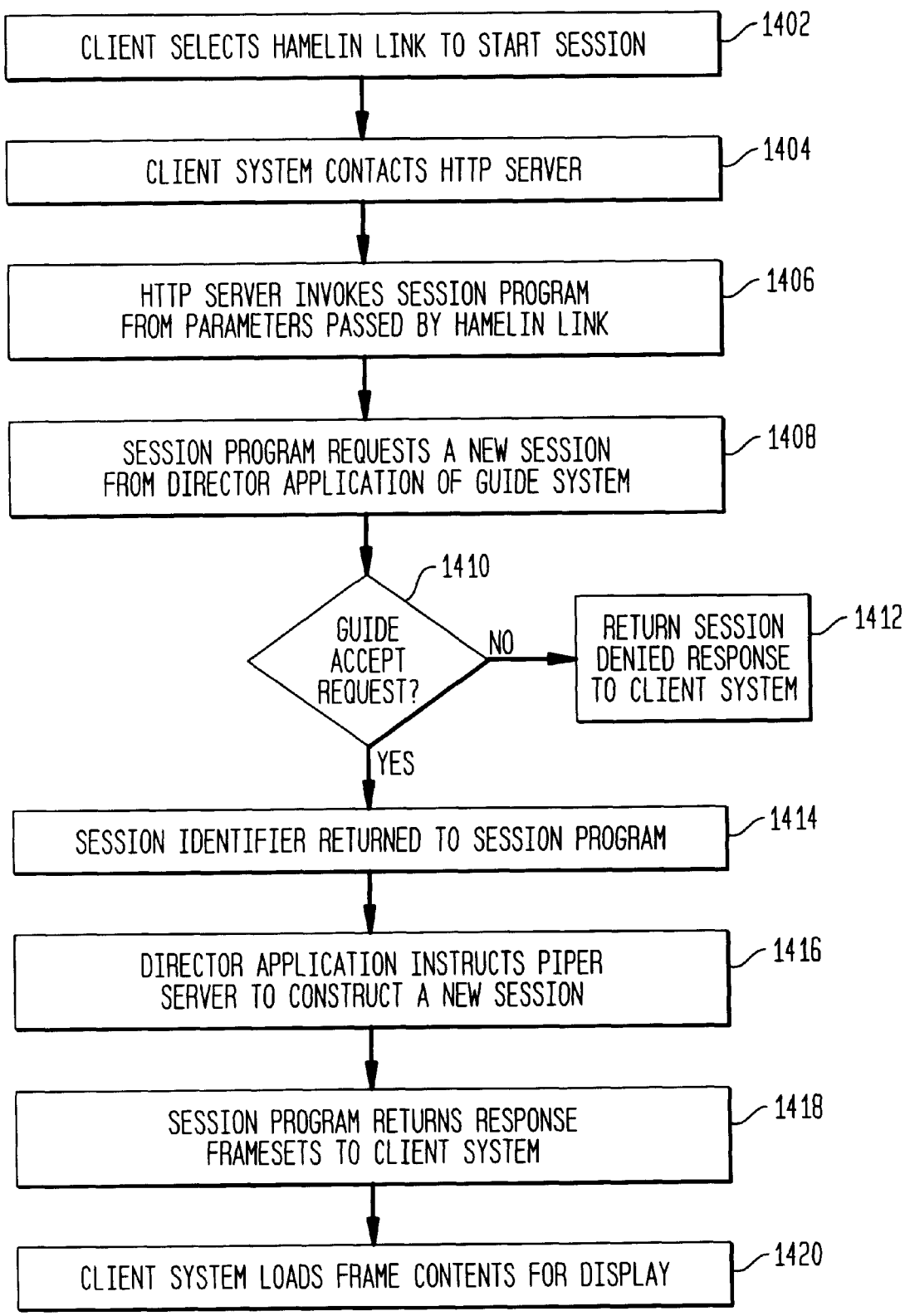
FIG. 14 is a flow diagram depicting session construction.

FIGS. 14–17 show the construction of a live session in more detail. With reference to FIG. 14, process block 1402 is involved when the client clicks on the Hamelin link. The Hamelin link contains an encoded command which includes information on the HostName and the "type" of session. [The HostName is eventually provided to piper server 502 and typically, it is the name of the computer piper server 502 is running on].

Next, at process block 1404, client Web browser 1312 contacts HTTP server 1204. HTTP server 1204 invokes Session program 1302 at process block 1406. The parameters encoded in the Hamelin link are passed to Session program 1302 via the GET QUERY command issued to HTTP server 1204. Session program 1302 contacts appropriate director application 1306 at process block 1408 and, for this example, requests a new live session.

At decision block 1410, the guide decides whether to accept a request for a new session. If the guide chooses to not accept the session, then at process block 1412, a Web page is returned to the client stating that the session has been denied. If the guide chooses to accept the session, then via process block 1414, a SessionName (name of the session randomly generated in a string format) is returned to Session program 1302. Next, at process block 1416, director application 1306 instructs piper server 502 to construct a new session. The connection between piper server 502 and director application 1306 remains intact throughout the life of the session.

At process block 1418, Session program 1302 returns HTML describing two response framesets to client Web browser 1312. One frameset is presentation frameset 902 and the other frameset contains the client-side component 904. Then, at process block 1420, the client Web browser 1312 renders the display of presentation frameset 902 and the frameset containing the client-side component 904.

Figure 15:
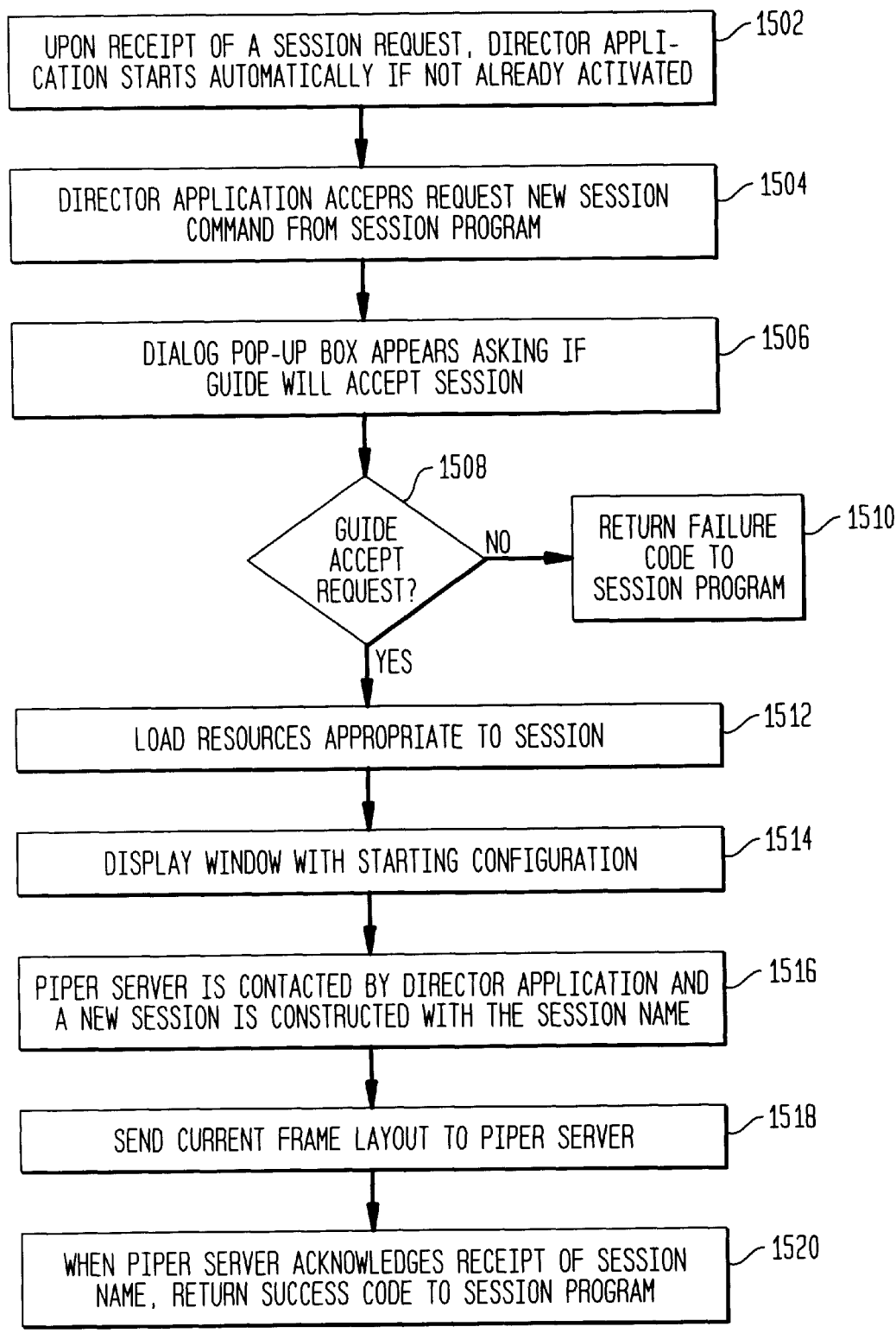
FIG. 15 is a flow diagram that depicts the actions that occur in the director application during session construction of FIG. 14.

FIG. 15 depicts what occurs in director application 1306 during session construction when the Session program 1302 is invoked to create a live session. In essence, FIG. 15 shows process blocks starting at 1408 of FIG. 14 in more detail. At process block 1502, director application 1306 is started automatically if it is not already activated upon receipt of a session request. Next at process block 1504, director application 1306 accepts the command, RequestNewSession, from the Session program 1302.

Next, at process block 1506, a dialog box appears querying if the guide wants to accept the session. After the dialog box appears, the guide must decide whether to accept the session. If the guides decides not to accept the session (process block 1508), then at process block 1510, a failure code is returned to Session program 1302. If the guide accepts the session (typically, by clicking on "okay" in a dialog box), then at process block 1512, director application 1306 loads resources appropriate to the session (i.e. introductory Web page and frame resources).

Next, at process block 1514, a display window is shown with a starting configuration. Piper server 502 is contacted by director application 1306, at process block 1516, and a new session is constructed with a unique string name given (i.e. SessionName). At process block 1518, the current frame layout is sent to piper server 502 and at process block 1520, and a success code is returned to Session program 1302 once piper server 502 acknowledges receipt of SessionName.

Figure 16:
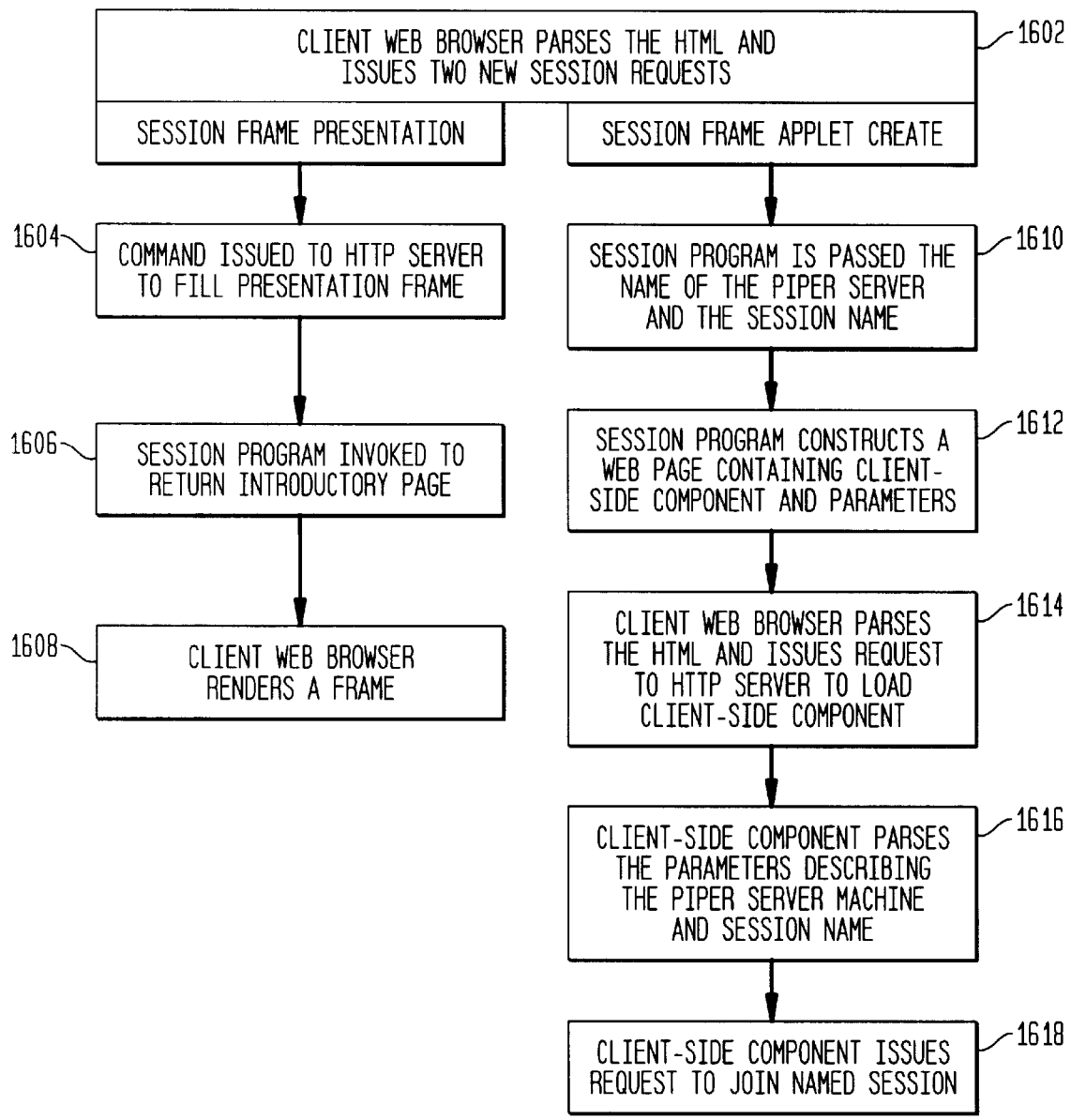
FIG. 16 is a flow diagram that depicts the actions that occur in the client Web browser to load the presentation frameset and frame containing the client-side component.

FIG. 16 depicts what occurs in client Web browser 1312 during session construction when Session program 1302 is invoked to create a live session. In essence, FIG. 16 shows process block 1420 of FIG. 14 in more detail.

At process block 1602, client Web browser 1312 parses the HTML and issues two new session requests (SessionFramePresentation (i.e. blocks 1604–1608) and SessionFrameAppletCreate (i.e. blocks 1610–1618)). Process blocks 1604–08 and process blocks 1610–1618 occur simultaneously. Process blocks 1604–08 depict the steps for the SessionFramePresentation which loads the frame contents in presentation frameset 902 and process blocks 1610–1618 depict the steps for SessionFrameAppletCreate which loads the frame contents of the bottom frame which contains client-side component 904.

Turning now to process block 1604, a command, GET QUERY is issued to the HTTP server 1204 to fill presentation frameset 902. Next, at process block 1606, Session program 1302 is invoked returning the HTML describing the introductory Web page. The introductory Web page typically tells the client to "Please wait". Next, process block 1608 is operated to display the "Please Wait" frame.

Simultaneously, at process block 1610, Session program 1302 is passed the HostName and the SessionName. The HostName and SessionName parameters originate in HTML of the Web page. The command in HTML is typically, session.exe?New_piper server where piper server is HostName. The HostName can also be set dynamically via a cgi-bin script.

Next, at process block 1612, Session program 1302 constructs a Web page that contains client-side component 904 and the parameters: HostName and SessionName. Next at process block 1614, client Web browser 1312 parses the HTML and issues a request to HTTP server 1204 to load client-side component 904. This request is typically a GET QUERY command. After client-side component 904 is downloaded at process block 1616, it parses the parameters, HostName and SessionName. Client system 1208 connects to piper server 502 using the same SessionName as provided by director application 1306. Client-side component 904 contacts piper server 502 and asks to join the named session at process block 1618.

If client-side component 904 is an applet, the applet needs to know the HostName, SessionName, the port number of piper server 502, and finally an action which is join a session in this case. When the applet is downloaded, it will contact piper server 502 and establish a communications link that will be used to accept instructions to load Web page, Internet Resources, and collaborative tools.

The underlying communications link is a TCP/IP connection from the client to piper server 502. In particular, the Web page or HTML that contains the applet is dynamically written by Session program 1302 after it has communicated with director application 1306. At this point, both director application 1306 and Session program 1302 know the SessionName. The SessionName is passed as a parameter to the client.

The default startup frameset and contents will be communicated to client-side component 904. Throughout all of this, the connection between piper server 502 and director application 1306 remains intact throughout the life of the session.

At this point, all of the communications connections are established. The session will normally now consist of commands to load frames and commands to load framesets. Commands to load frames are communicated from director application 1306 to piper server 502. Piper server 502, then communicates the commands to all the connected client-side components 904.

For the commands to load framesets, the communications path is the same, but frame layout is generated by the cgi-bin program, MkFrameSet.exe, which returns the appropriate frame layout. This application program accepts a simple string-based description (i.e. codeword) of the required frame layout, and dynamically constructs frames in the browser. The codeword contains F (construct a frame)Rm (construct m-rows) Cn (construct n-columns) where the string is interpreted as applying left-to-right, and top-to-bottom in the appropriate browser.

The string is parsed from left to right, and the frame layout is defined recursively, applying frame definitions to existing frames left-to-right and top-to-bottom. For example, F generates a single frame occupying the whole browser, C2FF generates two column frames of equal size, and R2FF generates two row frames of equal size.

Figure 17A:
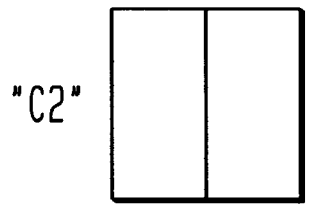
FIGS. 17A–17C is a flow diagram that depicts an illustrative example of how the MkFrameSet program dynamically creates a frame layout.
Figure 17B:
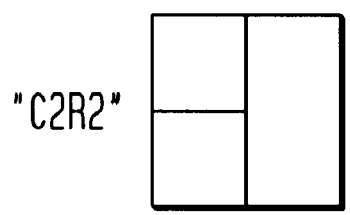
Figure 17C:
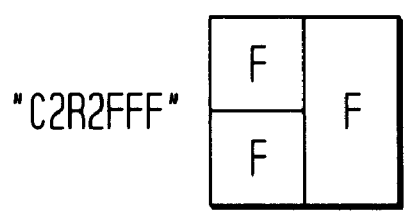

A more complicated example is C2R2FFF which is depicted in FIG. 17. The result of invoking MkFrameSet program is the generation of two column frames, with the left-hand column frame being split into two row frames. In particular, MkFrameSet program will parse "C2" and create two column frames as shown in FIG. 17A. Next, MkFrameSet program will parse off "R2" and create two row frames in the left-hand column as shown in FIG. 17B. Next, MkFrameSet program will parse off the first "F" and fill the frame of the top row frame found in the left-hand column; next parse off the second "F" and fill the frame of the bottom row frame found in the left-hand column; and then parse the final "F" to fill in the right-hand column frame, as per FIG. 17C.

One further enhancement is that the relative size of the row and column frames can also be set by following a row or column count with percentage sizes (also applied left-to-right, top-to-bottom). Thus, C2[70,30]FF generates two column frames with size ratio 70:30 (the top column being larger). Additionally, C3[30,40,30]FC2[10,90]FFF will generate three column frames, the middle frame being larger than the left frame and right frame. The middle column frame has two row frames, the top frame being nine times smaller than the bottom row frame.

4. Guide system and director application

As previously mentioned, guide system 1206 has a software component called director application 1306 that enables the guide to have fast random access to Web pages, Internet Resources, and collaborative tools, that is, basically anything available on the Web and created for use in the Internet (or even an intranet or an extranet). Director application 1306 allows flexible use of the display screen.

a. How the Guide Changes the Frame Layout and the Frame Contents

Figure 18:
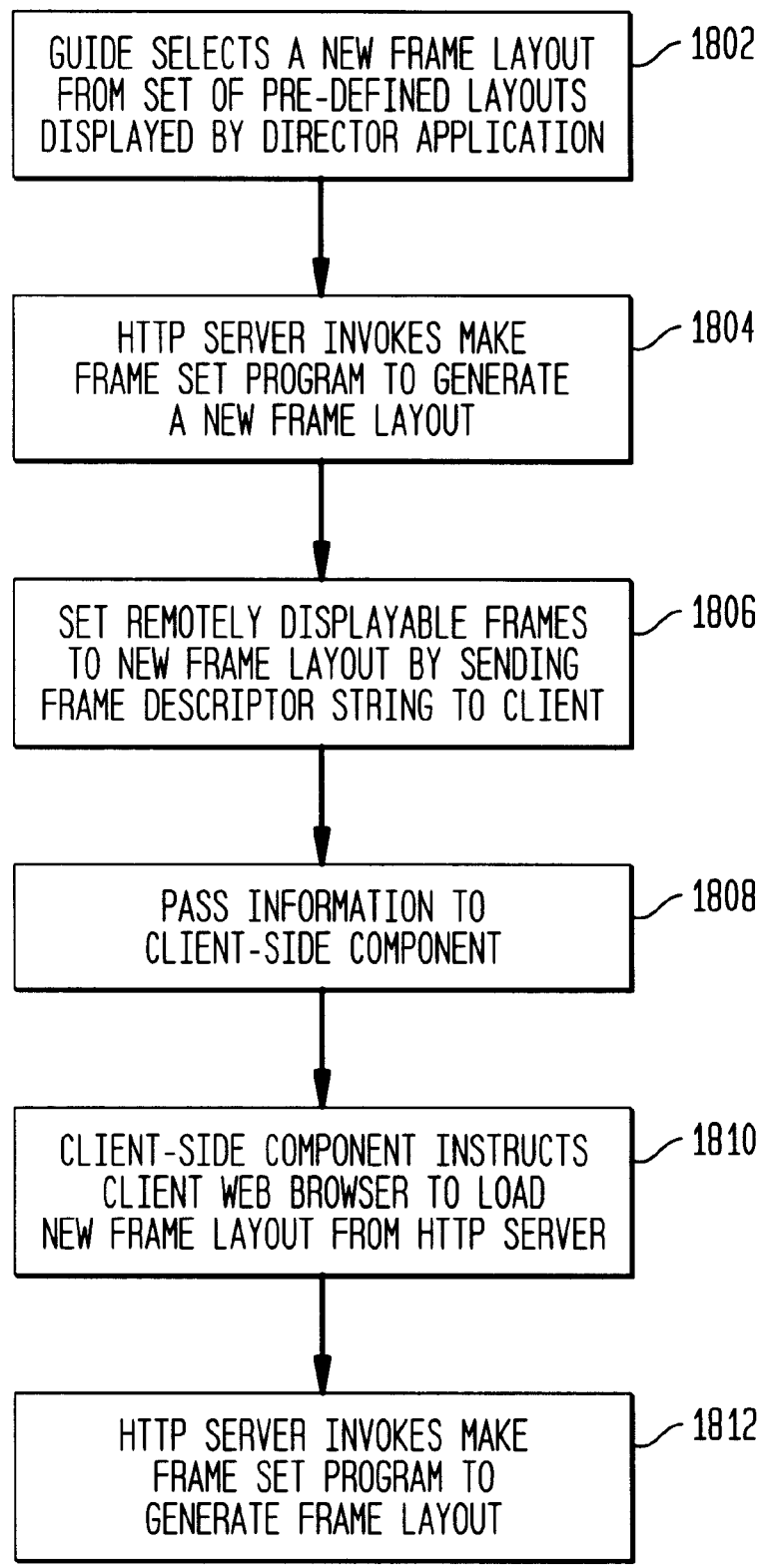
FIG. 18 is a flow diagram that depicts operations of the director application to change a frame layout.
Figure 19:
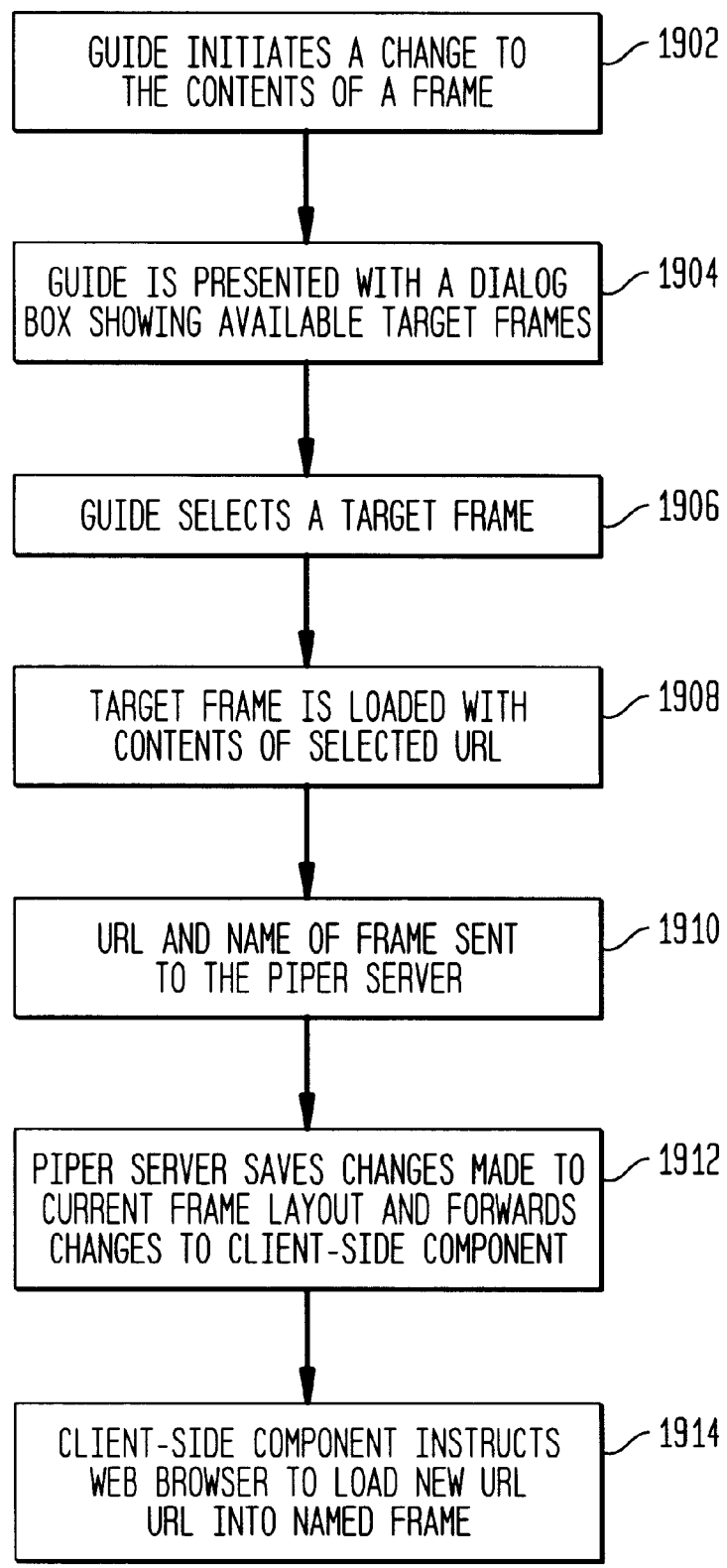
FIG. 19 is a flow diagram that depicts operations of the director application to change the contents of a frame.

As previously discussed, the guide can change framesets, frame layouts and frame contents at will. FIGS. 18 and 19 depict the steps taken to change the frame layout and frame contents respectively. Changing a frameset involves first changing the frame layout (per FIG. 18) and then the frame contents (per FIG. 19) are changed for each frame. Alternatively, the frameset can be loaded in one operation (per FIG. 20).

Turning now to FIG. 18, in order to change the frame layout, the guide selects one of the predefined frame layouts shown by director application 1306 (i.e. see explanation at FIG. 4) at process block 1802. The frame layout has a codeword (simple string-based description) associated with it.

Next, at process block 1804, HTTP Server invokes MkFrameSet program to generate a new frame layout. The codeword is used as a parameter to the MkFrameSet program.

Next, at process block 1806, director application 1306 passes an instruction to piper server 502 to invoke MkFrameSet program using the codeword as a parameter to set local-view frame to a new frame layout. Piper server 502 saves the changes made to the current frame layout, purges the current frame contents of all previously existing frames, and then passes this information to all connected clients via client-side components 904 at process block 1808.

At process block 1810, client-side component 904 instructs client Web browser 1312 to load a new frame layout from HTTP server 1204. HTTP server 1204 requests a dynamic frame layout generated by MkFrameSet Program 1304 at process block 1812. HTTP server 1204 invokes MkFrameSet Program 1304 with the appropriate codeword. MkFrameSet Program 1304 returns the HTML describing this frame layout to client PC system 1208.

Turning now to FIG. 19, there is shown the steps taken to change the contents of a frame. At process block 1902, the guide initiates a change to the contents of a frame. The contents of each frame itself can be changed in numerous ways. Some of these include: a new Web page can be loaded by selecting a resource item from one of the resource groups located in the main resource frame 1004 or frameset frame 1006; a new Web page can be loaded by dragging and dropping it from the preview frame 1008; a link on a Web page can be followed in any of the frames in the remotely-displayable frame 1010; a post method (i.e. a way that a client can send some information back to HTTP server 1204 such as typing something in a text box and clicking on the icon to submit it) or any other database query can be issued in a frame; the contents of any other frame can be dropped into the frame or sub-frame; the last Web page can be revisited; any URL maintained in the history of the frame can be revisited; a URL can be manually typed in; a frame can be cleared when a new frame layout is requested; or a frame and the contents of all of the other frames and the frame layout itself can be changed when a new resource item is loaded. Using director application 1306, the guide initiates one of these changes.

Next, at process block 1904, the guide is presented with a dialog box showing available target frames (i.e. any of the frames in the current frame layout). At process block 1906, the guide selects (i.e. typically by clicking with a mouse), a target frame. The target frame is loaded with the contents of the new URL at process block 1908.

The URL and name of the target frame is forwarded to piper server 502 at process block 1910. Director application 1306 passes the URL of the Web page and the address of the frame it is to be loaded into to piper server 502. Piper server 502, at process block 1912, saves the change made to the current frame layout and then forwards the change to client-side components 904 of all the connected clients. At process block 1914, client-side components 904 instruct their respective client Web browsers 1312 to load a new URL into the named target frame. In response to the frame change request, at process block 1910, the client Web browser 1312 for each client issues one or more requests to Web servers 1204 for the HTML (for Web pages) and/or Internet Resources or alternatively initiates a collaborative tool.

Figure 20:
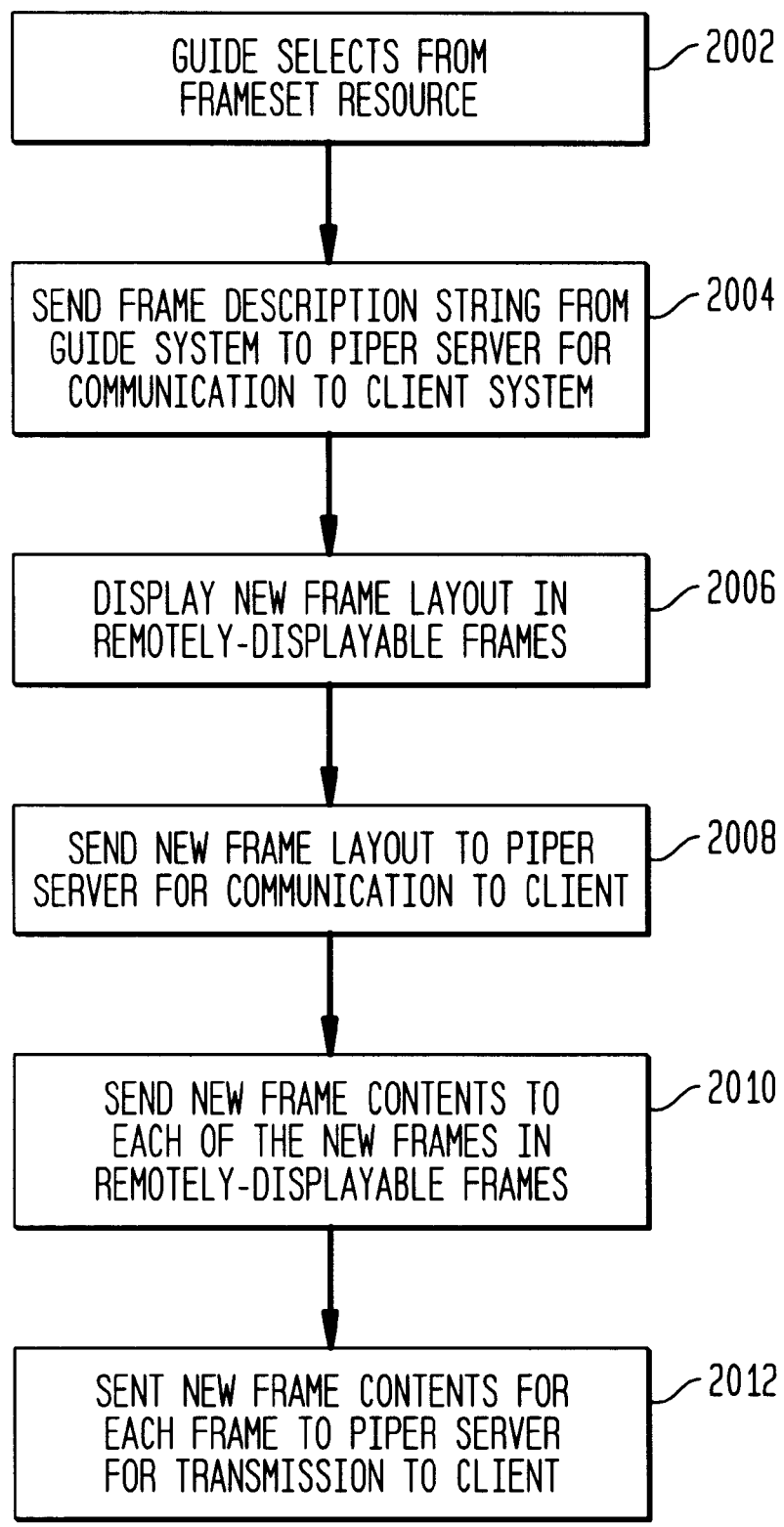
FIG. 20 is a flow diagram depicting the steps taken by the director application when recording a session.

With reference to FIG. 20, there is shown a method for loading a frameset in one operation. At process block 2002, the guide selects a predefined frameset from the frameset frame 1006. Next, at process block 2004, director application 1306 sends a frame description string to piper server 502 for communication to clients. A new frame layout is displayed in remotely displayable frame 1010 at process block 2006. The new frame layout is sent to piper server 502 for communication to all connected clients at process block 2008. Next, at process block 2010, the new frame contents are sent to each of the new frames in remotely-displayable frame 1010. Finally, at process block 2012, the new frame contents for each frame are sent to piper server 502.

b. The Remote Procedure Call Interface

Director application 1306 has a Remote Procedure Call (RPC) interface. An RPC is a way for a program to call a function on another computer or another process on the same computer. The RPC interface allows two computers to communicate and send messages. The RPC interface of director application 1306 has two methods (RequestNewSession, and RequestPlay) and it is only used during session setup. It is connected to Session program 1302 when a new live session is started using the Request-NewSession. It is defined by a standard Interface Description Language (IDL) interfaces file. After the guide accepts or declines the session, the RPC connection is dropped. The format of the RequestNewSession command includes the following parameters: RemoteHost (host name), RemoteAddress (client IP address), QueryString (everything up to and including session program), SessionType (i.e. NEW, A-NEW, DEFAULT, etc.), and SessionName.

The RPC interface is also used once for each recorded session via the RequestPlay. The parameters are just like those included in the session.exe?REPLAY invocation.

c. Internal Objects

The director application 1306 is, in a preferred embodiment, an event driven, basically single threaded multiple-document, Microsoft Foundations Class (MFC) application. It handles three document types: live sessions, session editing, and playback of recorded sessions. Each document type has a document and view class.

d. The interface

Director application 1306 allows one or more guides to show any connected client(s) Web pages, Internet Resources or anything located on the Web as well as initiate collaborative tools. The interface of director application 1306 has a GUI as shown previously in FIG. 10. The interface has five resizable frames: recording control frame 1002, main resource frame 1004, frameset frame 1006, preview frame 1008, and remotely displayable framesets 1010. Recording control frame 1002, main resource frame 1004, frameset frame 1006, and preview frame 1008 are controls containing resources for the session.

Recording control frame: Recording control frame 1002 enables the guide to record a presentation in real-time. The recording can be paused if desirable.

Main resource frame: Main resource frame 1004 has a facility for grouping and organizing resources. At the top of the main resource frame 1004 is a pull down menu of resource groups which contain resource items. Resource items are Internet Resources, URLs (i.e. pointers to Web pages or pointers to other resource items), or collaborative tools which can be organized by subject. Resource groups are a tree of resources items that are named. This tree of resource items can be expanded (to show all of the resource items in a resource group) or contracted (to show only the main categories of resource items).

For example, there can be a resource group called pets. Within the resource group can be resource items that include dogs, birds, and fish. The resource item called dogs can be further refined to include resource items such as Chocolate Labrador, German Shepherd, and French Poodle. If the tree is contracted, then only the resource items dogs, birds, and fish will be shown to the user. If the guide expands the resource item called dogs, then Chocolate Labrador, German Shepherd, and French Poodle will be shown as well. In FIG. 10, there is one resource group called Main Hamelin Links 1012 and it contains resource items named Bellcore 1014, Catalogs 1016 and Education 1018. These resource items contain further resource items (i.e. Bellcore 1014 contains the resource items Adapt-X Rave 1020, Adapt-X Internet Solutions 1022, etc. and Catalogs 1016 contains the resource items named Oldsmobile 1024 and Sears 1026).

Since resource items can be arranged by subject, a set of resource items appropriate for the session can be selected without having to navigate through a deep tree. The contents of the tree (i.e. resource items) are shortcuts, pointers and URLs to Internet Resources, Web pages, and collaborative tools. A single Web page, Internet Resource, and collaborative tool can be referenced more than once in each resource group. Bookmarks can be utilized to identify Internet Resources, Web pages and collaborative tools that are used frequently by the guide.

Resource items can be selected by the guide and the Web page or Internet Resource that resource items point to can be placed in a frame located in the preview frame 1008 or any of the frames located in remotely displayable frame 1010. If the resource item selected is a URL to a Web page, then the browser communicates with HTTP server 1204 having that URL. HTTP server 1204 sends HTML to the browser to construct the Web page.

Resource groups and resource items that the guide uses are loaded in the main resource frame 1004 when the session is initiated.

Frameset frame: Frameset frame 1006 contains resource groups (described previously when discussing the main resource frame) and also framesets. Groups of framesets (i.e. frame layouts and its contents) can be arranged in exactly the same way as resource groups. Bookmarks can be utilized to identify Internet Resources and Web pages that are frequently used by the guide.

Selecting a resource item in the frameset frame 1006 constructs a new frameset (i.e. introduces a frame layout and fills the contents of the frames which comprise the frame layout at the same time). This is advantageous since the guide does not have to load Web pages, Internet Resources, etc. into each frame individually, can predefine what will be shown to a client, and saves time.

Preview frame: Preview frame 1008 contains a browser which provides the guide with the capability to view a Web page and Internet Resource first before allowing the client to see it. Actions such as double-clicking on a resource item loads it into the preview frame 1108. This allows the guide to make sure the correct information is shown before it is displayed to the client.

The contents of preview frame 1008 are not immediately shown to the client and can be thought of as a scratch pad to finding Web pages and Internet Resources. The scratch pad can be used to follow links from a Web page until a desired Web page is reached; to access a search engine and issue queries; to be used to preview and insure the appropriate Web page or Internet Resource is going to be shown to the client; and to use for any of the other available ways that the Web is navigated. When the desired Web page is found, it can be pasted into any of the frames in remotely displayable frame 1010 which are visible to the client.

Remotely displayable frames: Framesets 1010 contains a personal browser that shows what the client(s) sees on the client Web browser 1312. Director application 1306 will ensure that anything located in framesets 1010 will be automatically shown to all connected clients. The information displayed on client Web browsers (except for the frame containing the client-side component 904) is an exact mapping of the contents of the guide's remotely displayable frames 1010.

Just like any other browser, the personal browser of framesets 1010 is fully programmable and supports such features as applets, plugins, scripting, and ActiveX controls to add intelligence and interactivity to Web pages. Framesets 1010 maintain its own history (i.e. a listing of the URLs most recently visited).

Each frame can be thought of as a fully featured Web browser so the frames can contain any content normally associated with the Web. This includes Internet Resources such as images, text, tables, forms, and plugins playing video or audio. Useful plugins could include a whiteboard shared between the client and the guide, a window containing a chat program (i.e. the client can ask questions of the guide), and an applet implementing videoconferencing. All of these permit predefined resource items to be shown to the client by the guide.

e. Session Editor

Besides allowing a live, interactive session between users, director application 1306 has the capability to provide recording of sessions, later playback of a recorded session, and editing of a session.

1. Recording a session

A recording of a session allows any user (i.e. guide or client) to construct a tour of the Web. The recording of the session and any editing to the session is constructed off-line. The steps taken by director application 1306 when recording a session are as follows: (1) a real-time event such as loading a frame layout, loading a Web page, or loading a frameset has occurred; and (2) if the director application 1306 is recording (i.e. the client or guide has selected recording and paused is not selected), then the real-time event and time is saved in an event list. This process continues until an action such as pause is selected.

2. Playback of a Session

When clients on the Web request playback of a recorded session, no action is required by the guide. To start a playback of a session, the appropriate item is selected from the main menu. A file is selected and a control window then opens. A control window allows the client to start, stop, and seek in the animation as well as control whether the animation loops or automatically deletes itself when the animation finishes. For demos and previewing, a browser that will show what the remote clients will see is also supported. This is launched when an appropriate button or menu item is selected.

Figure 21:
FIGS. 21, 21A, 21B are flow diagrams of the steps taken when a client requests playback of a session.
Figure 21A:
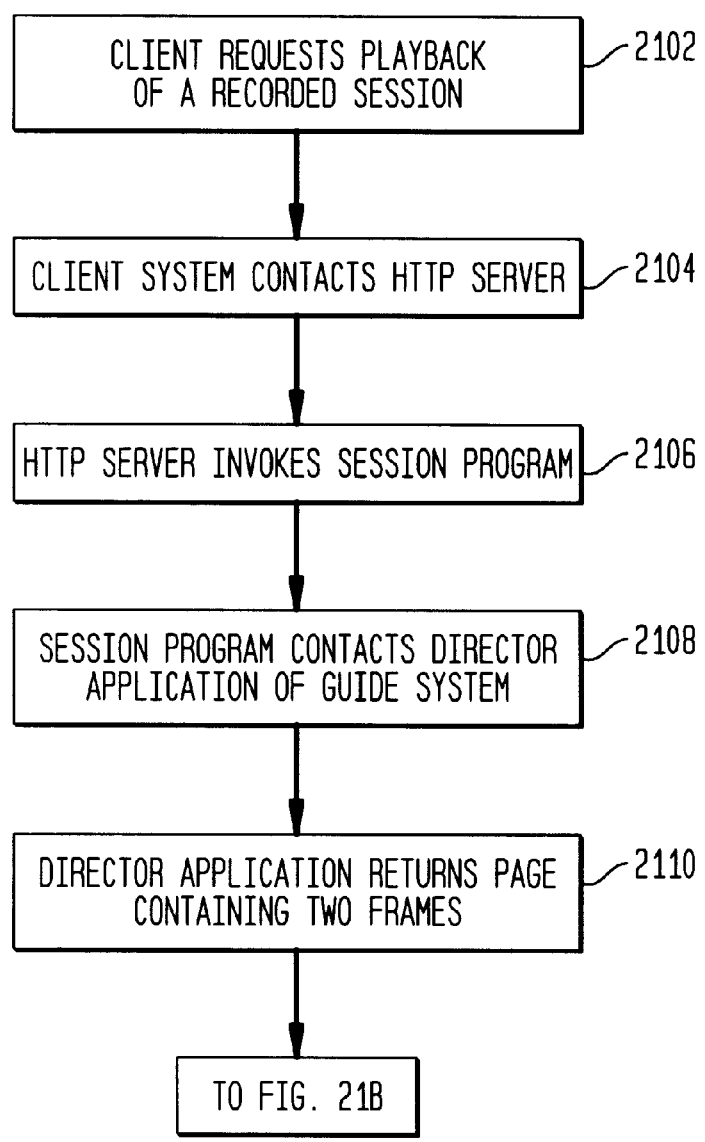
Figure 21B:
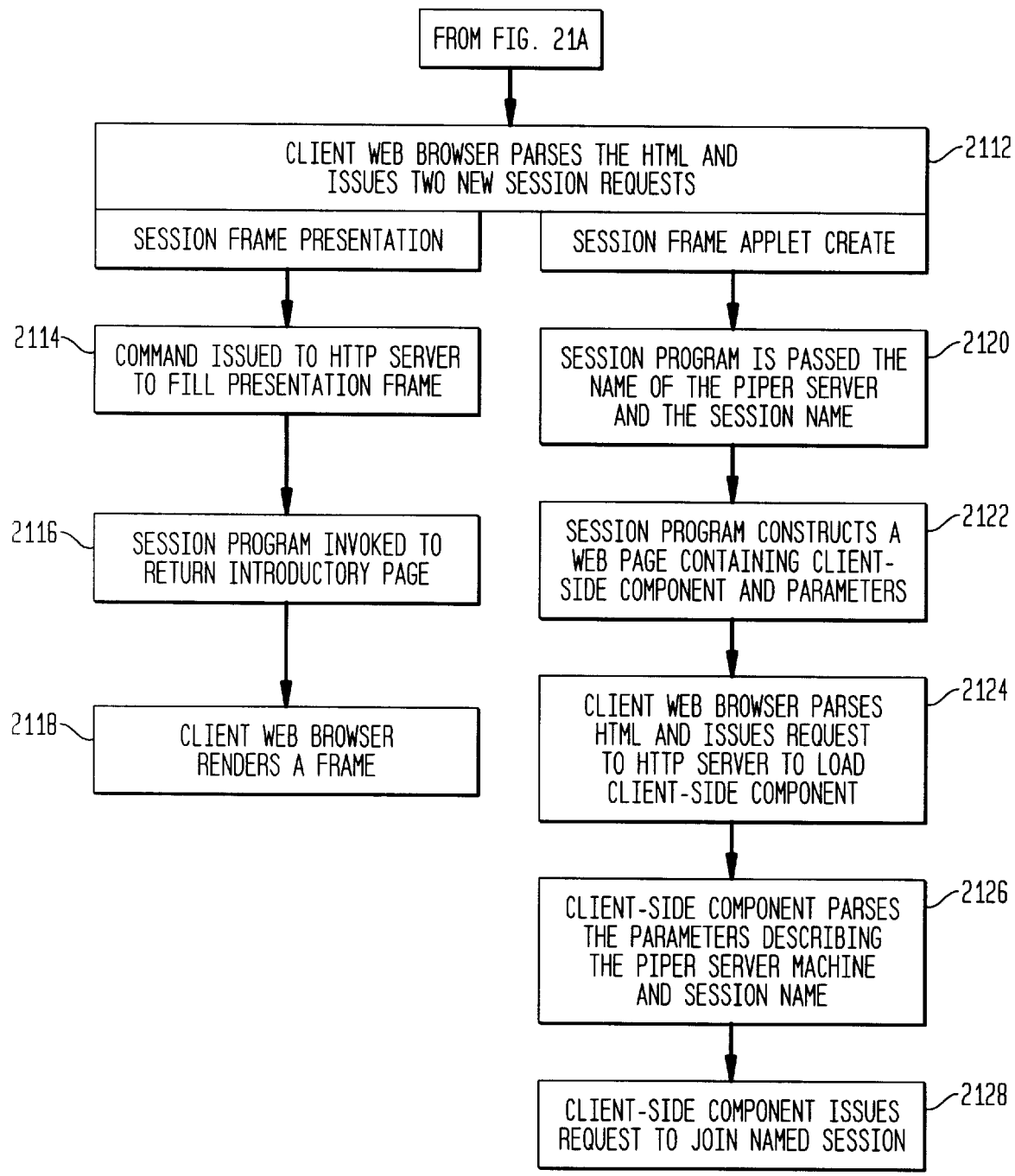

Director application 1306 can play back recorded sessions on demand from a client or under the guide's control. FIG. 21 shows the a flow diagram of the steps taken when a client requests playback of a session. At process block 2102, a client requests playback of a recorded session by clicking on a hyperlink such as "Replay Session". There is a command associated with this text hyperlink which is invoked when the hyperlink is selected. An example of the command is HREF="http://../session.exe?REPLAY+vpc24+/a.dan+TRUE+TRUE+FALSE+100" >Replay Session</a>. Vpc24 is the machine name and the filename to be played is "a.dan". Options following the filename (i.e. a.dan) are: control looping (determines whether the presentation starts again at the beginning after reaching the end), autostart (determines whether the presentation starts automatically, or whether it is started manually (by clicking on a button)), speed (set faster or slower which is useful when preparing a presentation), and whether service should be destroyed at the end of playback.

Next, at process block 2104, client Web browser 1312 contacts HTTP server 1204, and at process block 2106, the HTTP server 1204 invokes the cgi-bin program session.exe.

In this case, the session.exe contacts appropriate director application 1306 through an RPC interface and requests that the file be played at process block 2108. At process block 2110, director application 1306 returns a Web page containing two frames.

At process block 2112, client Web browser 1312 parses the HTML and issues two new session requests (SessionFramePresentation and SessionFrameAppletCreate). Process blocks 2114–18 and process blocks 2120–2128 occur simultaneously. Process blocks 2114–18 depict the steps for the SessionFramePresentation which loads the frame contents in the presentation frameset 902 and process blocks 2120–2128 depict the steps for SessionFrameAppletCreate which loads the contents of the frame which contains the client-side component 904.

Turning now to process block 2114, a GET QUERY command is issued to HTTP server 1204 to fill the presentation frameset 902. Next, at process block 2116, Session program 1302 is invoked returning the HTML describing the introductory Web page. The introductory Web page typically tells the client to "Please wait". Next, at process block 2118, client Web browser 1312 renders a frame.

Simultaneously, at process block 2120, Session program 1302 is passed the name of piper server 502 and the SessionName. Next, at process block 2122, the Session program 1302 constructs a Web page that contains client-side component 904 and the HostName (name of piper server 502), and SessionName parameters. Next at process block 2124, client Web browser 1312 parses the HTML and issues a request to HTTP server 1204 to load client-side component 904. This is typically a GET QUERY command. After client-side component 904 is downloaded at process block 2126, it parses the parameters describing HostName and SessionName. Client PC system 1208 connects to piper server 502 using the same SessionName as director application 1306. This is accomplished when client-side component 904 contacts appropriate piper server 502 and asks to join the named session at process block 2128.

Figure 22:
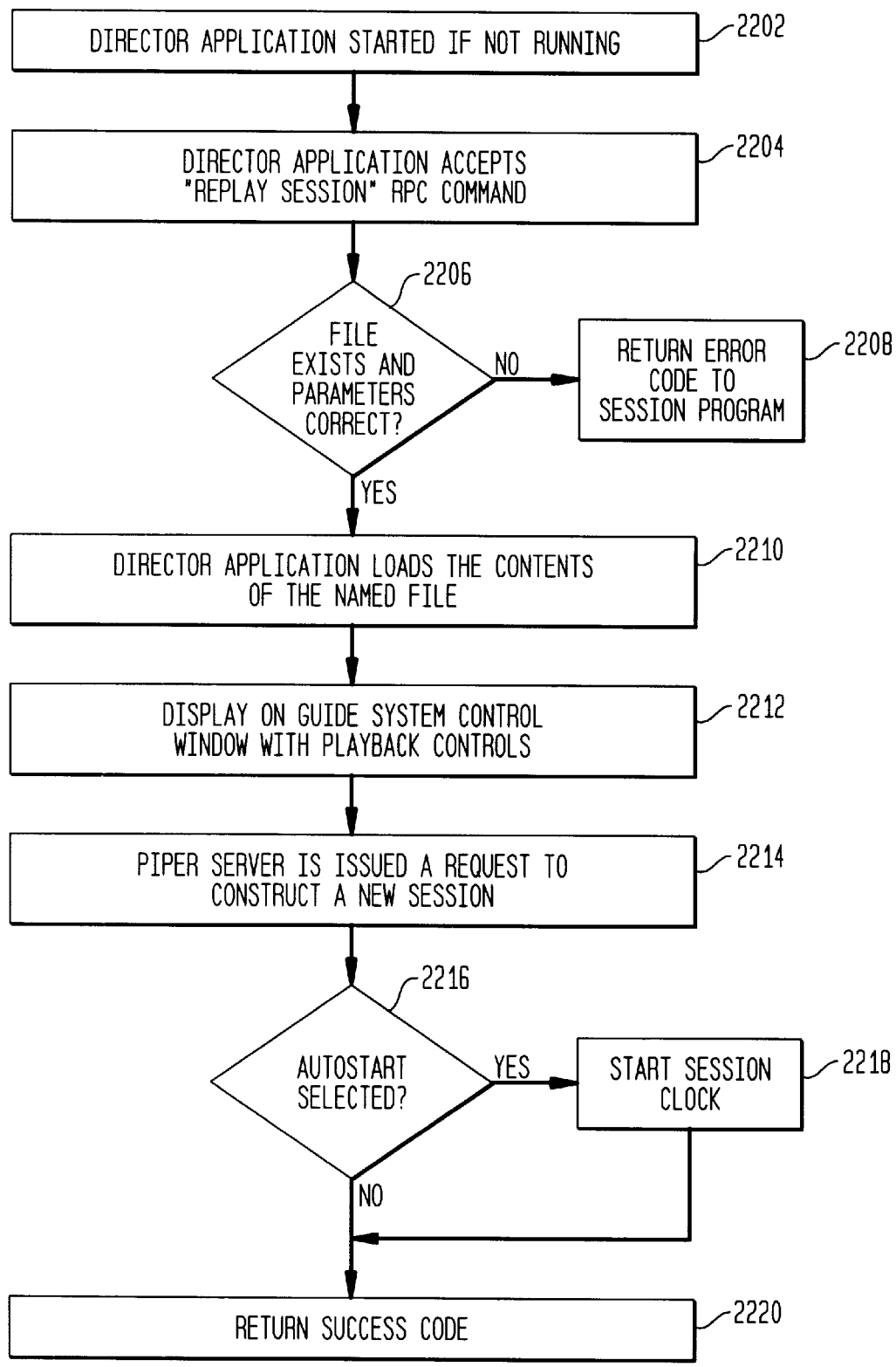
FIG. 22 is a flow diagram of the steps taken by the director application for replaying sessions.

FIG. 22 depicts a flowchart of the steps director application 1306 takes for replaying sessions. This is essentially an explanation of the steps taken by director application 1306 during process block 2108 in FIG. 21.

At process block 2202, director application 1306 is started if it is not running. Next, at process block 2204, director application 1306 accepts the REPLAY Session RPC command (using standard COM or DCOM). Then, at decision block 2206, director application 1306 determines if a file exists with the selected file name and if the options are okay. If not, then an error code is returned to Session program 1302 at process block 2208. If yes, then at process block 2210, director application 1306 loads the contents of the file name. Next, at process block 2212, a small window appears with playback controls (control looping, autostart, speed, and whether service should be destroyed at the end of playback).

Then, at process block 2214, piper server 502 is contacted and a request to construct a new session is issued. At decision block 2216, director application 1306 determines if autostart has been selected. If yes, then at process block 2218, the session clock is started. After the session clock is started or if autostart is not selected, then a success code is returned to Session program 1302 at process block 2220.

Figure 23:
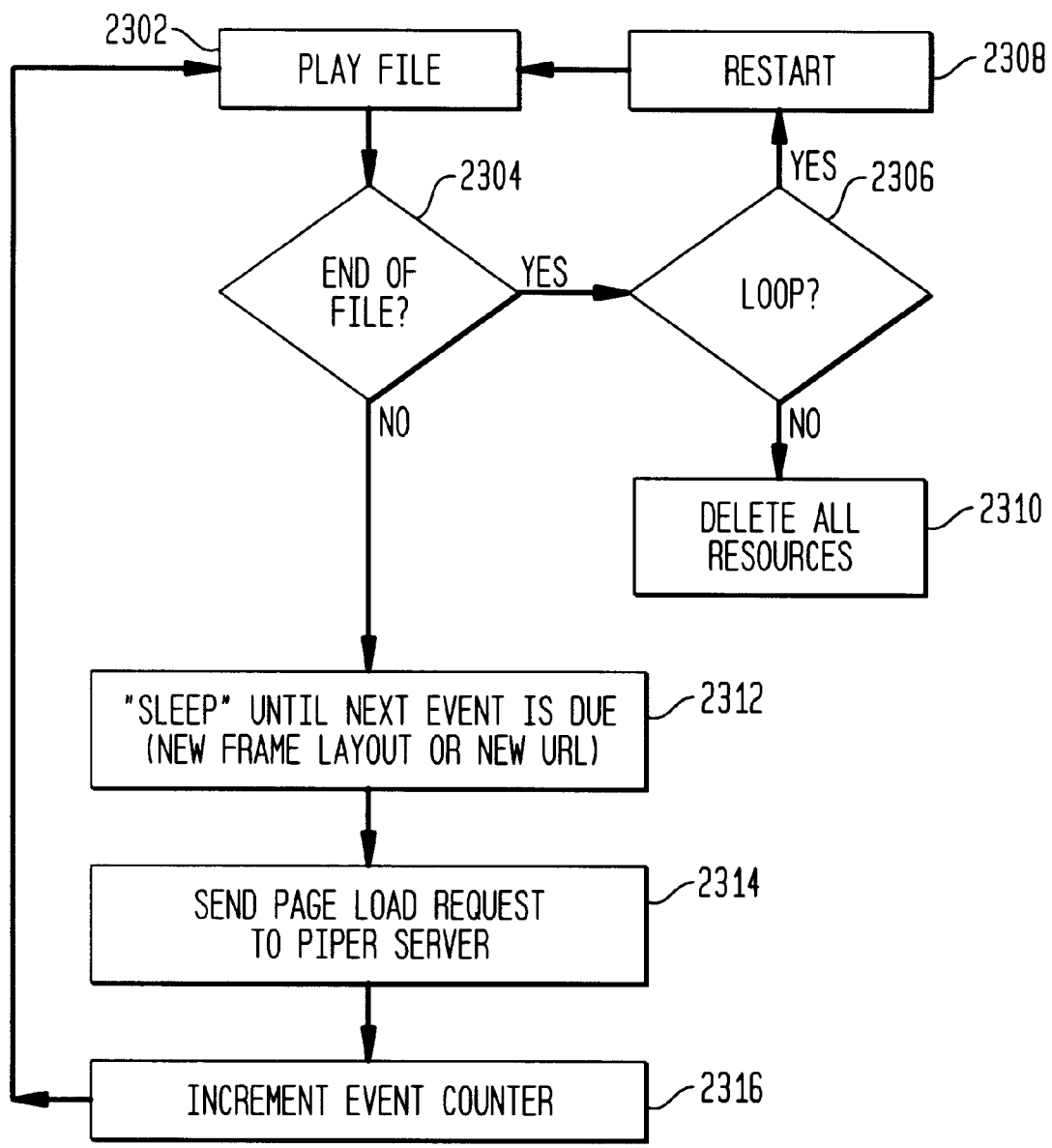
FIG. 23 is a flowchart of the steps taken by the director application during the replaying process.

FIG. 23 shows a flowchart of the steps taken by director application 1306 during the replaying process. At process block 2302, the file is playing. At decision block 2304, it is determined if it is the end of the file. If it is, then at decision block 2306, it is determined if the file has the continuous looping selected. If continuous looping was selected as an option, then at process block 2308, the file is restarted. Otherwise, at process block 2310, the session is ended and all resources are deleted.

If, however, at decision block 2304, it is not the end of the file, then at process block 2312, the director application 1306 sleeps until the next event (i.e. new frame layout, new URL is loaded into a frame, etc.) occurs. Next, director application 1306 sends a LOAD command to piper server 502 which loads a Web page at process block 2314. The event counter is incremented at process block 2316 and control is returned to process block 2302.

3. Editing a Session

Editing of a session can occur using the editor of director application 1306. One illustrative embodiment of the editor is shown in the flow diagram of FIG. 24. The editor has a GUI and contains timeline 2402 which graphically displays a plurality of time increments 2404 for the session being edited. Time increments 2404 are represented as vertical lines in FIG. 24. Each time increment 2404 delineates a point in time for the session.

Time interval 2406 (i.e. set interval of time) indicates that a fixed number of time increments 2404 has transpired. Here, time interval 2406 occurs every ten seconds of the session and are numerically designated at every tenth time increment 2404 (i.e. at 0 seconds, the time interval 2406 is represented as 0:00, at 10 seconds, the time is represented as 0:10, etc.). Time intervals 2406 can be changed, for example, to represent every five seconds of the session or any other arbitrary number.

Arrow 2408 indicates the current time. Random access to a specific point of time in the session can be accomplished by clicking on any time increment 2404 in timeline 2402, dragging the arrow 2408 to a particular time increment 2404 with a pointing device such as a mouse or using the buttons (rewind button 2410, stop button 2412, and forward button 2414).

Below timeline 2402 are timeline contents 2416 which comprises at least one content block. Each content block classifies the frame layout and frame contents at particular time increment 2404 of the session. The introduction of a new content block indicates that a new frame layout has been introduced at corresponding time increment 2404.

Figure 24:
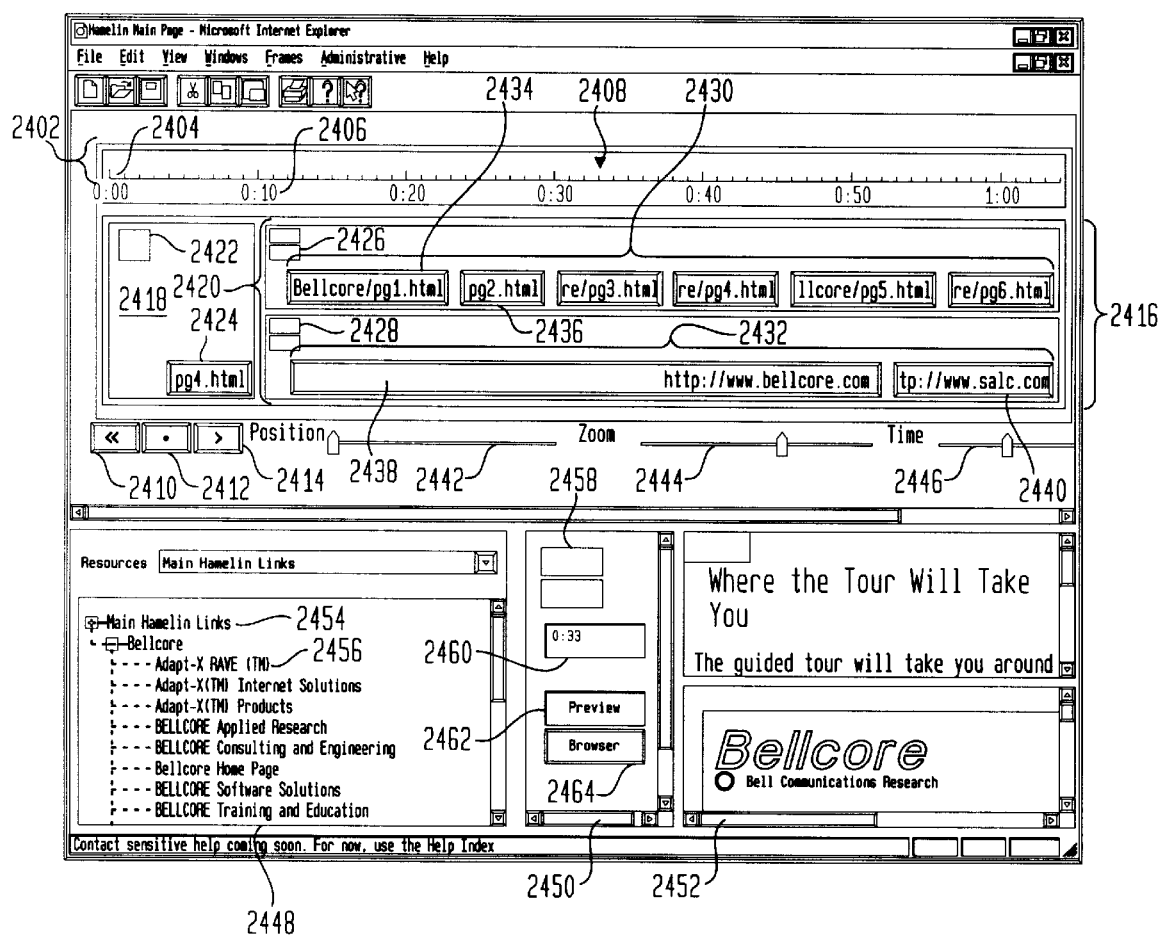
FIG. 24 is a diagram of the graphical user interface of the session editor.

In FIG. 24, there are two content blocks, content block 2418 and content block 2420. Content block 2418 is introduced at 0:00 (0 seconds) on timeline 2402 and indicates that a frame layout was loaded at this time. Content block 2420 is introduced at 0:10 (0 seconds) on timeline 2402 and indicates that a new frame layout has been introduced at this time increment 2404.

Each content block contains at least one content display, each content display having a corresponding content bar. Each content display is a graphical representation of the frame layout and a particular frame in the frame layout is highlighted. The corresponding content bar contains at least one sub-content bar indicating the Internet Resources, Web pages, collaborative tools, etc. that are loaded in the highlighted frame at a particular time increment 2404. The number of content displays in the content block is equivalent to the number of frames in the graphical representation of the frame layout (i.e. if the frame layout contains three frames, then there would be three content displays, each highlighting a different frame in the frame layout).

Applying this to FIG. 24, content block 2418 contains one content display 2422 and its corresponding content bar 2424 contains one sub-content bar. The content display 2422 indicates that the current frame layout contains one frame and this frame is highlighted or selected. The content bar 2424 contains one sub-content bar showing that a Web page having a URL address of http://bellcore.com/bellcore.pg4.html is loaded into the highlighted frame at time increment 2404 of 0:05.

At time increment 2404 of 0:10 a new content block 2420 is introduced. This signifies that a new frame layout has been loaded into the guide's PC system at this time increment of the session.

There are two content displays (content display 2426 and content display 2428), one for each of the frames in the new frame layout 2420. Content display 2426 has a highlighted frame (i.e. the top frame) and the frame contents of the highlighted frame are depicted in the content bar 2430. Content display 2428 has a highlighted frame (i.e. the bottom frame) and the frame contents of the highlighted frame are depicted in content bar 2432.

There are several sub-content bars located in content bar 2430 indicating that the information in the frame has been changed at various time increments 2404. For instance, sub-content bar 2434 shows that the Web page having a URL of http:\\www.bellcore.com/bellcore/pg1.html was loaded into the highlighted frame at a time increment of 0:10. Sub-content bar 2436 indicates that the Web page having a URL of http:\\www.bellcore.com/bellcore/pg2.html was loaded into the highlighted frame at time increment of 0:24.

There are only two sub-content bars located in content bar 2432, namely sub-content bar 2438 and sub-content bar 2440 which shows that the highlighted frame (i.e. bottom frame) initially contains a Web page and then this Web page is unloaded and a new Web page (having a URL of http://www.saic.com) is loaded at time increment of 0:50.

Situated below timeline contents 2416 are some sliders for controlling timeline parameters (position control 2442, zoom control 2444 and time control 2446). The position control 2442 which controls the window of the timeline shown on the screen. The zoom control 2444 enables the timeline to be shown in further detail. Time control 2446 is an alternative way to move indicia 2408 which shows the current time.

The lower half of the editor screen is divided into three frames, a left-hand frame 2448, center frame 2450, and a right-hand frame 2452. Left-hand frame 2448 contains resource groups, as previously described. Resource groups contain the resource items that can be loaded into any of the frames of a given frame layout. Thus, a guide can change the content of a frame at any given time increment 2404. For example, the guide can select a resource item such as "AdaptX Rave" 2456 from the resource group called Main Hamelin Links 2454. The pointer (URL, filename, etc.) to the resource item can be substituted into the sub-content bar 2436 and at 0:24 of the session, the Web page, Internet Resource, or collaborative tool that the pointer indicates will be loaded into the frame.

Center frame 2450 contains current display 2458 (the frame layout at time increment 2404 indicated by indicia 2408), time box 2460 (indicating numerically the current time, i.e. the time increment pointed to by the indicia 2408), preview box 2462 (switches on/off the browser in the right-hand frame 2452), and the browser button 2464 (causes an external browser to be spawned, and animations played there).

Right-hand frame 2452 has a browser for previewing the contents of current display 2458 at the current time (i.e. time indicated by indicia 2408 or time box 2460). As with any browser, individual frames of the frame layout can be scrolled to further view the contents of the Web page or Internet Resource.

The basic editing actions supported by the editor are inserting, moving, deleting, and copying framesets; inserting, moving, deleting, and copying URLs; and changing the time of the end of the presentation. In addition, the URL or filename contained in a sub-content bar can easily be changed by typing in a new URL or filename. The session can be edited a number of ways: individual frames or Web pages can be moved by dragging, copied by control dragging, deleted, and entirely new framesets can be inserted from a menu. New resource items can be inserted using the resource groups located in left-hand frame 2448.

The editor can be used to enhance a session containing a simple videotape or audiotape with a variety of Internet resources such as pictures and text. To accomplish this, frames and Web pages can be associated with sound and video files. By associating a URL with a video or audio file, synchronization is maintained between the HTML still frames and the video track or audio track.

5. Piper server 502

Figure 25:
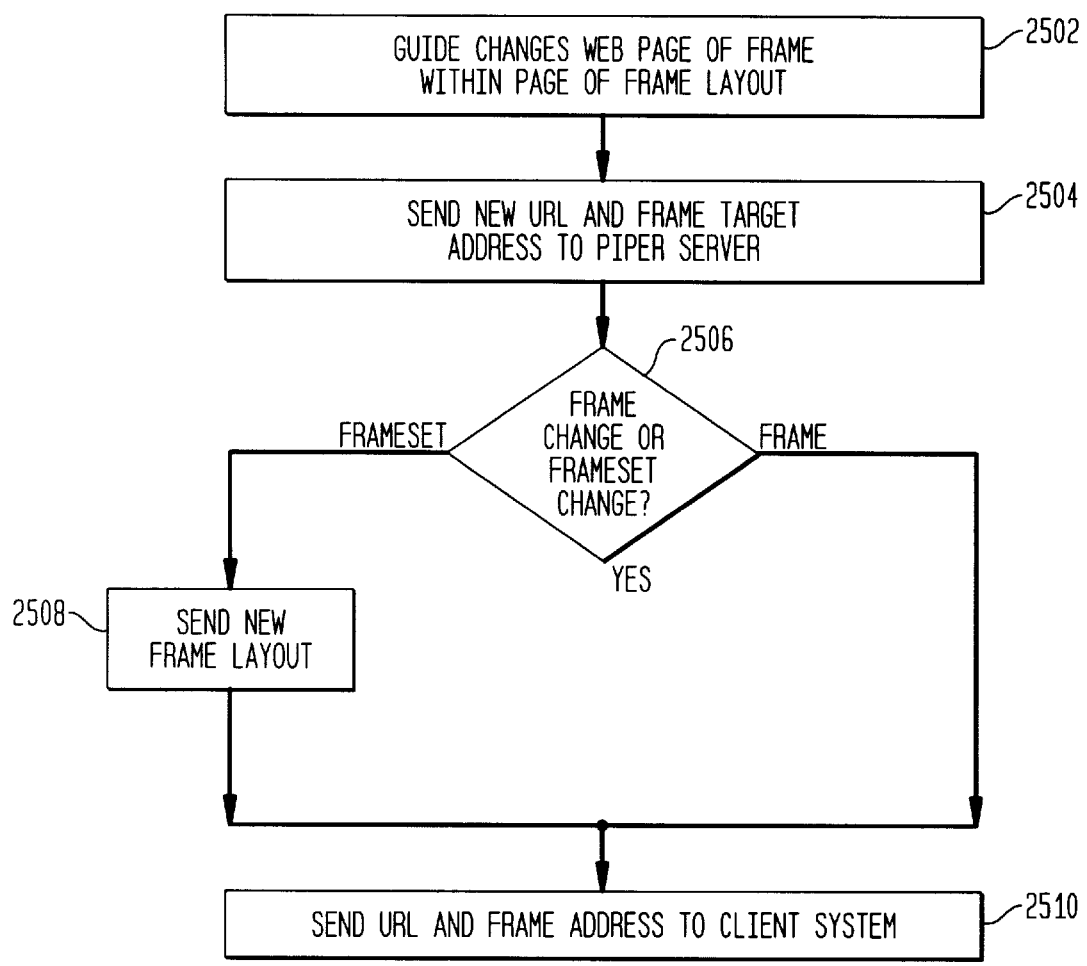
FIG. 25 is a flow diagram that depicts how page changes are communicated from the guide system to the client systems.

Piper server 502 acts as an intermediary between guide system 1206 and client system 1208. In general, the guide initiates instructions. These instructions are to load framesets, frame layouts, and/or frame contents such as Web pages, collaborative tools and/or Internet Resources. These instructions are communicated to piper server 502. Piper server 502 forward these instructions to all connected client systems through their client-side components. Each client-side component 904 orders its associated client Web browser 1312 to implement the guide's instructions.

a. How changes to a Web page, frames within a Web page, or a frame layout are implemented Turning now to FIG. 25, this is a flow diagram that depicts the details of how changes to a Web page, frames within a Web page, or a frame layout are implemented. First, at process block 2502, the guide changes a Web page, a frame within a Web page, or a frame layout on his guide PC system 1206 using director application 1306. Next, at process block 2504, director application 1306 sends a URL for a new Web page and address of the target frame to piper server 502.

At this point, at decision block 2506, piper server 502 determines if it is a change to a frame or a change to a frameset. If it is changed to a frameset, at process block 2508, the new frame layout is saved. This information is used if a client joins a session already in progress. Finally, at process block 2510, piper server 502 sends the URL and frame address to all clients.

2. WGP Commands

Piper server 502 communicates with director application 1306 and client-side component 904 using WGP 1308. WGP 1308 is built on top of TCP/IP. WGP 1308 is a simple string-based command language where strings are passed using the format specified in the Java string serialization protocol. The commands in WGP 1308 include: JOINS (to join/start sessions), CREATE (to create a new session), and navigating commands such as LOAD and DROP.

JOINS Command: The format of the JOINS command is JOIN SessionName. An error number (errNum) or 0 (0 means the command worked) is returned. Piper server 502 will additionally respond with a set of commands to synchronize the clients' Web browser with the current frameset. This is accomplished with a set of commands drawn from the navigating commands.

Figure 26:
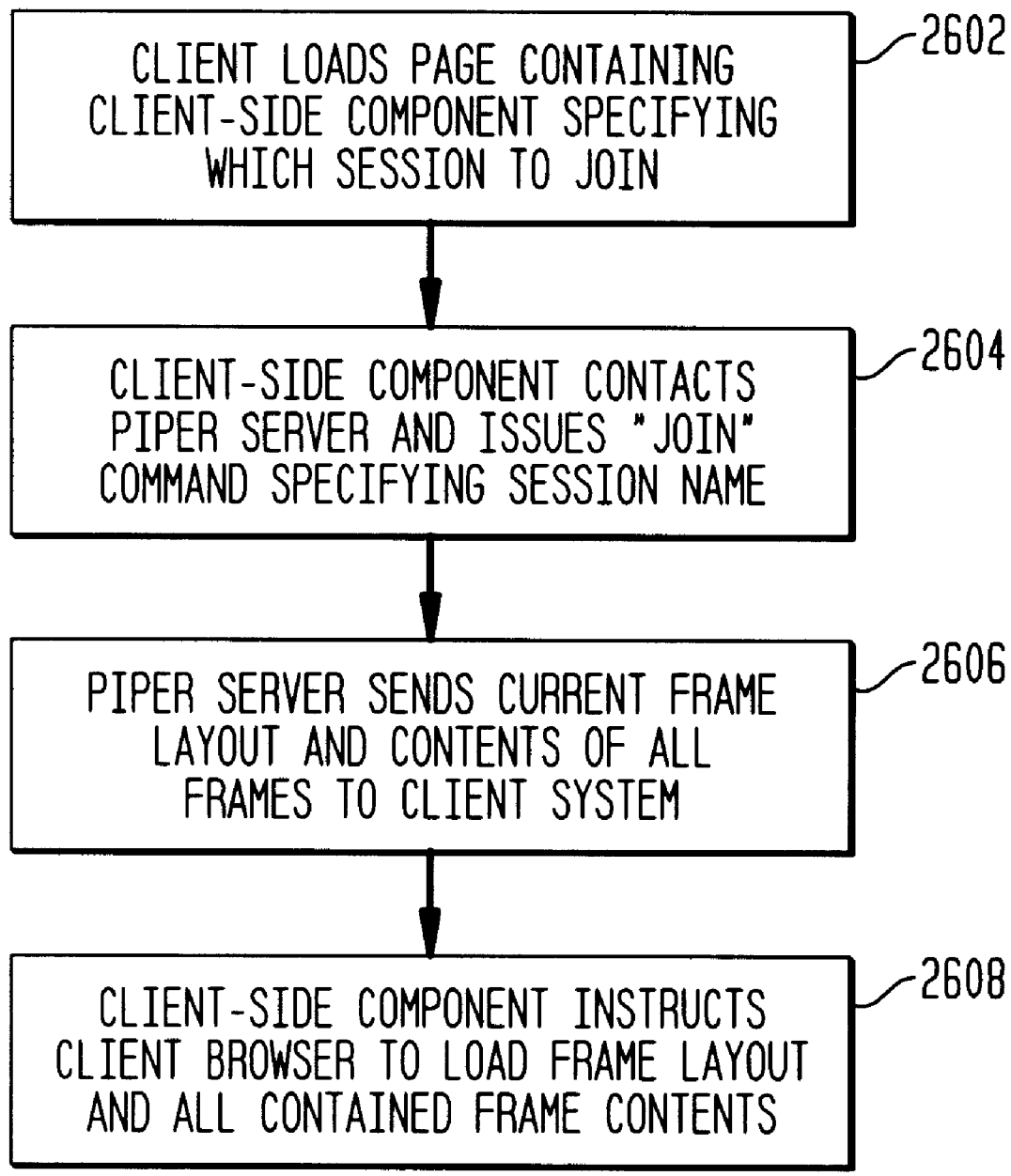
FIG. 26 is a flow diagram explaining the steps taken by the piper server when JOINS command is invoked.

FIG. 26 is a flow diagram explaining the steps taken by piper server 502 when the JOINS command is invoked. First, at process block 2602, the client loads a Web page that contains the client-side component 904 specifying the session to join. Second, at process block 2604, the client-side component contacts piper server 502 and issues a "JOINS" command specifying the SessionName. Third, at process block 2606 piper server 502 sends current frame layout and contents of all frames to the client(s). Fourth, at process block 2608 the client-side component 904 instructs its browser to load a frameset and all contained frames.

CREATE command: The format of the CREATE command is CREATE SessionName. The command creates a new session with the name SessionName. Piper server 502 must ensure that this name is unique. The SessionId is returned or −1 which indicates failure. Piper server 502 will additionally respond with a command to load a default starting Web page for the session.

Figure 27:
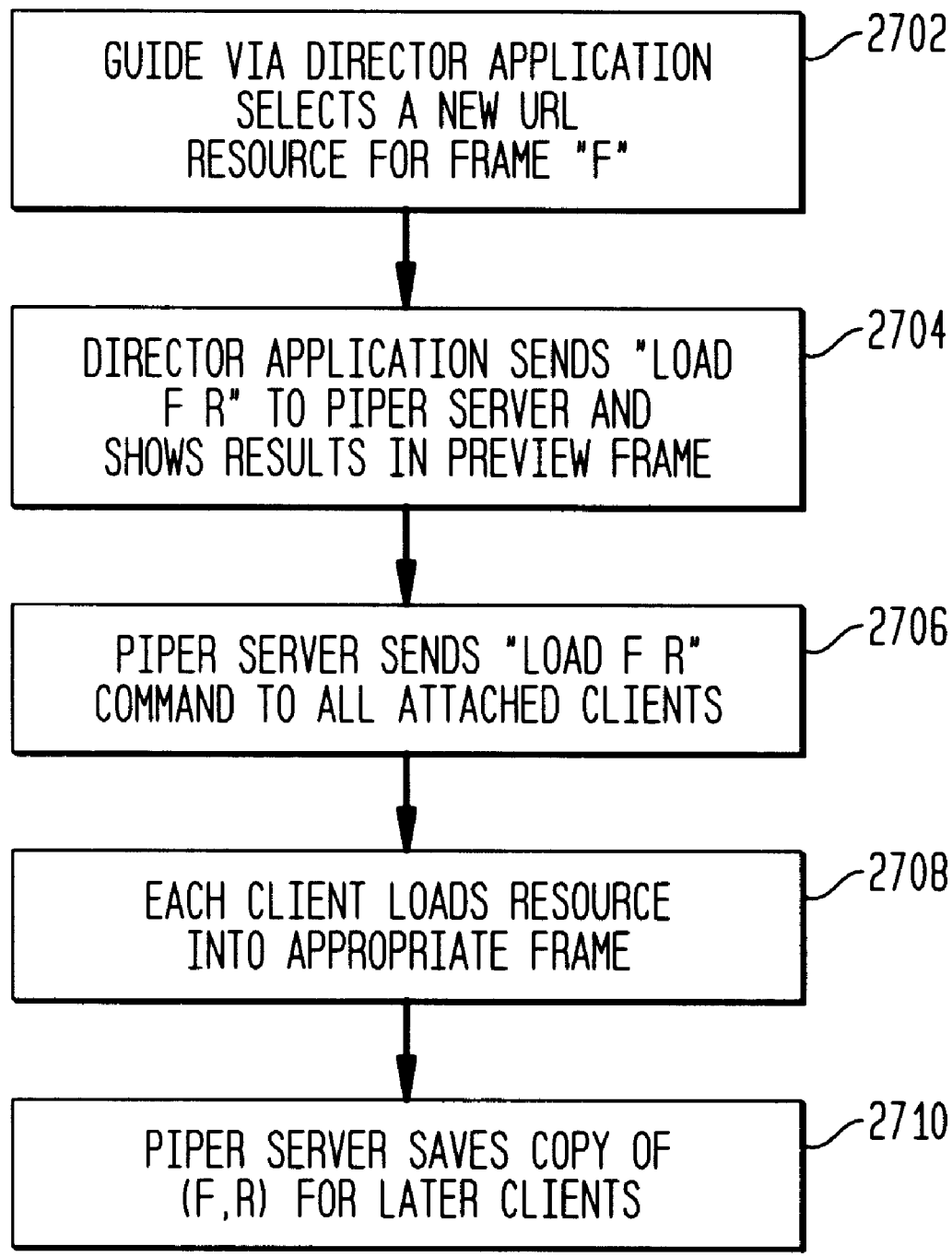
FIG. 27 is a flow diagram explaining the steps taken by the piper server when CREATE command is invoked.

FIG. 27 is a flow diagram explaining the steps taken by piper server 502 when the CREATE command is invoked. At process block 2702, director application 1306 selects a new URL for a frame. Director application 1306 sends a command "LOAD F R" to piper server 502 and shows the results in preview frame at process block 2704. Next, at process block 2706, piper server 502 sends "LOAD F R" command to all attached clients. At process block 2708, each client loads a resource into a selected frame. At process block 2710, piper server 502 saves a copy of (F,R) for later clients.

LOAD Command: Regarding the navigating commands, the guide or clients communicate these commands to piper server 502. Piper server 502 must forward these commands unchanged to all of the connected clients in a session. Piper server 502 must also save the currently displayed Web page in each frame and the current frame layout so that a client that joins an existing session can become synchronized in their Web page view with all the rest of the clients.

One navigating command is LOAD and has the format of LOAD frame URL where frame is the name of the frame and the URL is the URL for any Internet resource. The LOAD command returns either an error number (errNum) or 0 (indicating success).

Figure 28:
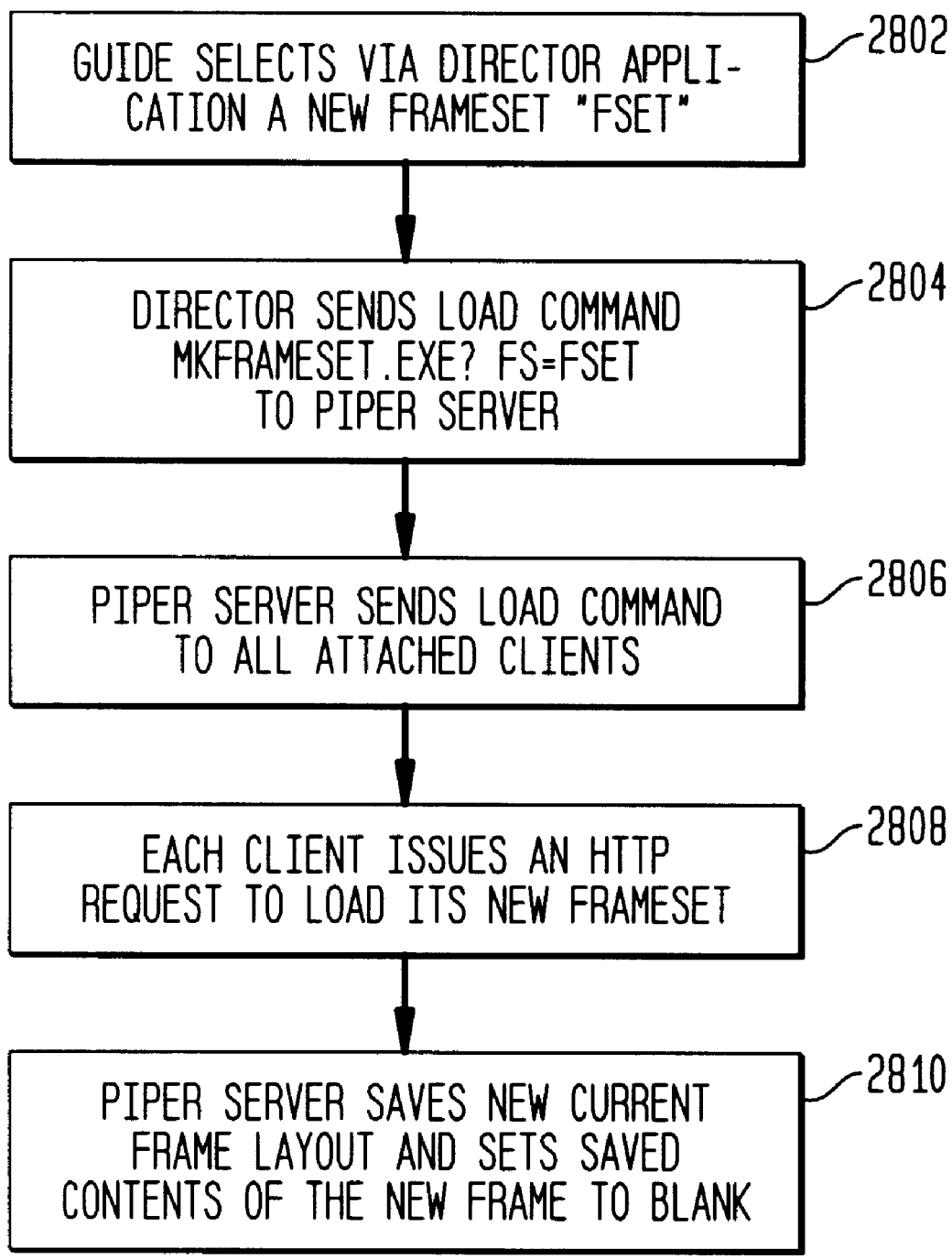
FIG. 28 is a flow diagram explaining the steps taken by the piper server when LOAD command is invoked.

FIG. 28 is a flow diagram explaining the steps taken by piper server 502 when LOAD command is invoked. At process block 2802, director application 1306 selects a new frameset ("FSET"). Next, at process block 2804, director application 1306 sends a load command to piper server 502. At process block 2806, piper server 502 sends a load command to all attached clients. At process block 2808, each client issues an HTTP request to load its new frameset. Finally, at process block 2810, piper server 502 saves new current frame layout for later clients, and sets saved contents of new frames to blank.

Figure 29:
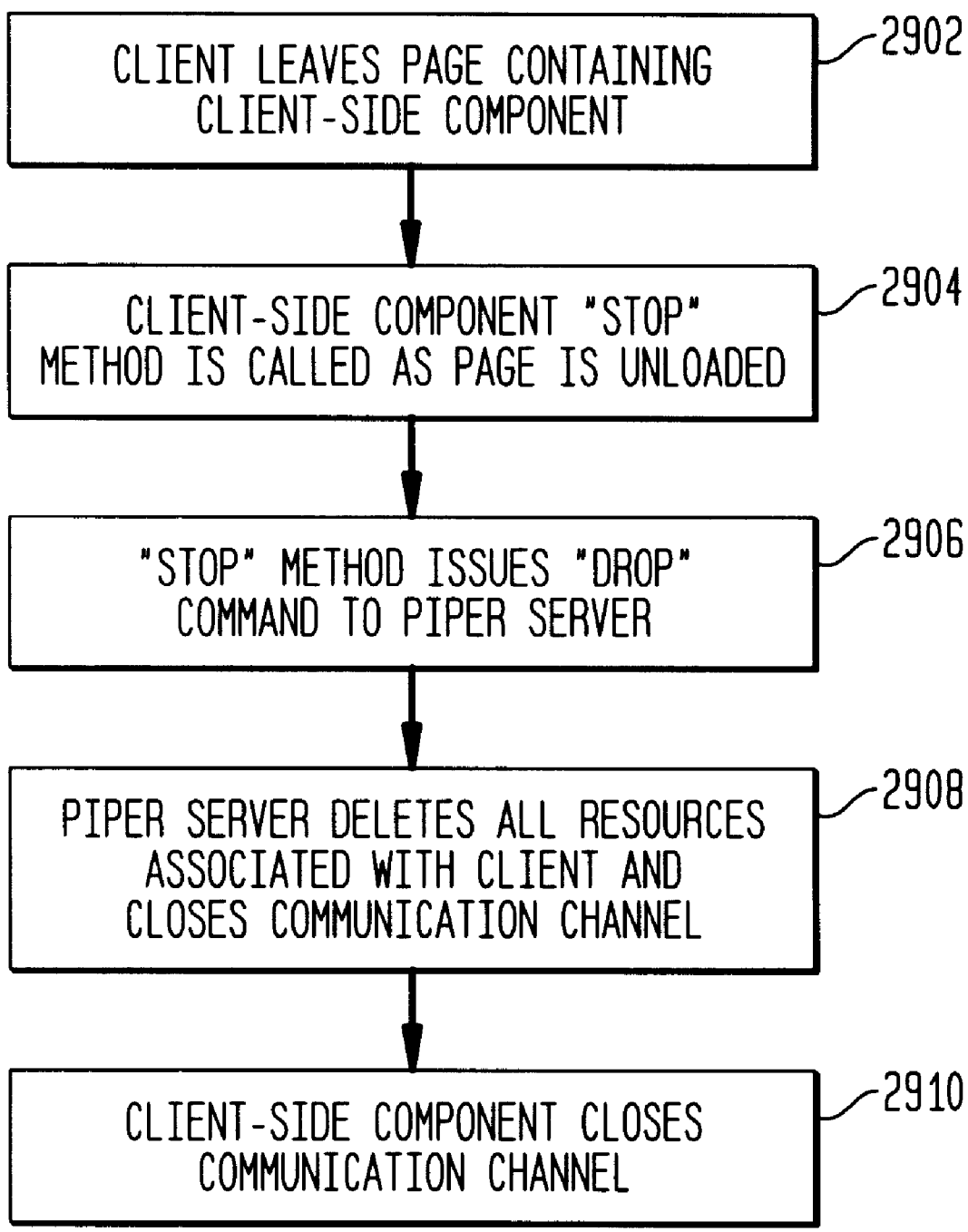
FIG. 29 is a flow diagram that depicts how a client leaves a session and the necessary steps taken to remove the client from the session using the DROP command.

DROP Command: Another navigating command is the DROP command which returns either an error number (errNum) which indicates a failure or 0 which indicates a successful completion of the command. FIG. 29 is a flow diagram that depicts how a client leaves a session and the necessary steps taken to remove the client from the session using the DROP command. At process block 2902, the client leaves a Web page containing client-side component 904. Next, at process block 2904, client-side component "stop" method is called as the Web page is unloaded. The "stop" method is defined by Java for an applet. Client Web browser 1312 calls the "stop" method when a java applet is unloaded. The "stop method" issues a drop command to piper server 502 at 2906. Piper server 502 deletes all resources associated with the client and closes the communication channel at process block 2908. Client-side component 904 closes the communication channel at process block 2910.

Arbitrary Extension: WGP 1308 also supports arbitrary extension to allow the guides and clients to communicate. This is accomplished using a command set in which the type of argument is pre-specified. The extension command set is initiated by sending an asterisk character. After the asterisk, a single integer specifies the number of parameters, and then a string comprised of the characters 's' and 'i' is used to specify strings and integers, respectively. Following the type specification, the parameters themselves are passed. For example:

*3ssi
Hello this is string one
Hello this is string two
23 is a allowable use of the extensible part of the WGP 1308.

Deleting a Session: Piper server 502 contains a Web-accessible administrative interface (i.e. the guide can communicate with piper server 502 from any Web page) which allows the guide to delete a session, delete clients from sessions, list active sessions and list clients attached to particular sessions.

Figure 30:
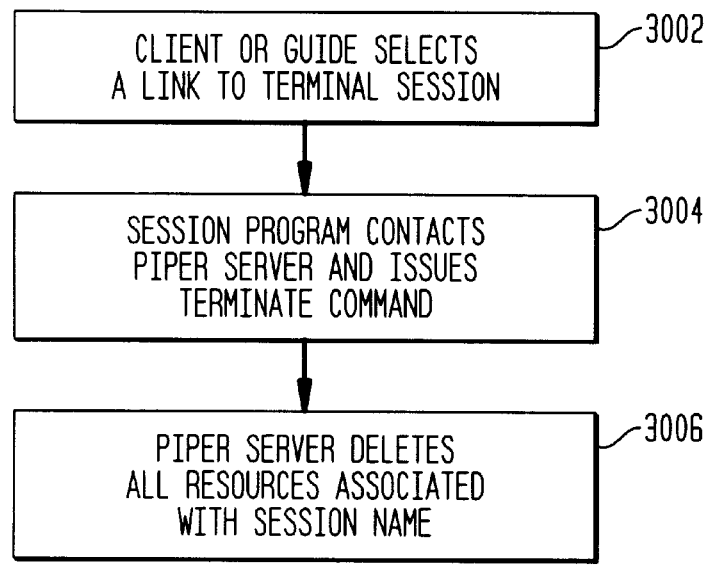
FIG. 30 a flow diagram that depicts how a session is terminated.

FIG. 30 shows the steps taken by Session program 1302 and piper server 502 to destroy a session. At process block 3002, the client or guide selects (clicks) a link to terminate the session. Associated with the link is the encoded command: session.exe?Killsession+HostName+SessionName. This command invokes Session program 1302 on HTTP server 1204 to destroy the session. The HostName (name of piper server 502) and SessionName (i.e. name of the session) are inputs to the session command.

Next, at process block 3004, Session program 1302 contacts piper server 502 and issues WGP 1308 command: Delete SessionName. The SessionName is a session object. Then at process block 3006, piper server 502 deletes all resources associated with the SessionName. In essence, piper server 502 maintains a reference count of clients, and removes all session resources (i.e. memory allocated, communication ports, data structures, etc.) when the count reaches zero. Piper server 502 can also forcibly disconnect all clients from a session when requested by the guide.

Removing a client from a session

Figure 31:
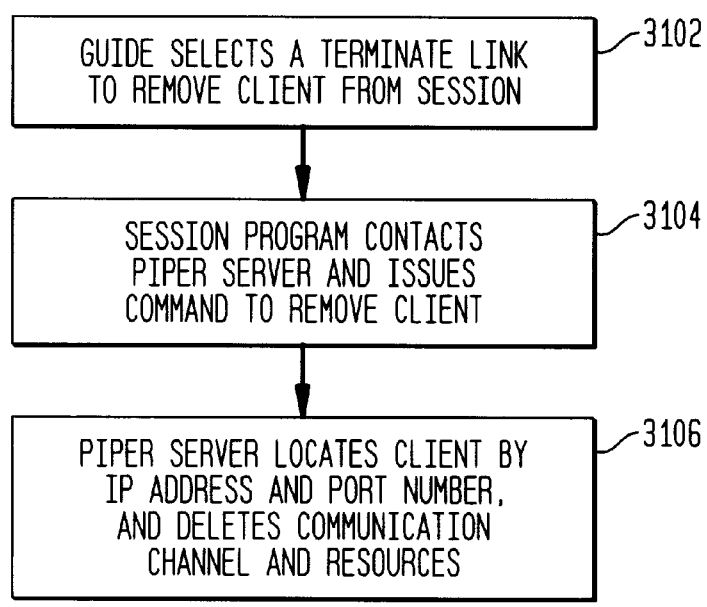
FIG. 31 is a flow diagram that depicts how a client is removed from a session.

Piper server 502 can also remove a client from a session as shown in FIG. 31. At process block 3102, the guide (or a system administrator) selects a link to remove the client from the session. Associated with the link is the encoded command: session.exe?Killclient+HostName+SessionName+SessionIP+PortNumber. This command invokes Session program 1302 on HTTP server 1204 to remove the client from the session. The HostName and SessionName identify the session. SessionIP (machine name that the client is using) and PortNumber identify the client. All of these are inputs to the session command.

Next, at process block 3104, Session program 1302 contacts piper server 502 and WGP 1308 issues the appropriate command to remove the client. Finally, at process block 3106, piper server 502 locates the client by IP_Address and Port Number and closes the communications path for the client and deletes its sessions resources.

Querying all active sessions

Figure 32:
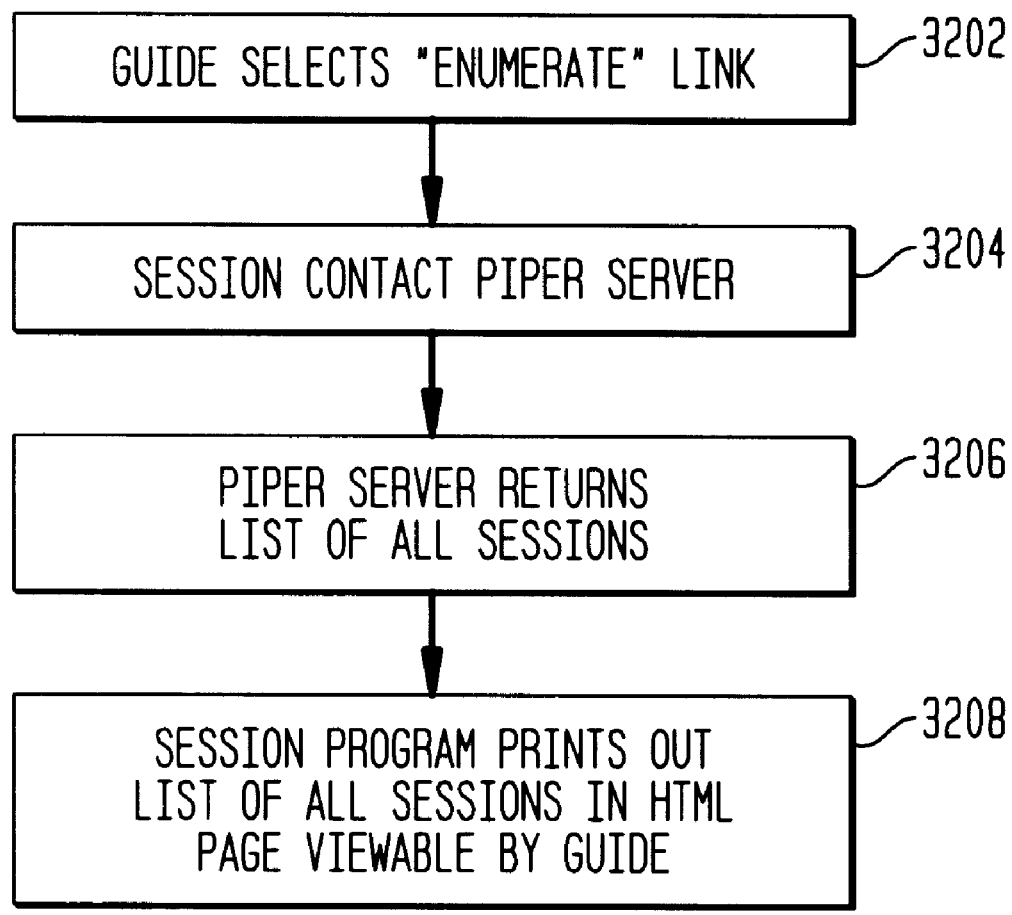
FIG. 32 is a flow diagram that illustrates the piper server querying for all active sessions.

Piper server 502 can also be queried for all active sessions as depicted in FIG. 32. This is because piper server 502 maintains a database of sessions and keeps track of clients participating in the sessions. Referring now to FIG. 32, at process block 3202, the guide selects a link to list all active sessions on piper server 502. Associated with the link is the encoded command: session.exe?Enumerate+HostName. This command invokes Session program 1302 on HTTP server. The HostName (name of the piper server 502) is an input to the session command. Next, at process block 3204, Session program 1302 contacts piper server 502.

At process block 3206, piper server 502 returns a list of all sessions. Next, at process block 3208, Session program 1302 can print out the sessions on the display screen or to a printer as a list in HTML. FIG. 33 shows a sample printout of the HTML for Active Piper Sessions produced by the process block 3208 of FIG. 32. There are two active sessions, entitled DEFAULT 3302 and PCHELP 3304.

Each session has commands in HTML. The format of the command is HREF="A">—<<B>>—C where B is the text for a link, A is the encoded command that is issued when link B is selected, and C is HTML formatting information. For example, there is a command HREF="http://vpc24.bellcore.com/Hamelin/cgi-bin/session.exe?JOINS+PCHELP_vpc24_21655">—<<JOIN>>—</a><a labeled 1806. The information in brackets (<<JOIN>>) is the link that the guide sees on his PC screen when he lists sessions. When JOIN is selected, the encoded command, http://vpc24.bellcore.com/Hamelin/cgi-bin/session.exe?JOINS+PCHELP_vpc24_21655 is issued. This activates Session program 1302 to add a client to the session PCHELP. The links available are JOIN (to join a session), ACTIVE-RAT-JOIN (enables a client to join a session that utilizes Active/X technology), LIST CLIENTS, and REMOVE SESSIONS.

Figure 34:
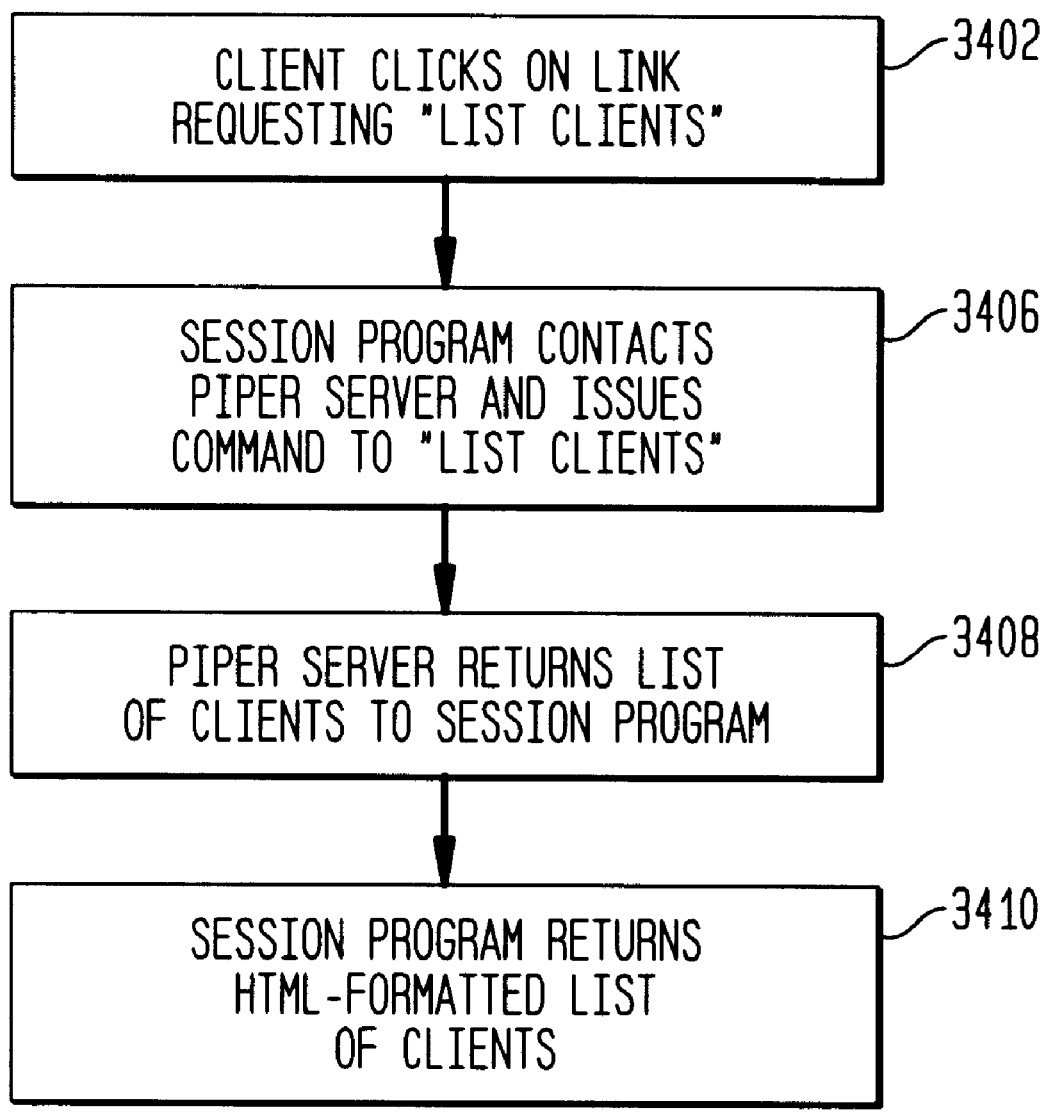
FIG. 34 is a flow diagram that illustrates the steps taken when a query to list all clients for a session is issued.

Piper server 502 can also be queried to list all clients for a session as depicted in FIG. 34. At process block 3402, the guide clicks on a link requesting to list clients. Associated with the link is the encoded command, session.exe?LISTCLIENTS+HostName+SessionName where LISTCLIENTS is the command that will be sent to piper server 502 using WGP 1308 with HostName and SessionName as inputs. Next, at process block 3404, Session program 1302 contacts piper server 502 and issues a WGP command (Listclients SessionName) to list the clients in a particular session. At process block 3406, piper server 502 returns a list of clients to Session program 1302. Finally, at process block 3408, Session program 1302 returns a formatted list of clients in HTML.

Join sessions in progress

Piper server 502 enables clients to join sessions in progress. For each session, piper server 502 saves the state of the current frameset and communicates the state to clients who join the middle of the session. This is because a client joins a session which already has a frame layout, and the guide instructs client Web browser 1312 to load a URL into a particular frame, then the client Web browser 1312 will spawn a new window to contain that URL.

Figure 35:
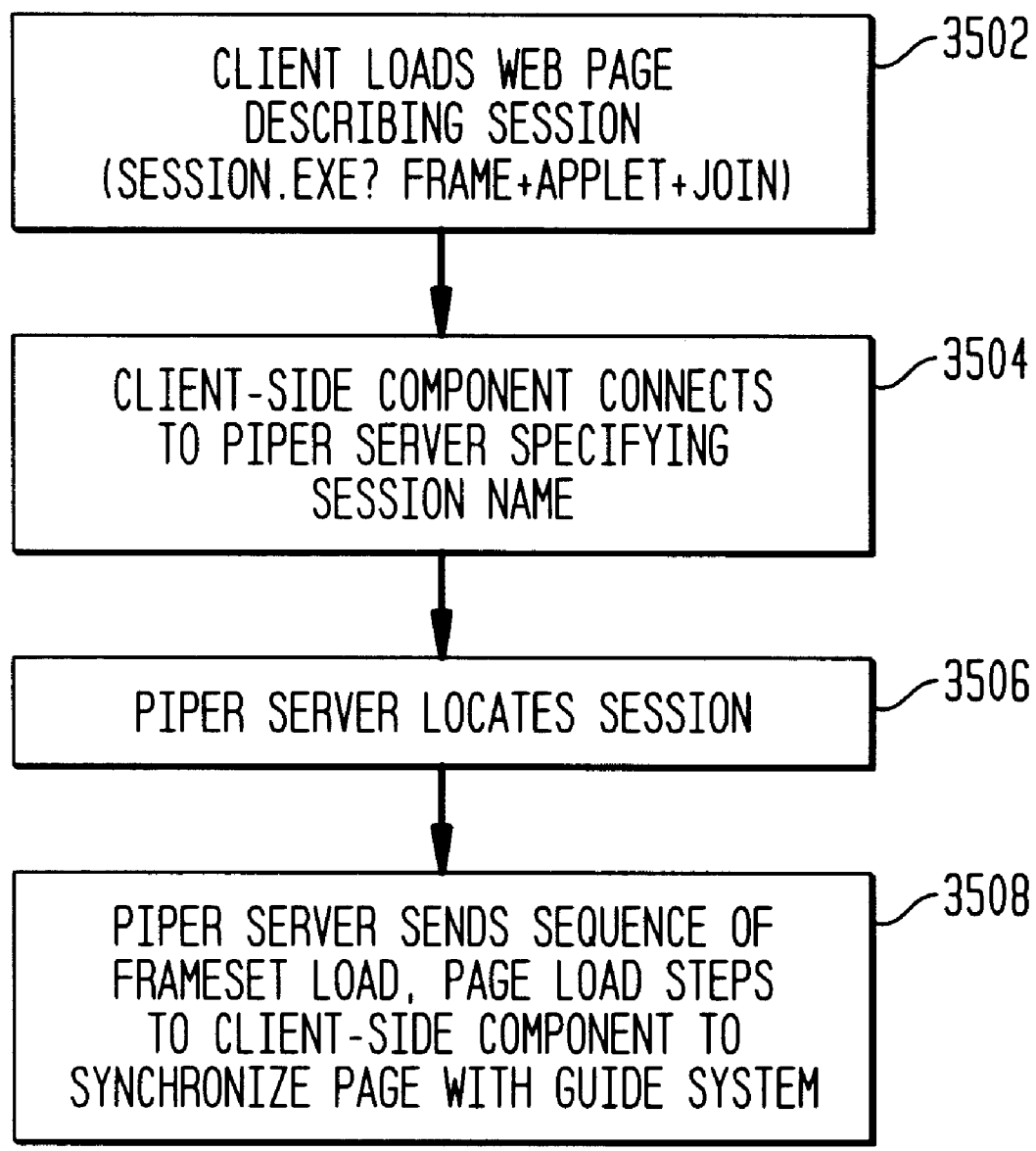

FIG. 35 illustrates the steps taken to join a session. At process block 3502, the client loads a Web page describing a Hamelin session by clicking on a Hamelin link. The underlying HTML associated with the link issues a command, session.exe?FRAME+APPLET+JOIN. Next, at process block 3504, client-side component 904 connects to piper server 502 specifying the SessionName. At process block 3506, piper server 502 locates the session. Piper server 502, at process block 3508, then sends a sequence of commands to load framesets and Web pages to client-side component 904 to synchronize the client's Web page with the guide.

Internal Objects of piper server

Piper server 502 contains several internal objects which include Session object, ClientConnection object, and TCPServer object. The main purpose of the Session object is to manage an array of clients and a count of the number of clients; to forward a Web page or frame change notification from one client to all others; to save the current frame layout and the contents of all the frames should a client join an active session; to allow an administrator to query it for the presently attached clients; to allow an administrator to forcibly detach a client; and to delete itself when the number of clients reaches zero.

There is one Session object per active session. Given a Web page or frameset change generated by one of the connected clients, it forwards that change to all of the other clients. One complication is that it must maintain a snapshot of the Web page and frame contents at all times. This is so that if a client joins in the middle of an active session, the client can immediately be given the current frame layout. This is accomplished by recognizing the special frameset invocation command (i.e. MkFrameSet) and keeping a list or map of the current frame contents. The Session object also keeps a Vector of the currently connected clients (through the ClientConnection objects).

There is a ClientConnection object for each active client. ClientConnection object maintains TCP connections between the server and either client-side component 904 (i.e. Rat applet or ActiveX control), director application 1306, and Session program 1302 (for system administration). There are basically two modes of operation for the ClientConnection object: administrative mode (ClientConnection object is not associated with a Session and the connection is dropped at the end of the query or command) or client mode (ClientConnection object is maintained for the life of the session or until the client disconnects or is forcibly disconnected). When the ClientConnection object is in client mode, it listens for commands on the open TCP connection and typically asks the Session of which it is a member to forward the command to all other members of the Session.

There is one TCPServer object running in piper server 502. The TCPServer waits for new clients, and constructs a new ClientConnection object in response to an incoming request. The TCPServer creates the new session and creates the communications paths. The TCPServer understands the CREATE command and the JOIN session command.

6. Client System

Client system 1208 is typically a PC system used by the client. The software components include client Web browser 1312 and client-side component 904.

Client Web browser 1312 is a browser (such as previously described in the Background of the Invention) which displays information (i.e. Web pages, Internet Resources, collaborative tools, etc.) to the client. Client Web browser 1312 must be a Java-enabled browser (i.e. the browser is able to run Java applets) such as Microsoft Internet Explorer or Netscape Navigator.

If client-side component 904 is an applet, it communicates with the client Web browser via an interface. The interface used for Java applets is AppletContext and the appropriate format for the interface to be used by an applet to obtain information about its environment is a.showdocument(URL, frame) where URL is the URL and frame is the target frame.

Client-side component 904 must support some or all of these functions:

1. Must respond to the WGP LOAD command, and be able to instruct its containing client Web browser 1312 to replace the contents of the frame, or replace the main frame with a new frame layout.
2. Issue a WGP JOINS command when initially displayed in order to start participating in a session.
3. Be able to instruct piper server 502 when the client navigates the Web (i.e. clicks on a link). This is accomplished by the LOAD command if a new URL or a frame is changed. Client-side component 904 listens and when it sees a change notifies piper server 502. Piper server 502 must use WGP 1308 to make these notifications.

Client-side component 904 is typically an applet, plugin, or ActiveX control. It is required to interface with client Web browser 1312 and communicate with piper server 502. Client-side component 904 enables the guide to communicate commands to client Web browser 1312 via piper server 502's WGP 1308. These commands are to change Web pages, load Internet Resources, initiate collaborative tools, load framesets, change frame layouts, change frame contents, etc.. Client-side component 904 is contained in the HTML of the Web page located on client Web browser 1312 and electronically connects to piper server 502.

If an applet is used as client-side component 904 (known as a Rat Applet), the Rat Applet listens on the TCP connection to piper server 502 for commands, and forwards commands to load new Web pages to the client Web browser 1312 (via the AppletContext container class). It must also tell piper server 502 when the Web page containing the applet is unloaded (by sending a drop command as previously described in FIG. 29).

Using a plugin rather than an applet as client-side component 904 leads to added functionality. This functionality includes Frame Size Synchronization, Client Link Notification, Shared pointer, and Shared whiteboard. Details of some of the features are delineated below:

Frame Size Synchronization: This involves the determination of client Web browser size and position, which is useful for annotations. The visual appearance of most Web pages depends upon the window size of the Web browser rendering it. When the guide need the exact appearance of client Web browser 1312, the window size of guide's browser (i.e. the browser located in the local-view frame) can be synchronized to the window size of client Web browser 1312. This can be available through a menu, through a hot-key sequence (the ability to issue a command by issuing a keystroke (such as control-c) rather than using the mouse or menus), or director application 1306 can be set to automatically trace changes in the window size of client Web browser 1312. An audible indication of window size changes can also be implemented.

Client Link Navigation Notification: This includes client-initiated navigation (i.e. notification when the client clicks on a link of a Web page), denial of client-initiated navigation, and forwarding of client-initiated page changes to the guide (i.e. if the client chooses to follow a link, this is communicated back to the guide so that the guide can follow the client). Director application 1306 can be set to automatically follow the client when the client follows the selected links in client Web browser 1312. Director application 1306 can follow without asking, follow after asking, or not follow. The plugin itself can be set to deny requests for client initiated navigation, forward these requests back to director application 1306, or not inform director application 1306.

The client link navigation notification is implemented as a blocking synchronous call or alternatively as a non-blocking mechanism.

Shared Pointer: The guide can construct a collaborative tool such as a shared pointer that both the client and guide will view simultaneously on their Web browsers (i.e. remotely displayable frame 1010 of director application 1306 for the guide and client Web browser 1312 for the client). The shared pointer is designed to allow parts of Web pages to be highlighted by any user of the session. It is accessible through a menu entry, or through a hot-key sequence. Typically for this feature to be useful, it is necessary for the browser in remotely displayable frame 1010 of director application 1306 and client Web browser 1312 to be the same window size. Alternatively, the pages should be authored with style-sheets or other strong formatting information which allows more control over the layout and enables Web pages to look the same on any browser.

The shared pointer can be a pointing device overlaid on a Web page in an unmodified browser that can be directed by any remote participant (i.e. client). For example, the guide via director application 1306 can construct a pointer overlying the Web browsers of the guide and client(s). Either party can "click on and drag" the pointer. If either party moves it, it moves on all display screens for the PC systems (i.e. guide PC system(s) and client PC system(s)).

WGP extensions needed to be added to provide the functionality of the shared pointer. The following is a sample of typical commands: POINTER ON (to make the pointer visible); POINTER OFF (to make the pointer invisible); POINTER COLOR (any color available in the spectrum such as RED|GREEN|BLUE|PINK,PURPLE, and YELLOW); and POINTER MOVE X,Y (to move POINTER to position X,Y).

Figure 36:
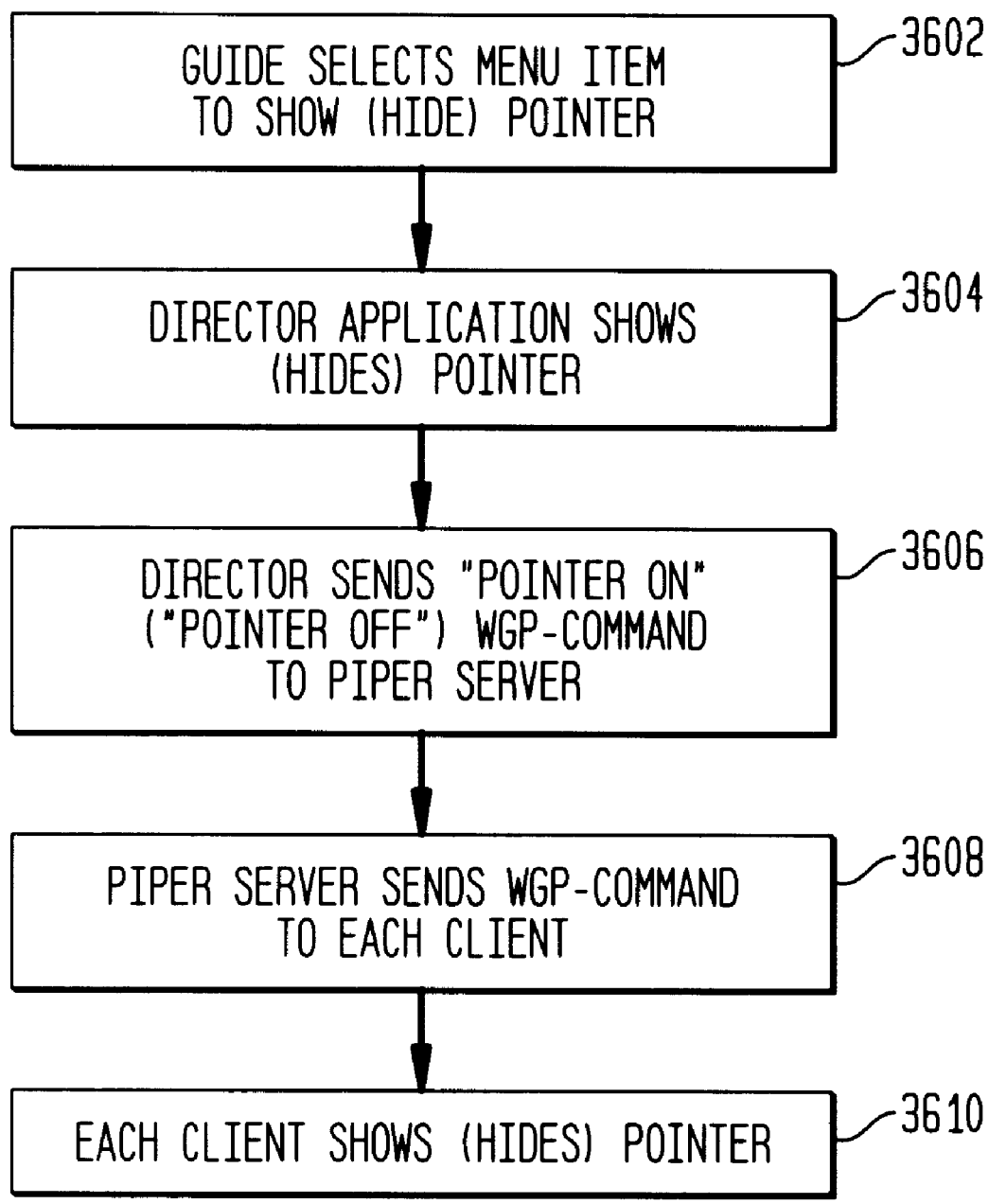
FIG. 36 is a flow diagram illustrating the steps taken to join the session.
Figure 37:
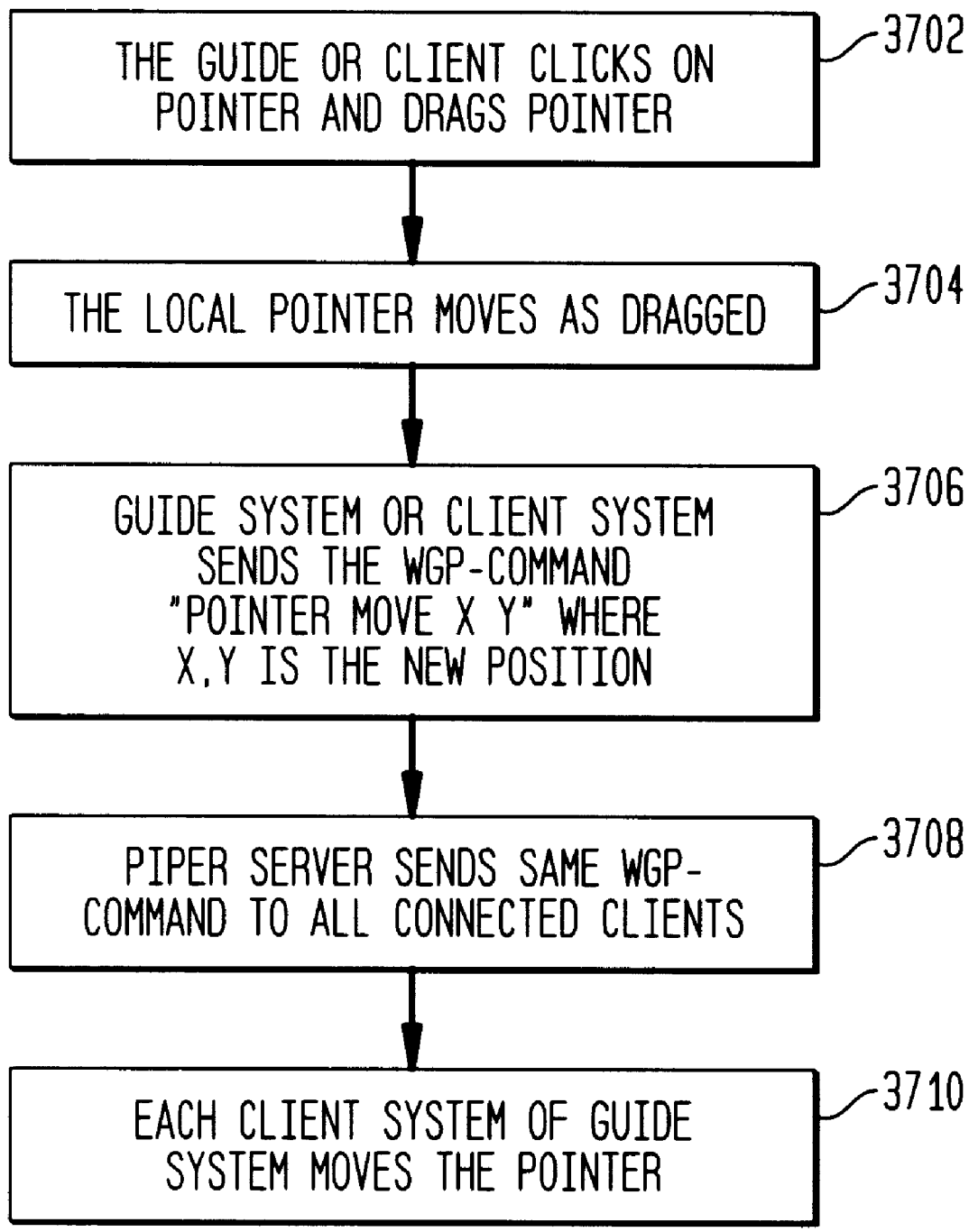
FIGS. 37 and 38 show the actions taken by the components of the Hamelin system when constructing/hiding the pointer and moving the pointer respectively.

FIGS. 36 and 37 show the actions taken by the components of the Hamelin system when constructing/hiding the pointer and moving the pointer respectively. With reference to FIG. 36, at process block 3602, the guide selects a menu item to show or hide pointer. Next, at process block 3604, director application 1306 shows or hides pointer. At process block 3606, director sends WGP command "POINTER ON" or "POINTER OFF" to piper server. At process block 3608, piper server 502 sends a WGP command to each client. At process block 3610, each client shows or hides the pointer.

With reference to FIG. 37, this exemplifies moving the pointer and the steps are repeated while the mouse button is held down or any other activating mechanism occurs. At process block 3702, the guide (or client) clicks on the pointer with the mouse and drags it. Next, at process block 3704, the local pointer moves with the mouse. Next, at process block 3706, guide (or client) sends WGP command: "POINTER MOVE X Y" where X,Y is the new position. Next, at process block 3708, piper server 502 sends command to all connected clients. Finally, at process block 3710, each client (or guide) moves the pointer.

Shared Whiteboard: The guide can construct a collaborative tool such as a shared whiteboard that both the client and the guide can view on their browsers (i.e. remotely displayable frame 1010 of director application 1306 for the guide and client Web browser 1312 for the client). The whiteboard can be enabled through a menu entry or alternatively, through a hot-key sequence. Any user of a session can draw on his local copy of the displayed Web page and have his annotations appear to all of the other users. Typically for this feature to be useful, it is necessary for the Web browser in remotely displayable frame 1010 of director application 1306 and the client Web browser 1312 to be the same size. Alternatively, the pages should be authored with style-sheets or other strong formatting information which allows more control over the frame layout and enables Web pages to look the same on any browser.

The shared whiteboard can be a method for supporting freehand drawing on top of an existing Web page in an unmodified Web browser which many remote participants (i.e. clients) can participate in the unique annotation. The shared whiteboard can be constructed on top of the Web browsers of the clients and guides. The guide can use the whiteboard to mark up any underlying Web page.

WGP extensions needed to be added to provide the functionality of the shared whiteboard. The following is a sample of typical commands: WHITEBOARD ON (to activate the whiteboard; WHITEBOARD OFF (to deselect the whiteboard); and LINE COLOR, WIDTH NUMPOINTS X1Y1X2Y2X3Y3 . . . XNYN (to draw a line composed of NUMPOINTS straight sections of color (any color available in the spectrum such as RED, GREEN, BLUE, PINK, PURPLE, and YELLOW) of WIDTH "WIDTH" pixels.

Figure 38:
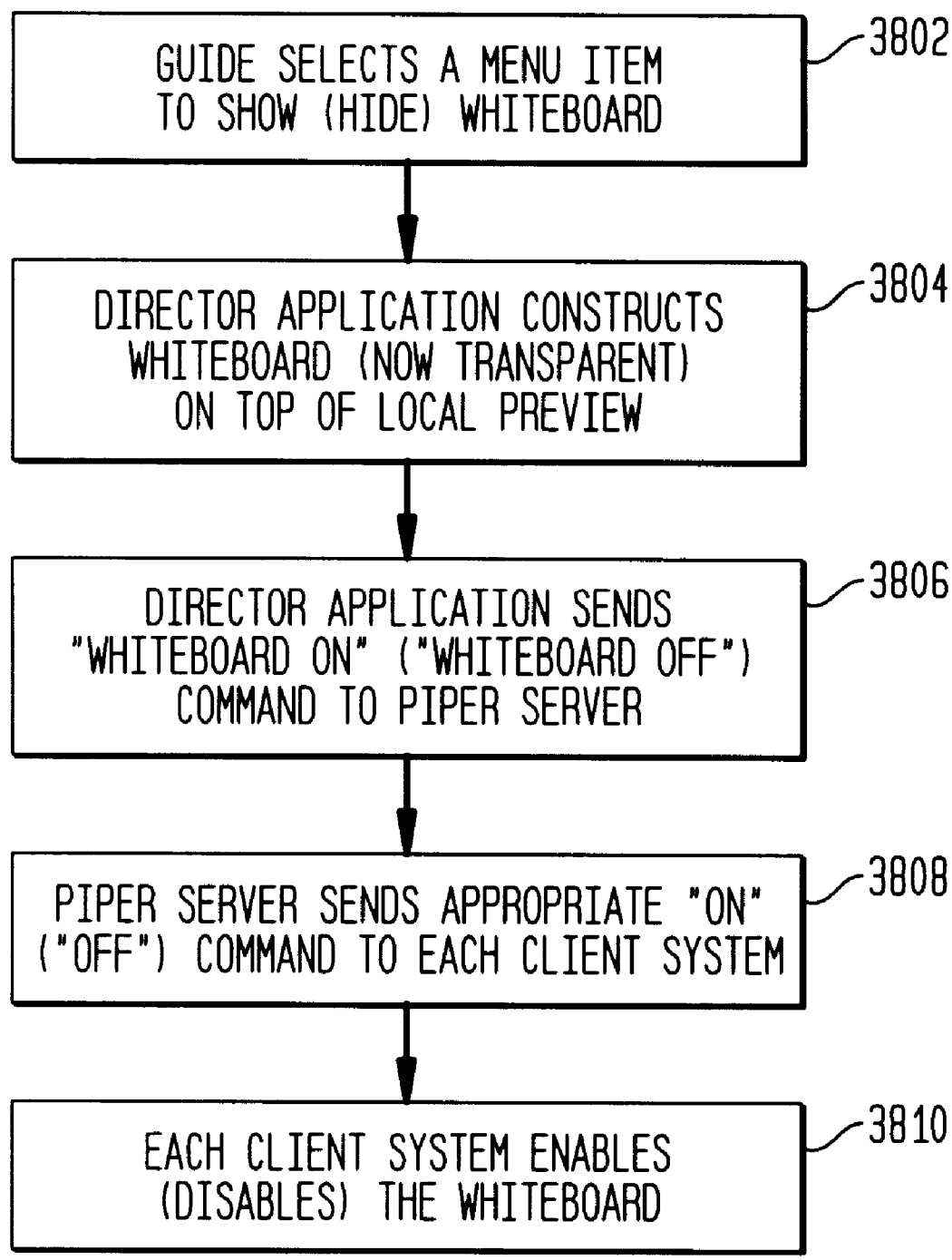
Figure 39:
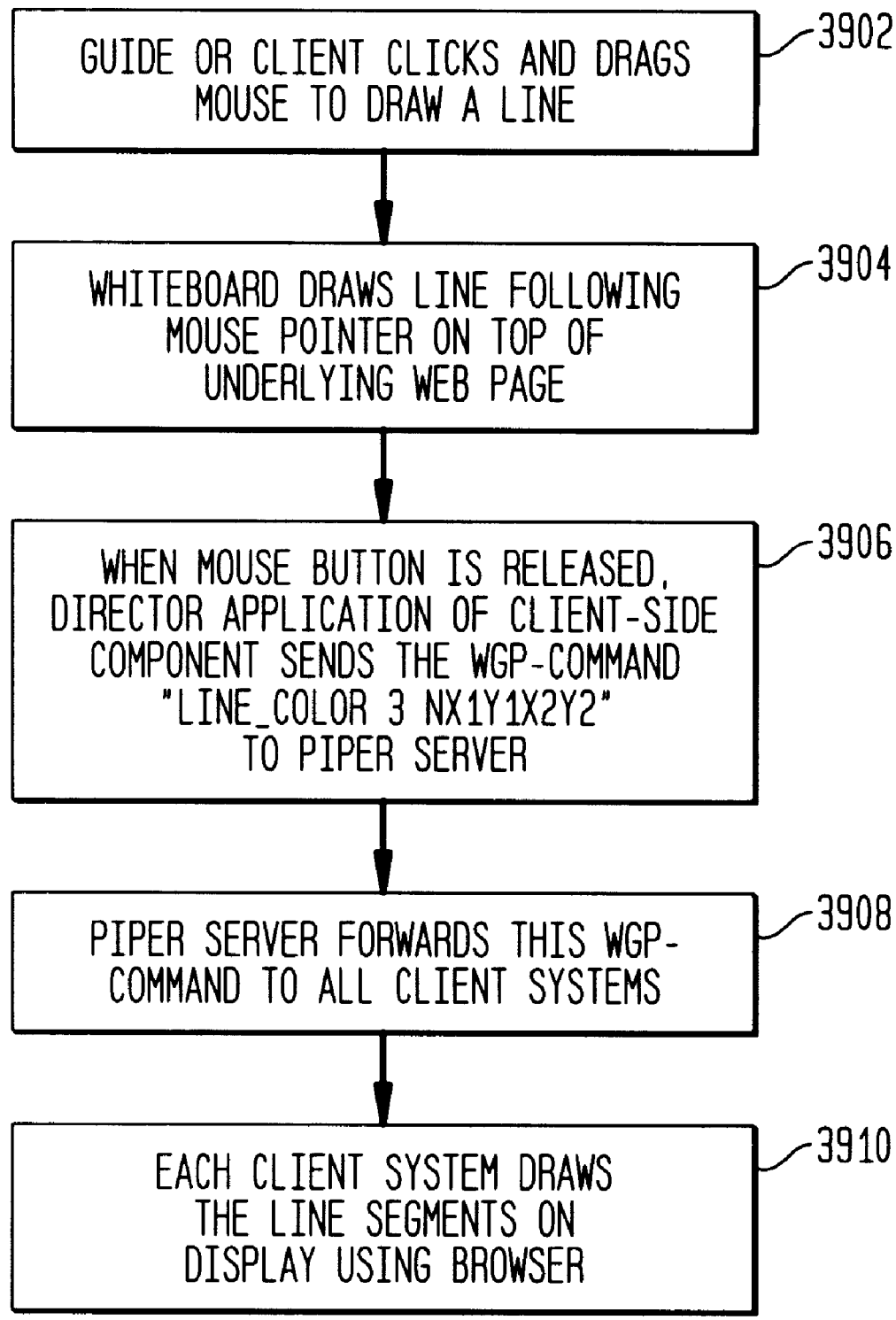

FIGS. 38 and 39 show the actions taken by the components of the Hamelin system when constructing/hiding the whiteboard and moving the whiteboard, respectively. With reference to FIG. 38, at process block 3802, the guide selects a menu item to show or hide the whiteboard. Next, at process block 3804, director application 1306 constructs the whiteboard (currently transparent) on top of the local-view frame. At process block 3806, director application 1306 sends WGP command "WHITEBOARD ON" or "WHITEBOARD OFF" to piper server 502. At process block 3808, piper server 502 sends a WGP command to each attached client. Each client enables or displays the whiteboard, as evidenced by process block 3810.

With reference to FIG. 39, movement of whiteboard is exemplified. At process block 3902, the guide (or client, as the case may be) clicks and drags the mouse to draw a line. Next, at process block 3904, whiteboard draws the line following the mouse pointer on top of the underlying Web page. When the mouse button is released at process block 3906, director application 1306 or client-side component 904 sends the WGP command: "LINE COLOR 3 N X1Y1X2Y2" to piper server 502 where color is the desired color for the display of the whiteboard. Next, at process block 3908, piper server 502 forwards the WGP command to all connected client systems. Finally, at process block 3910, each client system draws the line segments on their respective Web browsers.

While the invention has been described in detail in the foregoing description, it will be understood by those skilled in the art that variations may be made without departing from the spirit and scope of the invention. For example, the software components contained in HTTP Server 1204 and piper server 502 can be merged together into one hardware component typically known as HTTP/piper server without loss of functionality. As a second example, as more tools for the Web are developed, and applets, plugins, ActiveX controls, and other technology become more sophisticated, these Internet Resources can be integrated into the Hamelin system.

As another example, consider application of the Hamelin system in an intranet environment rather than the Internet which has primarily been discussed. Web pages can be created using HTML that would be contain proprietary information. These Web pages could contain such Internet Resources as electronic catalogs containing product information, technical notes containing applications of products, and configurations of systems using company products, etc. A guide could construct a session giving a tour of new products and applications of those products. New employees and/or sales and marketing professionals can use these Web sites to learn new product information and applications for products. For example, in the test and measurement market, a salesperson or applications engineer could remotely logon to the company's intranet and thereby communicate with engineers or technicians when he has a problem installing a test and measurement system at a customer's site. Thus, as shown, the invention has application in any computer network whether it be a LAN, WAN, Internet, intranet or extranet.

What is claimed is:

1. A method for communicating between a guide system and a client system interconnected via a browser-based network, the client system deploying a conventional browser, the method comprising the steps of configuring the guide system with a special-purpose browser containing both a locally displayable frame layout for displaying local frames and a guide configurable remotely displayable frame layout for displaying remote frames, under the control of a guide, selectively defining each frame of the remotely displayable frame layout, an under the control of the guide, propagating the remotely displayable frame layout and frames over the network to the client system for display by the conventional browser of the client system.

2. The method as recited in claim 1 wherein the step of configuring includes the step of loading the guide system with a set of predefined frame layouts, and the method further includes the step, prior to the step of propagating, of selecting by the guide one of the predefined frame layouts to display remotely displayable frames.

3. The method as recited in claim 2 further including the steps of in response to a request from a client as propagated over the network, changing at least one of the remotely displayable frames as chosen by the guide, and under control of the guide, re-propagating only said at least one of the remotely displayable frames over the network to the client system for display by the conventional browser of the client system.

4. The method as recited in claim 1 further including the step of synchronizing the special-purpose browser with the conventional browser via the network so that scrolling by the guide on any of the remotely displayable frames is displayed on the client system.

5. The method as recited in claim 4 wherein said step of synchronizing includes the step of synchronizing the conventional browser with the special-purpose browser via the network so that scrolling by the client on any of the remotely displayable frames viewable by the client is also displayed on the guide system.

6. A method for communicating between a guide system and a client system interconnected via a browser-based network, the client system deploying a conventional browser, the method comprising the steps of configuring the guide system with a special-purpose browser for displaying both locally displayable frames and remotely displayable frames on the guide system, under control of a guide, propagating the remotely displayable frames over the network to the client system for display by the conventional browser of the client system, configuring both the guide system and the client system with jointly operational shared pointer software, and executing the shared pointer software to control a shared pointer displayable concurrently on the conventional browser and on one of the remotely displayable frames of the special purpose browser.

7. A method for communicating between a guide system and a client system interconnected via a browser-based network, the client system deploying a conventional browser, the method comprising the steps of configuring the guide system with a special-purpose browser for displaying both locally displayable frames and remotely displayable frames on the guide system, under control of a guide, propagating the remotely displayable frames over the network to the client system for display by the conventional browser of the client system, configuring both the guide system and the client system with jointly operational whiteboard software, and executing the whiteboard software to control whiteboard markings displayable concurrently on the conventional browser and on one of the remotely displayable frames of the special purpose browser.

8. A method for communicating between a guide system and a client system interconnected via a browser-based network, the client system deploying a conventional browser, the method comprising the steps of configuring the guide system with a special-purpose browser for displaying both locally displayable frames and remotely displayable frames on the guide system, under control of a guide, propagating the remotely displayable frames over the network to the client system for display by the conventional browser of the client system, configuring both the guide system and the client system with jointly operational free-hand drawing software, and executing the drawing software to control free-hand drawing markings displayable concurrently on the conventional browser and on one of the remotely displayable frames of the special purpose browser.

9. The method as recited in claim 1 further comprising the steps of configuring both the guide system and the client system administration software for identifying the client system, and executing the administration software to provide the identity of the client system to the guide system as rendered on its special purpose browser.

10. The method as recited in claim 1 further comprising the steps of configuring both the guide system and the client system with administration software for disconnecting the client system from the guide system, and executing the administration software to disconnect the client system under control of the guide system.

11. The method as recited in claim 1 further comprising the steps of configuring the guide system with recording software to allow the guide, while using the guide system off-line, to record a list of event and event times, and executing the recording software to record the list of events and event times.

12. The method as recited in claim 11 further comprising the steps of configuring the guide system with playback software for playing back the recorded list of events per the event times, and executing the playback software, under the control of either the guide or client, for displaying the recorded list of events on the remotely displayable frames of the client's conventional browser.

13. The method as recited in claim 11 further comprising the steps of configuring the guide system with editing software for editing the recorded list of events and event times, and executing the editing software, under the control of the guide, to edit the recorded list of events and event times.

14. A method for communicating between a guide system and a client system over a browser-based network, the client system deploying a conventional browser, the method comprising the steps of configuring the guide system with a special-purpose browser containing both a locally displayable frame layout for displaying local frames and a guide configurable remotely displayable frame layout for displaying remote frames, interconnecting the guide system and the client system over the network in response to a request by a client, defining the frames of the remotely displayable frame layout under control of a guide in response to the request by the client, and propagating only the remotely displayable frame layout and frames over the network to the client system for display by the conventional browser of the client system.

15. The method as recited in claim 14 wherein the step of configuring the guide system includes the step of preloading the frames of the locally displayable frame layout with resource items commonly used by the guide.

16. The method as recited in claim 15 wherein the step of defining includes the step of defining at least one of the remotely displayable frames with a commonly use resource item.

17. The method as recited in claim 14 wherein the step of defining includes the steps of choosing by the guide for display in one of the locally displayable frames a predefined frameset, and loading the remotely displayable frame layout with the frameset as displayed in the said one of the locally displayable frames.

18. The method as recited in claim 14 wherein the step of defining includes the steps of choosing by the guide for display in one of the locally displayable frames a Web page accessible via the network, and loading at least one of the remotely displayable frames with the Web page as displayed in the said one of the locally displayable frames.

19. A method for communicating between a guide system and a client system over a browser-based network, the client system deploying a conventional browser, the method comprising the steps of configuring the guide system with a special-purpose browser for displaying both locally displayable frames and remotely displayable frames on the guide system, interconnecting the guide system and the client system over the network in response to a request by a client selecting the remotely displayable frames under control of a guide in response to the request by the client, propagating only the remotely displayable frames over the network to the client system for display by the conventional browser of the client system, configuring both the guide system and the client system with jointly operational whiteboard software, and executing the whiteboard software to control whiteboard markings displayable concurrently on the conventional browser and on one of the remotely displayable frames of the special purpose browser.

20. A system for communicating between a guide system and a client system interconnected via a browser-based network, the client system deploying a conventional browser, the system comprising configuration means for configuring the guide system with a special-purpose browser containing both a locally displayable frame layout for displaying local frames and a guide configurable remotely displayable frame layout of displaying remote frames, configuration means, under the control of a guide, for selectively defining each frame of the remotely displayable frame layout, and communication means, under the control of the guide, for propagating the remotely displayable frame layout and frames over the network to the client system for display by the conventional browser of the client system.

* * * * *